US009661676B2

(12) United States Patent
Liu

(10) Patent No.: US 9,661,676 B2
(45) Date of Patent: May 23, 2017

(54) METHOD AND APPARATUS FOR RESTRICTING UE SESSION MANAGEMENT PROCEDURE RETRY AFTER NETWORK REJECTION

(71) Applicant: Alcatel-Lucent USA Inc., Murray Hill, NJ (US)

(72) Inventor: Jennifer Liu, Plano, TX (US)

(73) Assignee: Alcatel Lucent, Coulogne-Billancourt (FR)

( * ) Notice: Subject to any disclaimer, the term of this patent is extended or adjusted under 35 U.S.C. 154(b) by 207 days.

(21) Appl. No.: 14/577,165

(22) Filed: Dec. 19, 2014

(65) Prior Publication Data

US 2015/0181639 A1 Jun. 25, 2015

Related U.S. Application Data

(60) Provisional application No. 62/070,119, filed on Aug. 15, 2014, provisional application No. 61/919,951, filed on Dec. 23, 2013.

(51) Int. Cl.
*H04W 76/02* (2009.01)
*H04W 48/00* (2009.01)
*H04W 76/04* (2009.01)

(52) U.S. Cl.
CPC .......... *H04W 76/027* (2013.01); *H04W 48/17* (2013.01); *H04W 76/022* (2013.01); *H04W 76/041* (2013.01)

(58) Field of Classification Search
None
See application file for complete search history.

(56) References Cited

U.S. PATENT DOCUMENTS

2012/0170453 A1* 7/2012 Tiwari ................ H04W 76/027
370/230
2012/0275401 A1* 11/2012 Sun ....................... H04W 72/04
370/329

(Continued)

FOREIGN PATENT DOCUMENTS

EP 2472986 A1 7/2012
EP 2728925 A1 5/2014

OTHER PUBLICATIONS

Alcatel-Lucent et al: "Handling of permanent failure conditions during UE initiated ESM procedures", 3GPP DRAFT; C1-132956, XP050713129, Vienna Austria, Aug. 2013.

(Continued)

*Primary Examiner* — Gary Mui
(74) *Attorney, Agent, or Firm* — Harness, Dickey & Pierce, P.L.C.

(57) ABSTRACT

A method of operating a user equipment (UE) in a wireless communications network includes sending, from the UE to a first network element, a first packet service session management request message indicating a request of a first session management service type for at least one of establishing a new packet data session or modifying an existing packet data session, the first packet service session management request message being sent towards a first access point name (APN); receiving, at the UE, a rejection message, the rejection message indicating the request of the first session management service type has been rejected; and performing a retry operation after receiving the rejection message, the retry operation including sending, from the UE, a second packet service session management request message of the first session management service type towards the first APN, the retry operation being prevented by the UE such that the retry operation is not performed by the UE until after at least (Continued)

one of, an expiration of a retry timer of the UE, or detection, at the UE, of a retry trigger event.

18 Claims, 30 Drawing Sheets

(56) References Cited

U.S. PATENT DOCUMENTS

| | | | | |
|---|---|---|---|---|
| 2013/0242754 A1* | 9/2013 | Shaikh | H04W 24/04 | 370/242 |
| 2015/0045021 A1* | 2/2015 | Schlatter | H04W 48/20 | 455/434 |
| 2015/0181462 A1* | 6/2015 | Iwai | H04W 28/16 | 370/229 |
| 2015/0256961 A1* | 9/2015 | Kim | H04W 74/085 | 370/329 |
| 2015/0257115 A1* | 9/2015 | Jokimies | H04W 60/04 | 455/435.1 |

OTHER PUBLICATIONS

Alcatel-Lucent et al: "Handling of permanent failure conditions during MS initiated SM procedures", 3GPP DRAFT; C1-133642, XP050713630, Vienna, Austria, Aug. 2013.

Alcatel-Lucent et al: "Handling of SM Status with SM cause #97", 3GPP DRAFT; C1-133644, XP050713632, Vienna, Austria, Aug. 2013.

QUALCOMM Incorporated et al: "WLCP procedures", 3GPP DRAFT; C1-134920, XP050746980, San Francisco, CA, USA, Nov. 2013.

Alcatel-Lucent et al: "MS retry handling with optional network signalled timer and RAT applicability indication (compromised approach)", 3GPP DRAFT; C1-144699, XP050898022, San Francisco, CA, USA, Nov. 2014.

Alcatel-Lucent et al: "UE retry handling with optional network signalled timer (Alt4)", 3GPP DRAFT; C1-144952, XP050898176, San Francisco, CA, USA, Nov. 2014.

International Search Report (PCT/ISA/210) and Written Opinion (PCT/ISA/237) for International Application No. PCT/US2014/071872 dated Mar. 24, 2015.

* cited by examiner

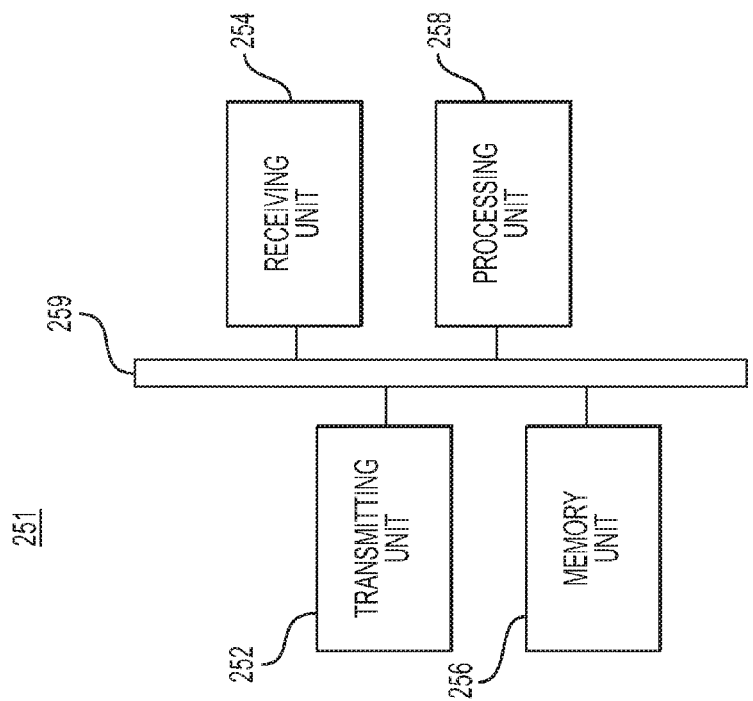
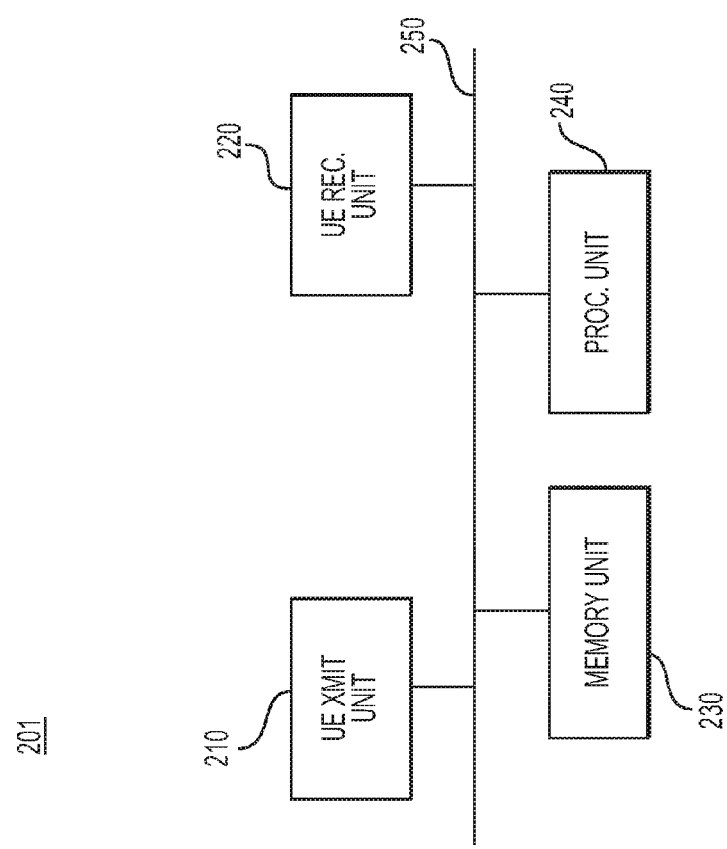
FIG. 2B
FIG. 2A

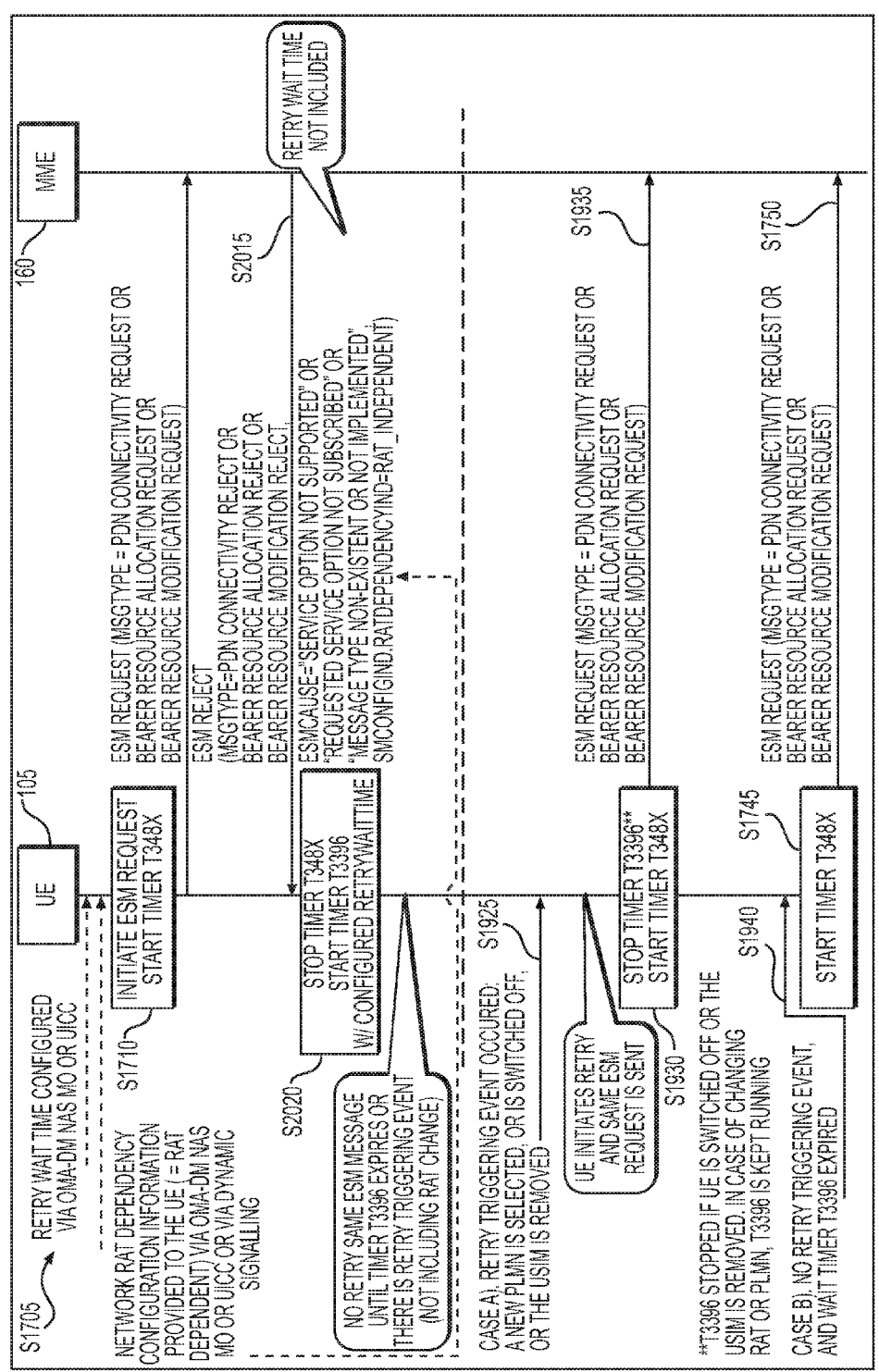

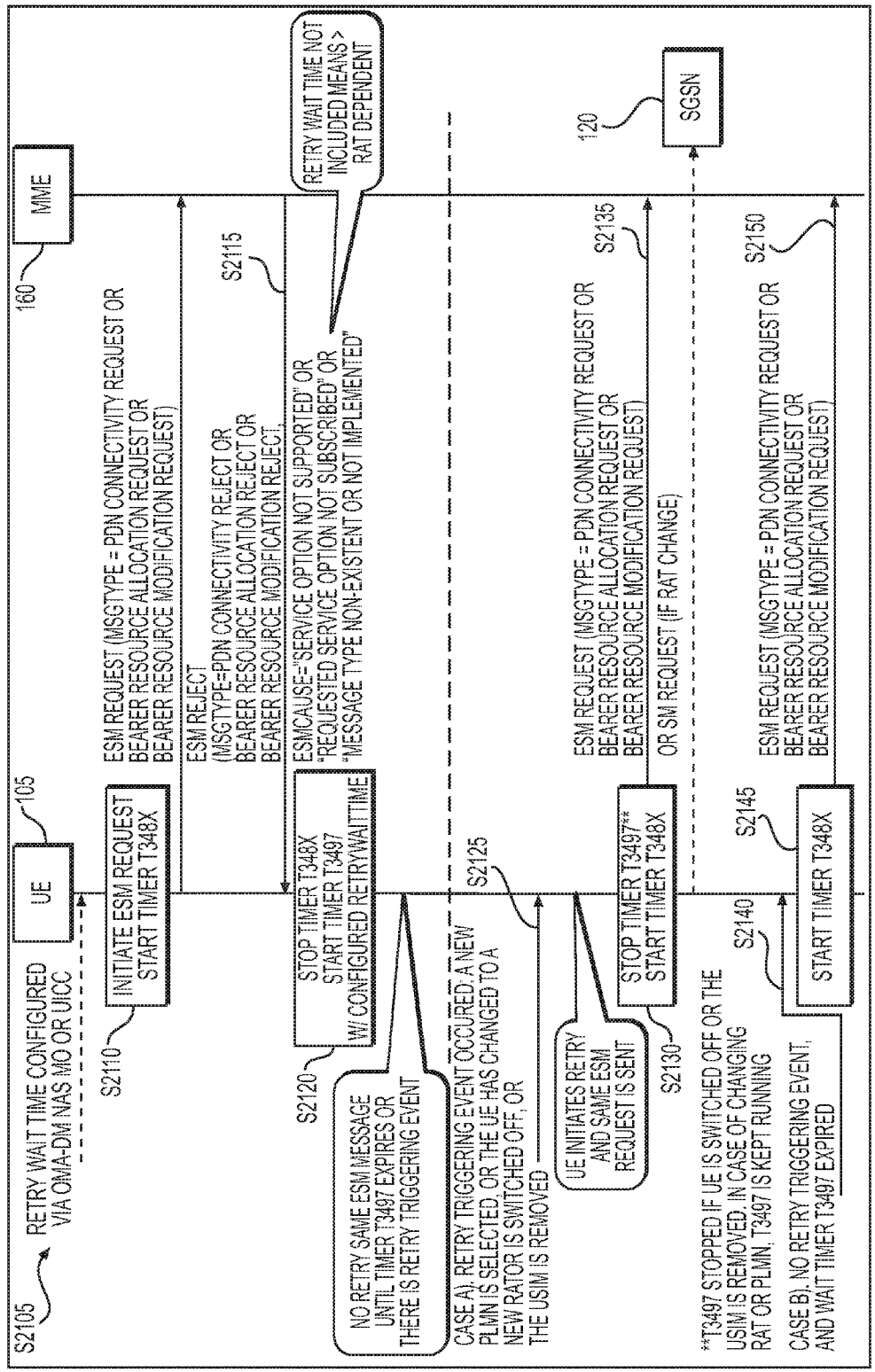

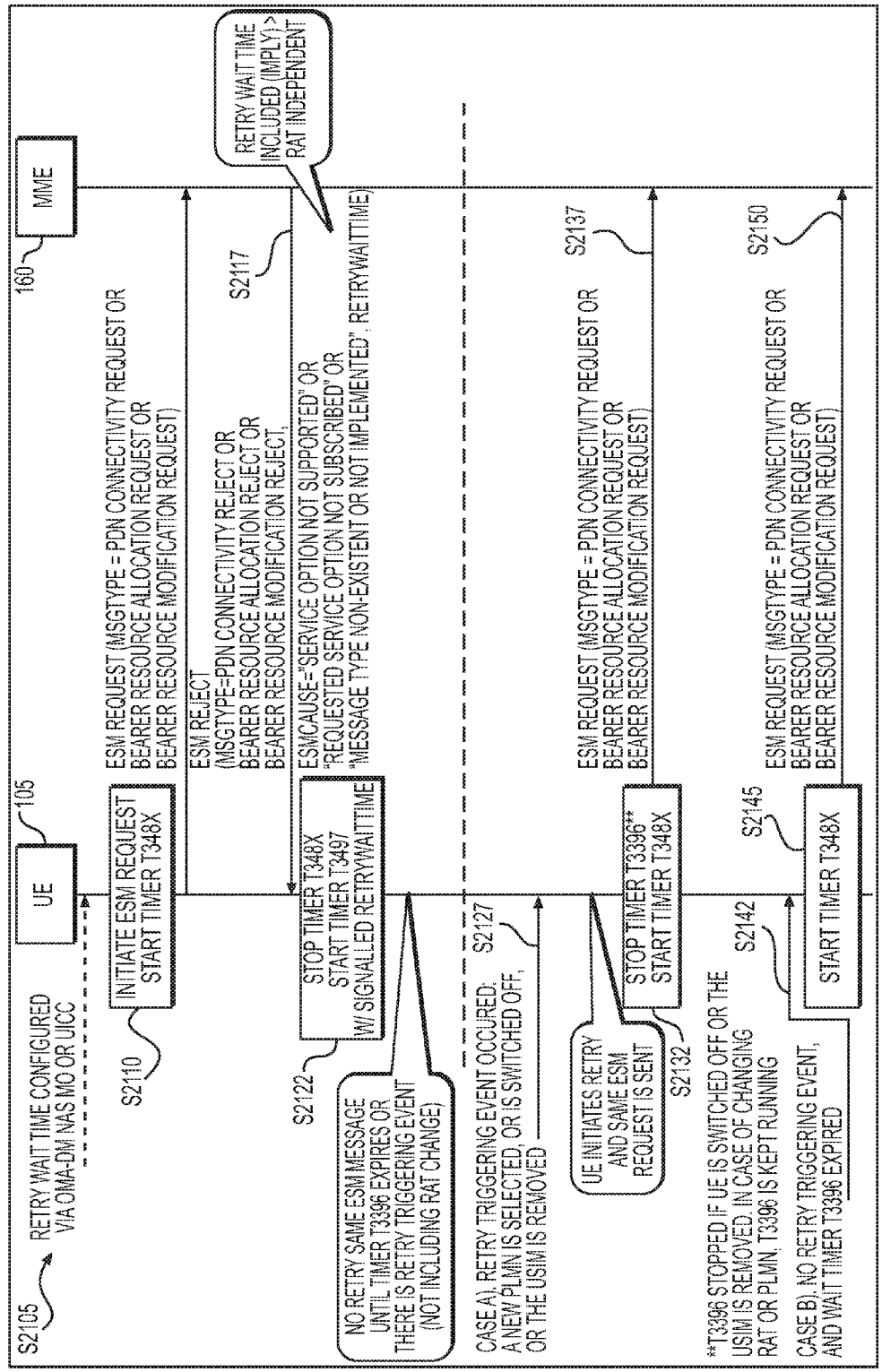

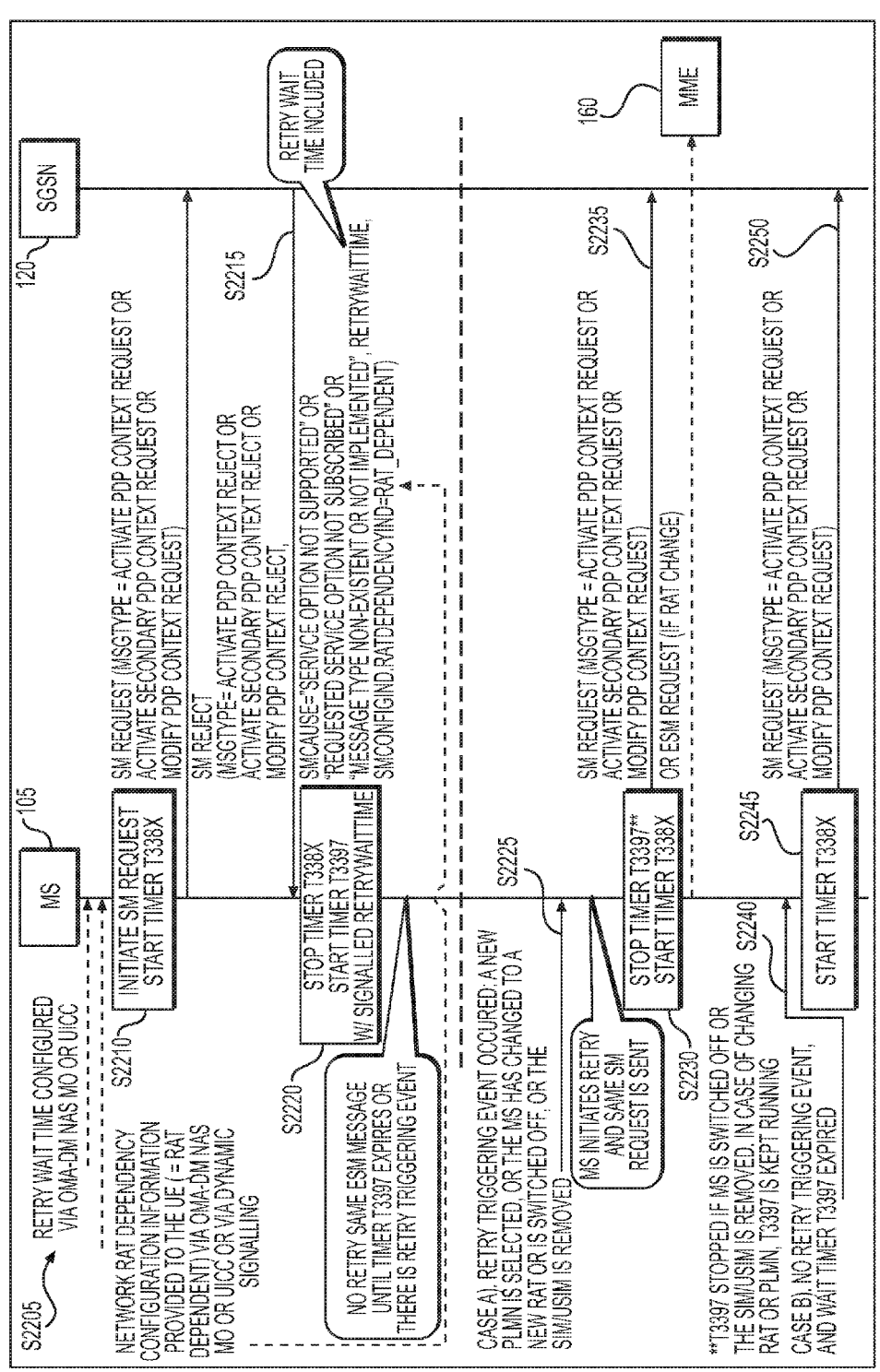

METHOD AND APPARATUS FOR RESTRICTING UE SESSION MANAGEMENT PROCEDURE RETRY AFTER NETWORK REJECTION

CROSS-REFERENCE TO RELATED APPLICATIONS

This non-provisional application claims the benefit of priority under 35 U.S.C. §119(e) to U.S. Provisional Application No. 61/919,951, filed on Dec. 23, 2013, and U.S. Provisional Application No. 62/070,119, filed on Aug. 15, 2014 the entire contents of each of which are incorporated herein by reference.

BACKGROUND

1. Field

This invention relates generally to mobile communication systems, and more specifically to a manner of controlling UE (user equipment) session management messages in an attempt to reduce or eliminate inefficient traffic.

2. Related Art

In a 3GPP packet data network, UE retry signaling results from rejection of evolved packet system (EPS) session management (ESM)/session management (SM) procedures. These ESM/SM procedures can be PDN CONNECTIVITY REQUEST, BEARER RESOURCE ALLOCATION REQUEST, BEARER RESOURCE MODIFICATION REQUEST, ACTIVATE PDP CONTEXT REQUEST, ACTIVATE SECONDARY PDP CONTEXT REQUEST and MODIFY PDP CONTEXT REQUEST. Once those ESM or SM messages are rejected e.g. with cause value #32 (service option not supported), #33 (requested service option not subscribed), #8 (operator determined barring), #27 (missing or unknown APN), #97 (message type non-existent or not implemented), etc., a UE may re-attempt the failed ESM/SM procedures.

SUMMARY

According to one or more example embodiments, a method of operating a user equipment (UE) in a wireless communications network may include sending, from the UE to a first network element, a first packet service session management request message indicating a request of a first session management service type for at least one of establishing a new packet data session or modifying an existing packet data session, the first packet service session management request message being sent for a first access point name (APN); receiving, at the UE, a rejection message, the rejection message indicating the request of the first session management service type has been rejected; and performing a retry operation after receiving the rejection message, the retry operation including sending, from the UE, a second packet service session management request message of the first session management service type towards the first APN, the retry operation being prevented by the UE such that the retry operation is not performed by the UE until after at least one of, an expiration of a retry timer of the UE, or detection, at the UE, of a retry trigger event.

According to one or more example embodiments, a user equipment (UE) may include a processing unit including a processor, the UE being programmed to perform, with the processor, operations including, sending, from the UE to a first network element, a first packet service session management request message indicating a request of a first session management service type for at least one of establishing a new packet data session or modifying an existing packet data session, the first packet service session management request message being sent towards a first access point name (APN); receiving, at the UE, a rejection message, the rejection message indicating the request for of the first session management service type has been rejected; and performing a retry operation after receiving the rejection message, the retry operation including sending, from the UE, a second packet service session management request message of the first session management service type towards the first APN, the retry operation being prevented by the UE such that the retry operation is not performed by the UE until after at least one of, an expiration of a retry timer of the UE, or detection, at the UE, of a retry trigger event.

BRIEF DESCRIPTION OF THE DRAWINGS

At least some example embodiments will become more fully understood from the detailed description provided below and the accompanying drawings, wherein like elements are represented by like reference numerals, which are given by way of illustration only and thus are not limiting of example embodiments and wherein:

FIG. 2A is a diagram illustrating an example structure of a user equipment (UE) according to at least one example embodiment.

FIG. 2B is a diagram illustrating an example structure of a network element according to at least one example embodiment.

FIG. 20 illustrates a 4G EPC network example of providing UE retry restriction using an RAT dependency indicator indicating an RAT independent mode and no retry wait time value in an ESM reject message.

FIGS. 21A and 21B illustrate 4G EPC network examples of providing UE retry restriction using the absence or presence of a retry wait time value in an ESM reject message as a RAT dependency indicator indicating an RAT independent mode.

FIG. 22 illustrates a GPRS network example of providing UE retry restriction using an RAT dependency indicator indicating an RAT independent mode and a retry wait time in an SM reject message.

DETAILED DESCRIPTION OF EXAMPLE EMBODIMENTS

Figure 1:
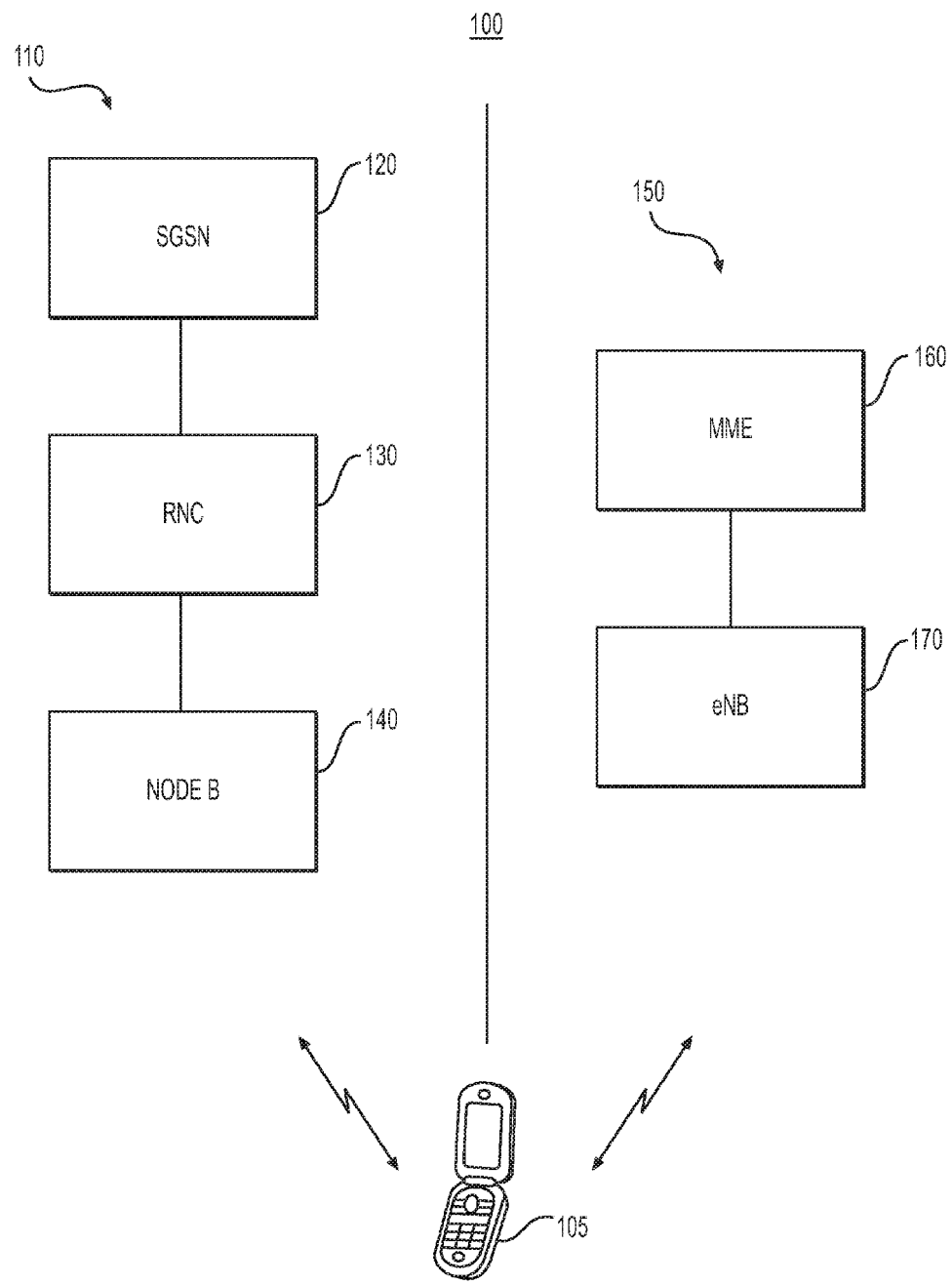
FIG. 1 is a diagram illustrating a portion of a wireless communications network according to at least one example embodiment.

Various example embodiments will now be described more fully with reference to the accompanying drawings in which some example embodiments are shown.

Detailed illustrative embodiments are disclosed herein. However, specific structural and functional details disclosed herein are merely representative for purposes of describing at least some example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term user equipment (UE) may be considered synonymous to, and may hereafter be occasionally referred to, as a terminal, mobile unit, mobile device, mobile station, mobile user, access terminal (AT), subscriber, user, remote station, access terminal, receiver, etc., and may describe a remote user of wireless resources in a wireless communication network. The term evolved Node B (eNB) may be considered synonymous to and/or referred to as a base transceiver station (BTS), base station (BS), Home eNB (HeNB), access point (AP), etc. and may describe equipment that provides the radio baseband functions for data and/or voice connectivity between a network and one or more users, for example, in a long term evolution (LTE) network. The term Node B may be considered synonymous to and/or referred to as a base transceiver station (BTS), base station (BS), access point (AP), etc. and may describe equipment that provides the radio baseband functions for data and/or voice connectivity between a network and one or more users, for example, in a general packet radio service (GPRS) network.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes (e.g., a serving general packet radio service (GPRS) support node (SGSN) or mobility management entity (MME) shown in FIG. 1). Such existing hardware may include one or more digital signal processors (DSPs), application-specific-integrated-circuits (ASICs), field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

As is discussed above, when evolved packet system (EPS) session management (ESM) messages or session management (SM) messages are rejected with, for example, any 3GPP specific session management cause value including, for example, #32, #33, #8, #27 or #97 (as defined, for example, by 3GPP TS24.008 V12.7.0 (2014-09), the entire contents of which is incorporated herein, by reference), a UE may perform retry operations. The UE may perform the retry operations aggressively, which results in a significant amount of additional signaling. This additional signaling consumes network resources needlessly and is thus undesirable.

As used herein, the term retry operation refers to an operation in which a UE attempts to send, to a network element, a message, including for example an ESM or SM request message, that was previously rejected by a network element, examples of which include an MME or SGSN.

For example, in some networks, approximately 80% of Create-PDP-Request messages may be a result of phones stuck in infinite loops sending Create-PDP-Request and getting Reject Cause #33: requested service option not subscribed back from the network.

Accordingly, it is desirable from network resource efficiency usage point of view to restrict UE retry in these rejection scenarios. For these cause values, retrying the same request for the same access point name (APN) under the same radio access technology (RAT) and public land mobile network (PLMN) combination may not be effective. If the MME has previously already rejected the same session management request from the UE and if other processing conditions (like APN, RAT, PLMN) have not been changed, or the UE has not changed subscription (which requires a power cycle), repeating the same SM requests that had previously been rejected will be virtually guaranteed to receive the same rejection again. To prevent a network from being overloaded with unnecessary retry requests, retry restriction may be applied so that the UE does not initiate the same request unless some change in processing conditions could potentially lead to processing result other than another rejection.

One possible solution of the problem described above would be to introduce retry restriction on the UE so that when the UE is rejected, the UE will not automatically retry the session management request that was previously sent by the UE for the same APN until certain retry conditions have been met.

A problem with this approach, however, is that the session management request may be restricted for very long time if the UE is static (not moving to new PLMN or new RAT or new cells). In this case, since the UE will not retry the session management request, there will be no event pegging in operator's network. Then, it is almost impossible for an operator to determine what the problem really is. Depending on operator network, some operators may wish to take some network actions to resolve the issue, for example, e.g. by modifying network node behavior, correcting a configuration mismatch, or shutting the UEs down if that is the better solution. For these operators, it would be helpful to let the UE continue to retry at a reasonable rate of signaling.

In one embodiment, a solution is proposed to allow the flexibility for the operator to detect session management issues and, at the same time, to prevent an abundance network signaling in a case where UE session management requests are rejected by the network due to a rejections cause including, for example, "service option not supported", "requested service option not subscribed" or "message type non-existent or not implemented". According to one or more example embodiments, a new mobile session management retry handling is introduced for at least the above-referenced rejection cases so that the UE's unnecessary and abundant retry signaling is restricted both by a set of retry triggering criteria and by a configurable retry wait timer that is signaled to UE by the network during rejection. For example, according to one or more example embodiments, the UE will not automatically retry a session management request that was previously sent by the UE for the same APN until certain retry conditions have been met Consequently, the UE is not prevented from retrying rejected ESM or SM messages in all cases, but the UE is restricted such that the retry attempts are made in a meaningful way by preventing useless retries (i.e., retries that have a high probability of failure due to lack of change in the circumstances that caused the previous failure). Accordingly, network overload caused by copious unnecessary retry requests is prevented while the operator is still able to monitor the rejection situation if desired. As will be discussed in greater detail below with reference to FIGS. 4-30, in accordance with one or more example embodiments, the UE is allowed to retry as soon as there is a change of condition (referred as "retry triggering criteria") that could potentially yield different processing result, or if operator dependent/pre-configured "retry wait time" has elapsed.

The term "retry"/"retires"/"retried", as used herein with reference to a UE (e.g., the UE retries . . . ), refers to the UE trying to send an ESM or SM message (or perform an ESM/SM procedure) of a particular session management service type for a particular APN again after receiving a rejection message in response to a previous attempt to send an ESM or SM message (or perform an ESM/SM procedure) of the same session management service type for the same APN. As used herein, sending a message "for" an APN refers to sending the message towards the APN.

Further, for the purpose of simplicity, five example ESM/SM cause values, #32, #33, #8, #27 and #97, are referenced herein. However, according to one or more example embodiments, the operations described herein with reference to cause values #32, #33 #8, #27 and #97 may apply to any 3GPP specific session management cause value. For example, according to one or more example embodiments, operations described herein as being performed in response to receiving an ESM/SM rejection message or ESM/SM status message including ESM/SM cause value #32, #33, #8, #27 or #97 may be performed in response to receiving an ESM/SM rejection or status message including any 3GPP specific session management cause value. According to one other example embodiment, operations described herein as being performed in response to receiving an ESM/SM rejection message or ESM/SM status message including ESM/SM cause value #32, #33, #8, #27 or #97 may be performed in response to receiving an ESM/SM rejection or status message including any of a subset, but not all, of the 3GPP specific session management cause values, where the subset of values is chosen in accordance with the preferences of the network operator.

Overview of Network Architecture

FIG. 1 is a diagram illustrating a portion of a wireless communications network 100. Referring to FIG. 1, according to one or more example embodiments, the wireless communications network 100 may include two different networks following two different wireless communications protocols. For example, as is illustrated in FIG. 1, the wireless communications network 100 may include a first network following the general packet radio service (GPRS) protocol, GPRS network 110, and a second network following the long term evolution (LTE) protocol, LTE network 150. A user equipment (UE) 105 may be attached to at least one of the GPRS network 110 and the LTE network 150.

The GPRS network 110 may include a serving general packet radio service (GPRS) support node (SGSN) 120, a radio network controller RNC 130, and a NodeB 140. The SGSN 120 is connected to the RNC 130. Though only one RNC is illustrated, the SGSN 120 may be connected to multiple RNCs. The SGSN 120 may handle operations including routing of data packets to RNCs connected to the SGSN 120.

The RNC 130 is connected to the NodeB 140. Though only one Node B is illustrated in FIG. 1, the RNC 130 may be connected to multiple NodeBs. The RNC 130 may perform operations including controlling Node Bs connected to the RNC 130.

The NodeB may provide UEs within a range of the NodeB 140 with wireless access to the GPRS network 110 such that the UEs can send data to, and receive data from, the GPRS network 110.

The GPRS network 100 may also include additional GPRS core network components not shown in FIG. 1.

The LTE network 150 includes a mobility management entity (MME) 160 and an evolved NodeB (eNB) 170.

The MME 160 is connected to the eNB 170. Though only one eNB 170 is illustrated in FIG. 1, the MME 160 may be connected to multiple eNBs. Further, the eNB 170 may provide UEs within a range of the eNB 170 with wireless access to the LTE network 150 such that the UEs can send data to, and receive data from the LTE network 150. The MME 160 may handle operations including managing the movement of UEs throughout different areas covered by the LTE network 150.

Example Network Element and UE Structures

FIG. 2A is a diagram illustrating an example structure of a UE 201. According to example embodiments, any or all UEs in the communications network 100 may have the same structure and operation as UE 201 described below.

The UE 201 may include, for example, a UE transmitting unit 210, a UE receiving unit 220, a memory unit 230, a processing unit 240, and a data bus 250.

The UE transmitting unit 210, UE receiving unit 220, memory unit 230, and processing unit 240 may send data to and/or receive data from one another using the data bus 250. The UE transmitting unit 210 is a device that includes hardware and any necessary software for transmitting wireless signals on an uplink (reverse link) channel including, for example, data signals or control signals, via one or more wireless connections to other wireless devices (e.g., eNBs, other UEs, etc.).

The UE receiving unit 220 is a device that includes hardware and any necessary software for receiving wireless signals on a downlink (forward link) channel including, for example, data signals or control signals, via one or more wireless connections to other wireless devices (e.g., eNBs, other UEs, etc.).

The memory unit 230 may be any storage medium capable of storing data including magnetic storage, flash storage, etc.

The processing unit 240 may be any device capable of processing data including, for example, a processor. The term 'processor', as used herein, refers to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multiprocessor, an application-specific integrated circuit (ASIC), and a field programmable gate array (FPGA).

According to at least one example embodiment, any operations described herein, for example with reference to any of FIGS. 1-26B, as being performed by a UE may be performed by an electronic device having the structure of the UE 201 illustrated in FIG. 2A. For example, according to at least one example embodiment, the UE 201 may be programmed, in terms of software and/or hardware, to perform any or all of the functions described herein as being performed by a UE.

Consequently, each of the UEs described herein may be embodied as special purpose computers through software and/or hardware programming.

Examples of the UE 201 being programmed, in terms of software, to perform any or all of the functions described herein as being performed by any of the UEs described herein will now be discussed below. For example, the memory unit 230 may store a program including executable instructions corresponding to any or all of the operations described herein with reference to FIGS. 1-26B as being performed by a UE. According to at least one example embodiment, additionally or alternatively to being stored in the memory unit 230, the executable instructions may be stored in a computer-readable medium including, for example, an optical disc, flash drive, SD card, etc., and the UE 201 may include hardware for reading data stored on the computer readable-medium. Further, the processing unit 240 may be a processor configured to perform any or all of the operations described herein with reference to FIGS. 1-26B as being performed by a UE, for example, by reading and executing the executable instructions stored in at least one of the memory unit 230 and a computer readable storage medium loaded into hardware included in the UE 201 for reading computer-readable mediums.

Examples of the UE 201 being programmed, in terms of hardware, to perform any or all of the functions described herein as being performed by a UE will now be discussed below. Additionally or alternatively to executable instructions corresponding to the functions described with reference to FIGS. 1-26B as being performed by a network element being stored in a memory unit or a computer-readable medium as is discussed above, the processing unit 240 may include a circuit that has a structural design dedicated to performing any or all of the operations described herein with reference to FIGS. 1-26B as being performed by a UE. For example, the above-referenced circuit included in the processing unit 240 may be a FPGA or ASIC physically programmed, through specific circuit design, to perform any or all of the operations described with reference to FIGS. 1-26B as being performed by a UE.

FIG. 2B is a diagram illustrating an example structure of a network element 251. According to example embodiments, any or all eNBs in the communications network 100, including for example the SGSN 120, RNC 130, NodeB 140, MME 160, and eNB 170, may have the structure and operation described below with respect to network element 251.

Referring to FIG. 2B, the network element 251 may include, for example, a data bus 259, a transmitting unit 252, a receiving unit 254, a memory unit 256, and a processing unit 258.

The transmitting unit 252, receiving unit 254, memory unit 256, and processing unit 258 may send data to and/or receive data from one another using the data bus 259.

The transmitting unit 252 is a device that includes hardware and any necessary software for transmitting signals including, for example, control signals or data signals via one or more wired and/or wireless connections to one or more other network elements in communications network 105. The transmitting unit may also transmit signals to UEs.

The receiving unit 254 is a device that includes hardware and any necessary software for receiving wireless signals including, for example, control signals or data signals via one or more wired and/or wireless connections to one or more other network elements in the communications network 100. The receiving unit may also receive signals from UEs.

The memory unit 256 may be any device capable of storing data including magnetic storage, flash storage, etc.

The processing unit 258 may be any device capable of processing data including, for example, a processor.

According to at least one example embodiment, any operations described herein, for example with reference to any of FIGS. 1-26B, as being performed by a network element may be performed by an electronic device having the structure of the network element 251 illustrated in FIG. 2B. Examples of network elements include a SGSN, RNC, NodeB, MME, or eNB. For example, according to at least one example embodiment, the network element 251 may be programmed, in terms of software and/or hardware, to perform any or all of the functions described herein as being performed by a network element. Consequently, each of the network elements described herein may be embodied as special purpose computers through software and/or hardware programming.

Examples of the network element 251 being programmed, in terms of software, to perform any or all of the functions described herein as being performed by any of the network elements described herein will now be discussed below. For example, the memory unit 256 may store a program including executable instructions corresponding to any or all of the operations described herein with reference to FIGS. 1-26B as being performed by a network element. According to at least one example embodiment, additionally or alternatively to being stored in the memory unit 256, the executable instructions may be stored in a computer-readable medium including, for example, an optical disc, flash drive, SD card, etc., and the network element 251 may include hardware for reading data stored on the computer readable-medium. Further, the processing unit 258 may be a processor configured to perform any or all of the operations described herein with reference to FIGS. 1-26B as being performed by a network element, for example, by reading and executing the executable instructions stored in at least one of the memory unit 256 and a computer readable storage medium loaded into hardware included in the network element 251 for reading computer-readable mediums.

Examples of the network element 251 being programmed, in terms of hardware, to perform any or all of the functions described herein as being performed by a network element will now be discussed below. Additionally or alternatively to executable instructions corresponding to the functions described with reference to FIGS. 1-26B as being performed by a network element being stored in a memory unit or a computer-readable medium as is discussed above, the processing unit 258 may include a circuit that has a structural design dedicated to performing any or all of the operations described herein with reference to FIGS. 1-26B as being performed by a network element. For example, the above-referenced circuit included in the processing unit 258 may be a FPGA or ASIC physically programmed, through specific circuit design, to perform any or all of the operations described with reference to FIGS. 1-26B as being performed by a network element.

Providing UE Retry Restriction for 4G Evolved Packet Core (EPC) Network

One or more example embodiments of providing UE retry restriction for a 4G EPC network will now be discussed below with reference to FIGS. 3A-8 and communications network 100 in FIG. 1.

When session management requests (PDN CONNECTIVITY REQUEST, BEARER RESOURCE ALLOCATION REQUEST, BEARER RESOURCE MODIFICATION REQUEST) requested by a mobile (e.g., the UE 105) are rejected by the network (e.g., the LTE network 150), and a reject message is sent back with ESM cause #32 "service option not supported" or #33 "requested service option not subscribed" or #8 "operator determined barring) or #27 (missing or unknown APN) or #97 "message type non-existent or not implemented", an MME (e.g., the MME 160) can choose to simply restrict the mobile retry based on a set of retry triggering criteria including, for example, the mobile selecting a new PLMN; the mobile moving to a new RAT; and the mobile switching off or the subscriber identity module (SIM)/universal SIM (USIM) being removed. According to one or more example embodiments, if any of the retry triggering conditions are met, the mobile can retry, as will be discussed in greater detail below with reference to FIG. 3A.

Figure 3A:
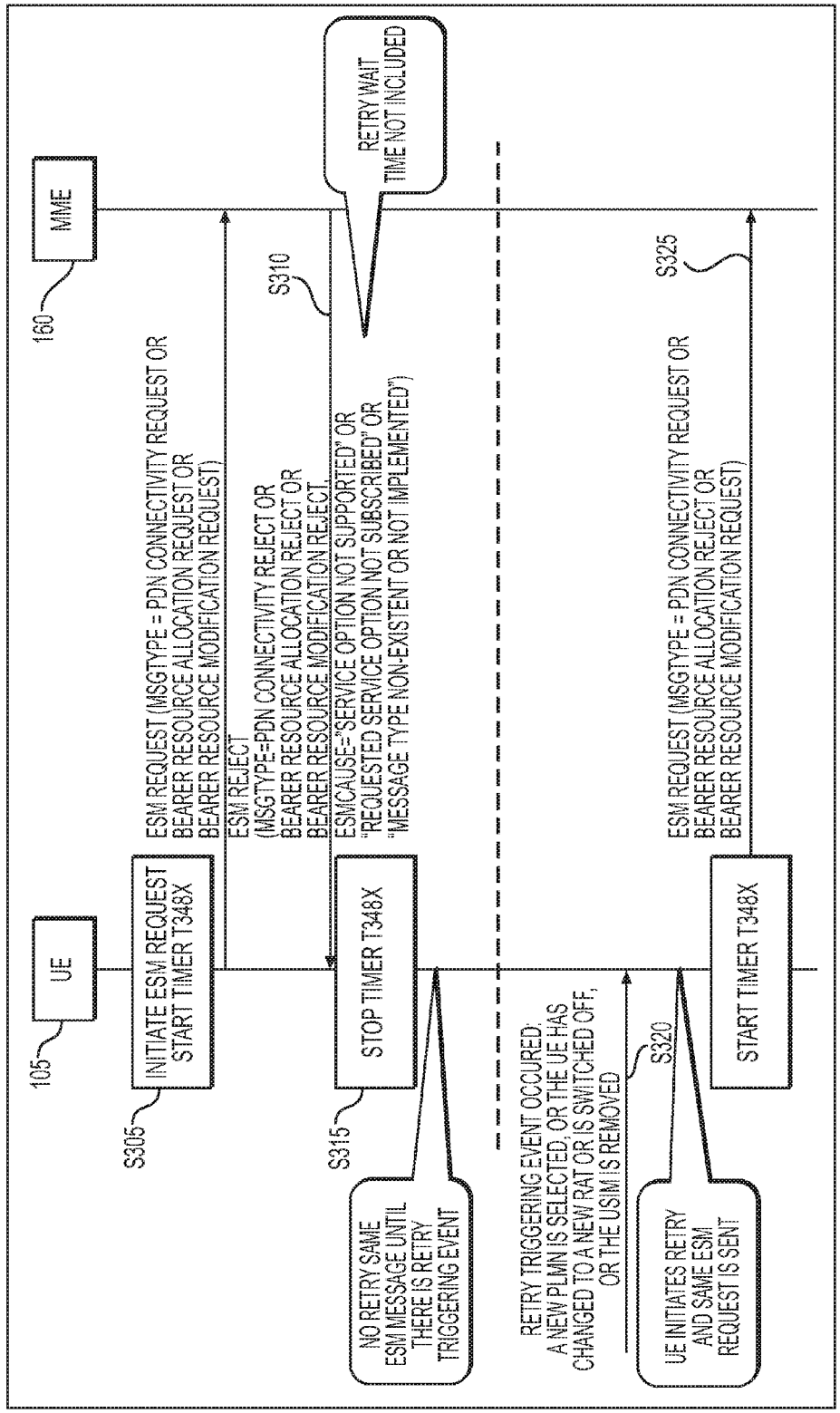
FIG. 3A illustrates a 4G evolved packet core (EPC) network example of providing UE retry restriction using an ESM reject message without a retry wait time according to at least one example embodiment.

FIG. 3A illustrates a 4G EPC network example of providing UE retry restriction using an ESM reject message without a retry wait time.

Referring to FIG. 3A, in step S305 the UE 105 may initiate an ESM request start timer T348x and send an ESM request message to the MME 160. The ESM request message may have a message type value of, for example, PDN CONNECTIVITY REQUEST, BEARER RESOURCE ALLOCATION REQUEST, or BEARER RESOURCE MODIFICATION REQUEST.

In step S310, the MME 160 may send an ESM reject message to the UE 105. The ESM reject message may have a message type value of, for example, PDN CONNECTIVITY REJECT, BEARER RESOURCE ALLOCATION REJECT, or BEARER RESOURCE MODIFICATION REJECT. The ESM reject message may have an ESM cause value of, for example, "service option not supported", "requested service option not subscribed", or "message type non-existent or not implemented". The ESM reject message sent in step S310 may not include a retry wait time value.

In step S315, the UE 105 stops timer T348x. According to one or more example embodiments, the UE 105 will not attempt a retry operation until a retry triggering event is detected.

In step S320, the UE 105 detects a retry triggering event including, for example, the UE 105 selecting a new PLMN; the UE 105 moving to a new RAT; the UE 105 switching off, or the SIM/USIM of the UE 105 being removed.

In step S325, as a result of detecting the retry triggering event in step S320, the UE 105 participates in a retry operation by sending another ESM request to the MME 160 and starts the timer T348x. The ESM request sent in step S320 may be of the same type as that described above with respect to step S305. Further, in the case that the retry triggering event detected in step S320 is a RAT change indicating that the UE 105 is changing from the LTE network 150 to the GPRS network 110, the UE 105 sends the ESM message to the SGSN 170 in step S325, instead of, sending the ESM request to the MME 160.

Accordingly, in the example shown in FIG. 3A, after receiving a ESM reject message from the MME 160 in step S310, the UE 105 does not attempt a retry operation by sending another ESM request message to the MME 160 until after a retry triggering event is detected in step S320.

In the example shown in FIG. 3A, no retry wait time is included in the ESM reject message sent by the MME 160 in step S310. However, according to example embodiments, in addition to the retry triggering criteria discussed above with respect to FIG. 3A, the MME 160 can choose to provide additional signaling indicating a retry wait time value to the UE 105 when the session management requests (PDN CONNECTIVITY REQUEST, BEARER RESOURCE ALLOCATION REQUEST, BEARER RESOURCE MODIFICATION REQUEST) are rejected by the network and the network wants to restrict the UE retry operations in a way that still allows a minimum of one retry operation in a given time interval provided by the network. In this case, the MME 160 includes a value for ESM retry wait timer (e.g. value for timer T3497) in the ESM reject message and mobile retry of the same ESM request is restricted by both the retry triggering criteria and the retry wait time. Inclusion of the ESM retry wait timer in the ESM reject message is illustrated in FIG. 3B.

Figure 3B:
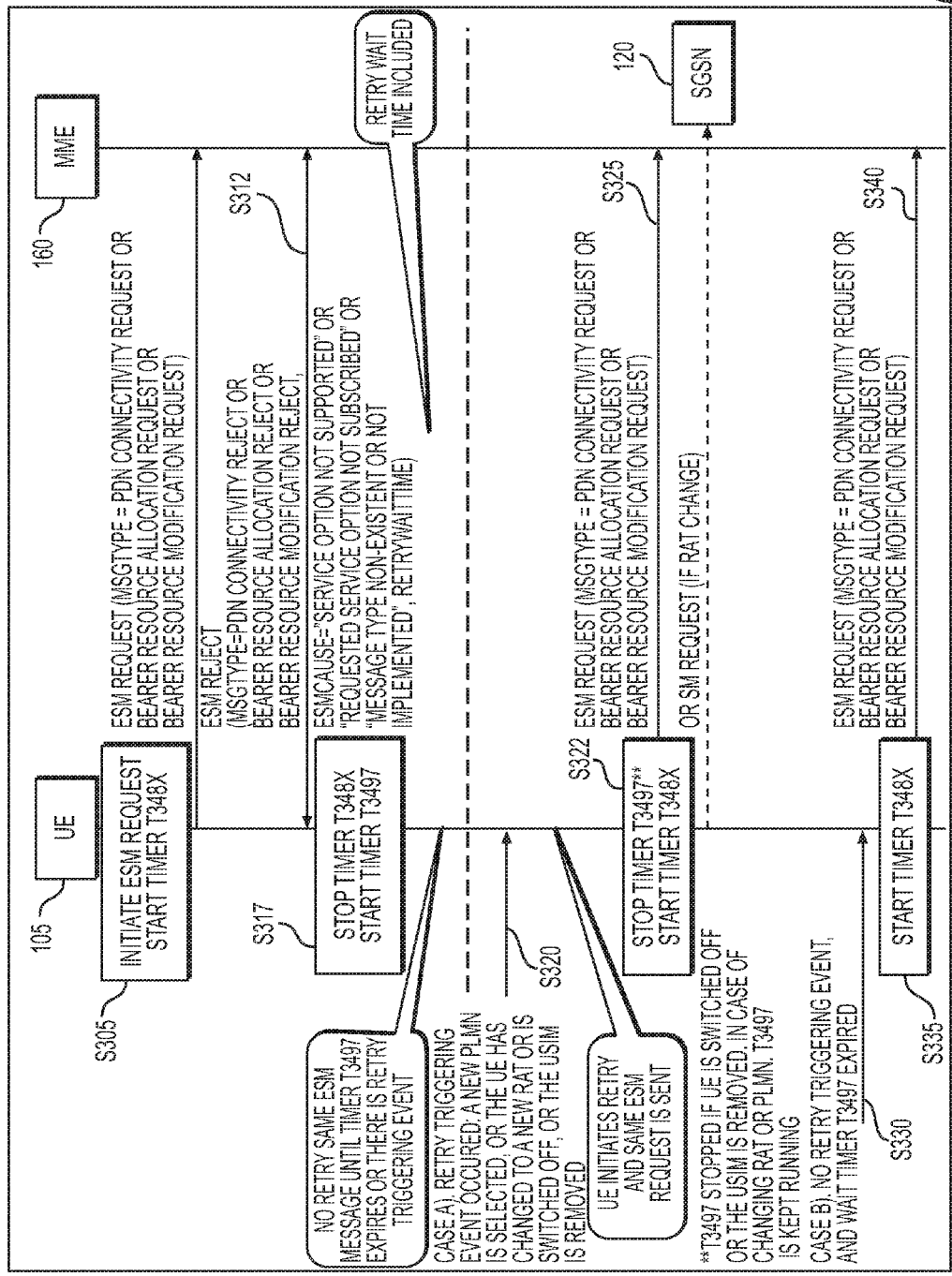
FIG. 3B illustrates a 4G EPC network example of providing UE retry restriction using an ESM reject message with a retry wait time according to at least one example embodiment.

FIG. 3B illustrates a 4G EPC network example of providing UE retry restriction using an ESM reject message with a ESM retry wait time.

As is shown in FIG. 3B, many of the operations in FIG. 3B are the same as those shown in FIG. 3A. The operations shown in FIG. 3B differ from those shown in FIG. 3A as follows. After step S305, the MME 160 sends an ESM reject message in step S312. The ESM reject message sent in step S312 is the same as that described above with respect to step S310 with the exception that the ESM reject message sent in step S312 additionally includes a ESM retry wait time value retryWaitTime. After step S312, in step S317 the UE 105 stops timer T348x and starts a ESM retry wait timer (e.g. timer T3497), which may be initialized by the UE 105 using the timer value retryWaitTime received in step S312 via the ESM status message. In the example shown in FIG. 3B, there are two types of events which can permit the UE 105 to participate in a retry operation.

With respect to the first type of event, the UE 105 may detect a triggering event in step S320 in the same manner discussed above with respect to FIG. 3A. If the triggering event is the UE changing RAT or PLMN, the ESM retry wait timer (e.g. timer T3497) is kept running in step S322. In case the trigger event is the UE switching off or the USIM removal, the UE 105 stops the ESM retry wait timer (e.g. timer T3497) in step S322. Next, in step S325, the UE 105 sends an ESM request message in the same manner discussed above with respect to FIG. 3A and starts the timer T348x in step S325.

With respect to the second type of event, if the UE 105 determines that the ESM retry wait timer (e.g. timer T3497) expired before the UE 105 detected any retry triggering event (S330), the UE does not perform steps S322 and S325, and, instead, the UE 105 starts the timer T348x in step S335 and attempts a retry operation by sending another ESM request message to the MME 160 in step S340.

As used herein, the act of a UE starting/stopping the timer T3497 in association with an ESM request of a particular ESM request type for a particular APN sent by the UE refers to the UE starting/stopping a T3497 timer instance for the particular ESM request type and the particular APN in a given PLMN.

According to one or more example embodiments, if the MME 160 receives, for example, from the UE 105, an EPS session management message with message type not defined or not implemented by the receiver and the message is ignored, and if the MME 160 decides to return an ESM STATUS message with cause #97 "message type non-existent or not implemented", then the MME 160 can choose to simply restrict the mobile retry of the same ESM procedure based on a set of retry triggering criteria including, for example, the mobile selecting a new PLMN; the mobile moving to a new RAT; and the mobile switching off or universal subscriber identity module (USIM) being removed. According to one or more example embodiments, if any of the retry triggering condition is met, the mobile can retry, as will be discussed in greater detail below with reference to FIG. 4A.

Figure 4A:
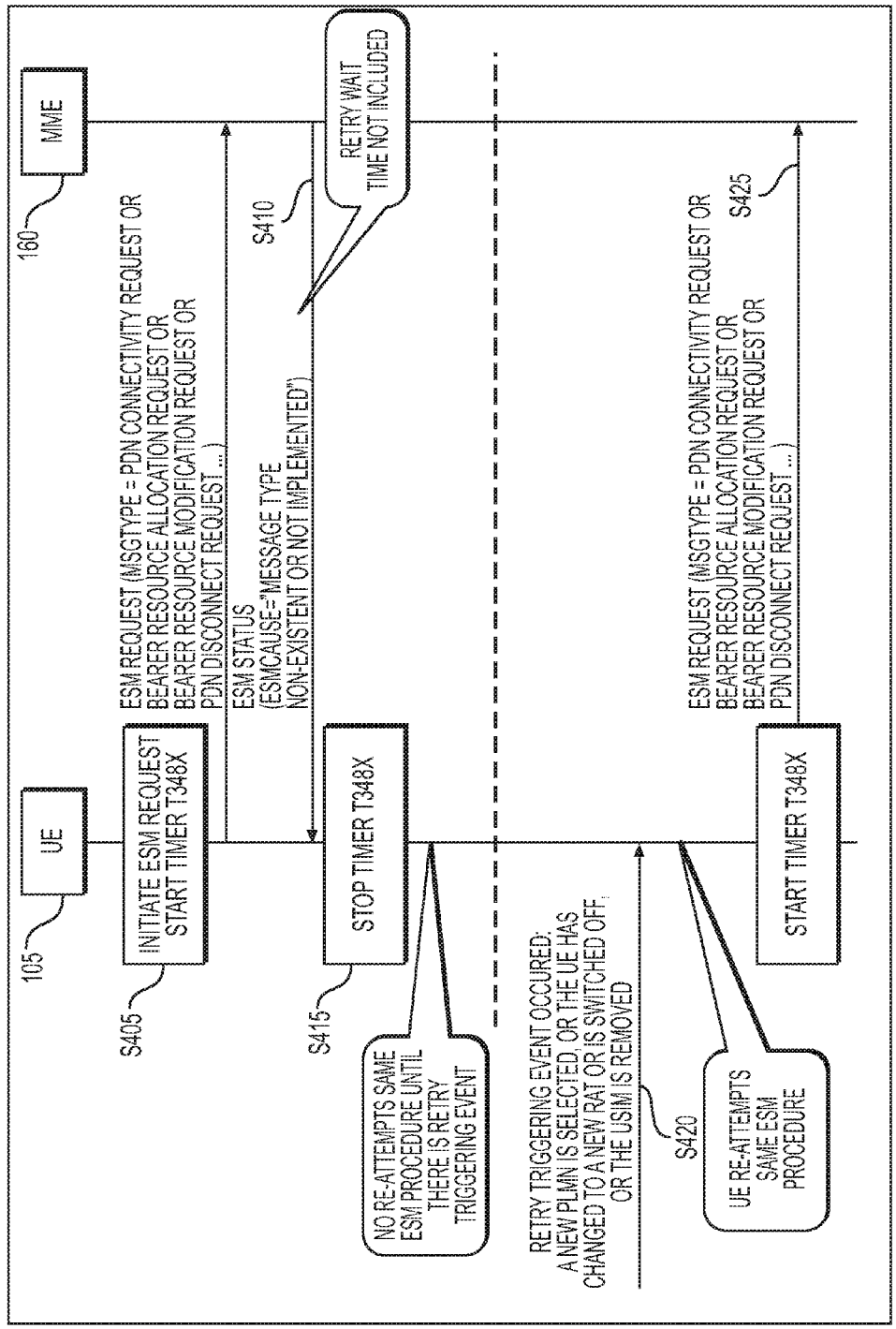
FIG. 4A illustrates a 4G EPC network example of providing UE retry restriction using an ESM status message without a retry wait time according to at least one example embodiment.

FIG. 4A illustrates a 4G EPC network example of providing UE retry restriction using an ESM status message without a retry wait time.

Referring to FIG. 4A, in step S405 the UE 105 may initiate an ESM request start timer T348x and send an ESM request message to the MME 160. The ESM request message may have a message type value of, for example, PDN CONNECTIVITY REQUEST, BEARER RESOURCE ALLOCATION REQUEST, BEARER RESOURCE MODIFICATION REQUEST, PDN DISCONNECT REQUEST.

In step S410, the MME 160 may send an ESM status message to the UE 105. The ESM status message may have a ESM cause value of, "message type non-existent or not implemented". The ESM status message sent in step S410 may not include a retry wait timer.

In step S415, the UE 105 stops timer T348x. According to one or more example embodiments, the UE 105 will not attempt a retry operation until a retry triggering event is detected.

In step S420, the UE 105 detects a retry triggering event including, for example, the UE 105 selecting a new PLMN; the UE 105 moving to a new RAT; the UE 105 switching off, or the SIM/USIM of the UE 105 being removed.

In step S425, as a result of detecting the retry triggering event in step S420, the UE 105 participates in a retry operation by sending another ESM request to the MME 160 and starts the timer T348x. The ESM request sent in step S420 may be of the same type as that described above with respect to step S405. Further, in the case that the retry triggering event detected in step S420 is a RAT change indicating that the UE 105 is changing from the LTE network 150 to the GPRS network 110, the UE 105 sends the ESM message to the SGSN 170 in step S425, instead of, sending the ESM request to the MME 160.

Accordingly, in the example shown in FIG. 4A, after receiving a ESM status message from the MME 160 in step S410, the UE 105 does not send another ESM request message to the MME 160 until after a retry triggering event is detected in step S420.

In the example shown in FIG. 4A, no retry wait time is included in the ESM status message sent by the MME 160 in step S410. However, according to example embodiments, in addition to the retry triggering criteria discussed above with respect to FIG. 4A, the MME 160 can also choose to provide additional signaling indicating a retry wait time value to the UE 105 if the network wants to restrict the mobile retry in a way to still allows a minimum one retry operation in a given time interval provided by the network. In this case, the MME 160 includes a value for ESM retry wait timer (e.g. timer T3497) in the ESM STATUS message and mobile retry of the same ESM request is restricted by both the retry triggering criteria and the retry wait time. Inclusion of the retry timer in the ESM status message is illustrated in FIG. 4B.

Figure 4B:
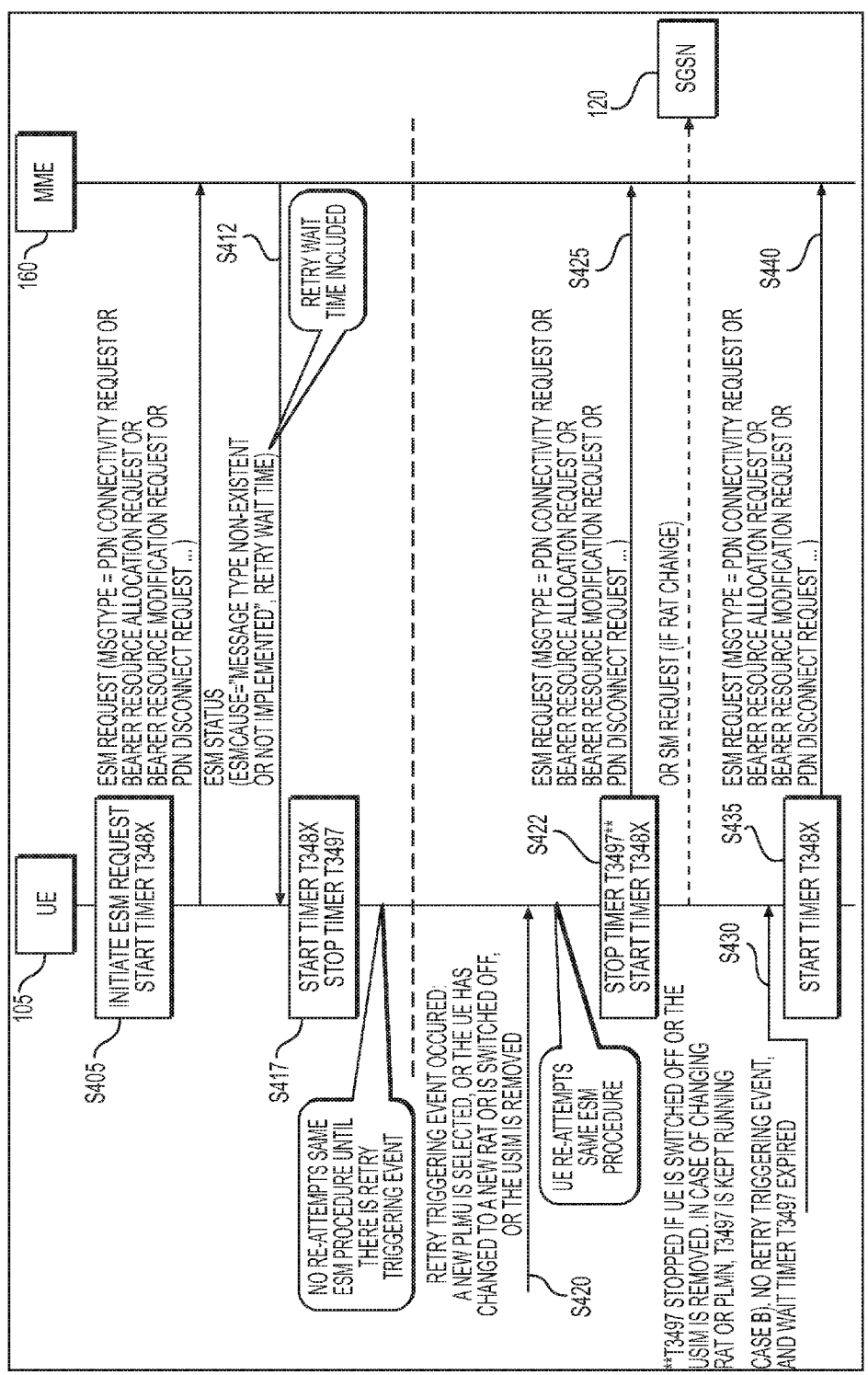
FIG. 4B illustrates a 4G EPC network example of providing UE retry restriction using an ESM status message with a retry wait time according to at least one example embodiment.

FIG. 4B illustrates a 4G EPC network example of providing UE retry restriction using an ESM status message with a retry wait time.

As is shown in FIG. 4B, many of the operations in FIG. 4B are the same as those shown in FIG. 4A. The operations shown in FIG. 4B differ from those shown in FIG. 4A as follows. After step S405, the MME 160 sends an ESM status message in step S412. The ESM status message sent in step S412 is the same as that described above with respect to step S410 with the exception that the ESM status message sent in step S412 additionally includes a retry wait time value retryWaitTime. After step S412, in step S417 the UE 105 stops timer T348x and starts a ESM retry wait timer (e.g. timer T3497), which may be initialized by the UE 105 using the timer value retryWaitTime received in step S412 via the ESM status message. In the example shown in FIG. 4B, there are two types of events which can permit the UE 105 to participate in a retry operation.

With respect to the first type of event, the UE 105 may detect a retry triggering event in step S420 in the same manner discussed above with respect to FIG. 4A. If the triggering event is the UE changing RAT or PLMN, the ESM retry wait timer (e.g. timer T3497) is kept running in step S422. In case the trigger event is the UE switching off or the USIM removal, the UE 105 stops the ESM retry wait timer (e.g. timer T3497) in step S422. Next, in step S425, the UE 105 sends an ESM request message in the same manner discussed above with respect to FIG. 4A and starts the timer T348x in step S425.

With respect to the second type of event, if the UE 105 determines that the ESM retry wait timer (e.g. timer T3497) expired before the UE 105 detected any retry triggering event (S430), the UE does not perform steps S422 and S425, and, instead, the UE 105 starts the timer T348x in step S435 and sends another ESM request message to the MME 160 in step S440.

In the examples for providing UE retry restriction for a 4G EPC network discussed above with respect to FIGS. 3A-4B, a new ESM retry wait timer value (e.g. timer value T3497) is introduced. According to one or more example embodiments, the ESM retry wait timer value (e.g. timer value T3497) may have the attributes shown below in table 1.

TABLE 1

| TIMER NUM. | TIMER VALUE | STATE | CAUSE OF START | NORMAL STOP |
|---|---|---|---|---|
| T3497 | operator dependent, default 12 min | PROCEDURE TRANSACTION PENDING | PDN CONNECTIVITY REJECT, BEARER RESOURCE MODIFICATION REJECT, BEARER RESOURCE ALLOCATION REJECT, ESM STATUS with a timer value for T3497 received | UE is switched off or SIM/USIM is removed |

The value of ESM retry wait timer (e.g. timer T3497) can be provided by an operator communications network 100 operator when a request to establish a packet data network (PDN) connection, a request to allocate bearer resources or a request to modify bearer resources is rejected by the network with ESM cause #32 "service option not supported" or #33 "requested service option not subscribed" or #8 (operator determined barring) or #27 (missing or unknown APN) or #97 "message type non-existent or not implemented", or when an ESM STATUS message is received. According to one or more example embodiments, the value of the ESM retry wait timer (e.g. timer T3497) when included with ESM cause #32 or #33 or #8 or #27 or #97 may be taken randomly or, alternatively, pseudo randomly, from an operator dependent range not greater than 72 hours. If the PDN CONNECTIVITY REJECT was sent together with an ATTACH REQUEST message and the ATTACH REJECT message was not integrity protected, a UE determining that value of the ESM retry wait timer (i.e. timer T3497) may use a random value from a default range of 15 mins to 30 mins.

Accordingly, if the EPS session management (ESM) cause value is #32 "service option not supported" or #33 "requested service option not subscribed" or #8 (operator determined barring) or #27 (missing or unknown APN) or #97 "Message type non-existent or not implemented", the network may include a value for ESM retry wait timer (e.g. timer T3497) in the following messages:

PDN CONNECTIVITY REJECT message;
BEARER RESOURCE ALLOCATION REJECT message; or
BEARER RESOURCE MODIFICATION REJECT message.

If the EPS session management (ESM) cause value is #97 "Message type non-existent or not implemented", the network may include a value for ESM retry wait timer (e.g. timer T3497) in the ESM STATUS message.

Tables 2-5 below show example contents of existing reject and status messages that are modified to include the ESM retry wait timer (i.e. timer T3497) according to one or more example embodiments. In tables 2-5, the underlined text represents the modifications made to the corresponding reject and status messages.

TABLE 2

PDN CONNECTIVITY REJECT message content

| IEI | Information Element | Type/Reference | Presence | Format | Length |
|---|---|---|---|---|---|
| | ... | | | | |
| | PDN connectivity reject message identity | Message type 9.8 | M | V | 1 |
| | ... | | | | |
| XX | ESM Retry Wait Time value (e.g. T3497 value) | GPRS timer 3 9.9.3.16a | O | TLV | 3 |

TABLE 3

BEARER RESOURCE ALLOCATION REJECT message content

| IEI | Information Element | Type/Reference | Presence | Format | Length |
|---|---|---|---|---|---|
| | ... | | | | |
| | Bearer resource allocation reject message identity | Message type 9.8 | M | V | 1 |
| | ... | | | | |
| XX | ESM Retry Wait Time value (e.g. T3497 value) | GPRS timer 3 9.9.3.16a | O | TLV | 3 |

TABLE 4

BEARER RESOURCE MODIFICATION REJECT message content

| IEI | Information Element | Type/Reference | Presence | Format | Length |
|---|---|---|---|---|---|
| | ... | | | | |
| | Bearer resource modification reject message identity | Message type 9.8 | M | V | 1 |
| | ... | | | | |
| XX | ESM Retry Wait Time value (e.g. T3497 value) | GPRS timer 3 9.9.3.16a | O | TLV | 3 |

TABLE 5

ESM STATUS message content

| IEI | Information Element | Type/Reference | Presence | Format | Length |
|---|---|---|---|---|---|
| | ... | | | | |
| | ESM status message identity | Message type 9.8 | M | V | 1 |
| | ... | | | | |
| XX | ESM Retry Wait Time value (e.g. T3497 value) | GPRS timer 3 9.9.3.16a | O | TLV | 3 |

Figure 5:
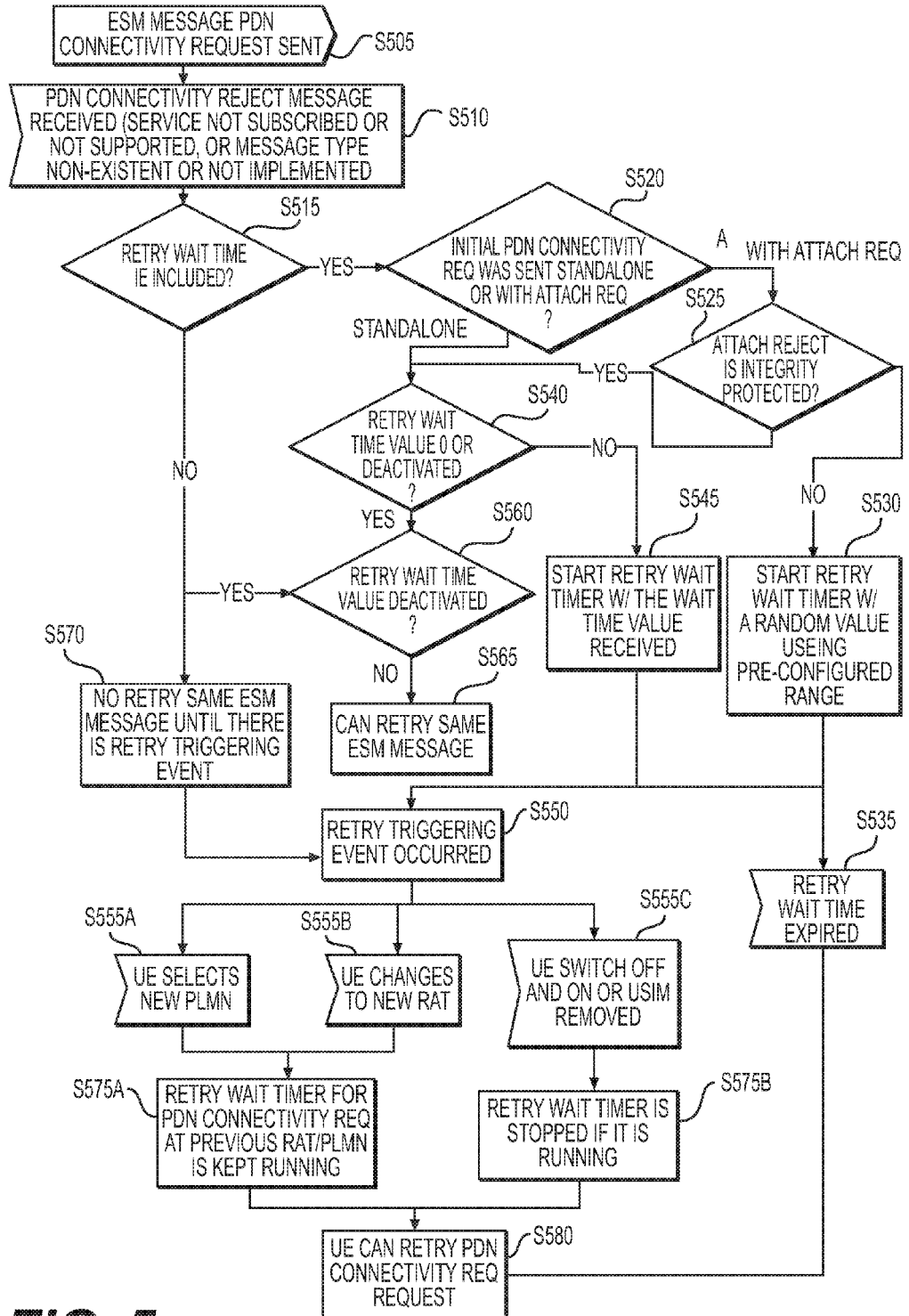
FIG. 5 is a flow chart illustrating an example of logic executed by a UE when handling a PDN CONNECTIVITY REJECT message in accordance with one or more example embodiments.

FIG. 5 is a flow chart illustrating an example of logic executed by a UE when handling a PDN CONNECTIVITY REJECT message in accordance with one or more example embodiments.

Referring to FIG. 5, in step S505, the UE sends a PDN CONNECTIVITY REQUEST message, which is an ESM message, for example, to the MME 160.

In step S510, the UE 105 receives a PDN CONNECTIVITY REJECT message, for example from the MME 160. The PDN CONNECTIVITY REJECT message may indicate that the PDN CONNECTIVITY REQUEST message of step S505 was rejected and may include an ESM cause value of, for example, #32 "service option not supported" or #33 "requested service option not subscribed" or #8 (operator determined barring) or #27 (missing or unknown APN) or #97 "message type non-existent or not implemented".

In step S515, if an ESM retry wait time (e.g., a value for timer T3497) was included in the PDN CONNECTIVITY REJECT message, the UE 105 proceeds to step S520.

In step S520, if the PDN CONNECTIVITY REJECT message was sent with an ATTACH REJECT message, the UE 105 proceeds to step S525.

In step S525, if the ATTACH REJECT message is not integrity protected, the UE 105 proceeds to step S530.

In step S530, the UE 105 starts the retry wait time with a random value and does not initiate an attach procedure for the same APN as that for which the PDN CONNECTIVITY REQUEST of step S505 was sent until an earliest one of the following happens: a retry triggering event occurs (S550) or the retry wait timer expires (S535).

After step S530, if the UE 105 detects that the retry wait timer has expired (S535), the UE 105 proceeds to step S580.

In step S580, the UE 105 performs a retry operation by sending a PDN CONNECTIVITY REQUEST message, for example, to the MME 160. The PDN CONNECTIVITY REQUEST sent in step S580 may be sent for the same APN as that for which the PDN CONNECTIVITY REQUEST of step S580 was sent.

After step S530, if the UE 105 detects that a retry triggering event has occurred (S550), the UE 105 proceeds to step S575A/S575B. As is illustrated in FIG. 5, the retry triggering event can be, for example, the UE 105 selecting a new PLMN (S555A), the UE 105 changing to a new RAT (S555B) or the UE 105 switching off or the SIM/USIM of the UE 105 being removed (S555C).

In step S575A, the UE 105 keeps the retry wait timer for PDN CONNECTIVITY REQUEST request at previous RAT/PLMN running if the retry wait timer is running, and proceeds to step S580. In step S575B, the UE 105 stops the retry wait timer if the retry wait timer is running, and proceeds to step S580.

If, in step S525, if the ATTACH REJECT message is integrity protected, the UE 105 proceeds to step S540.

In step S540, if the retry wait time value is not 0 or deactivated, the UE 105 proceeds to step S545.

In step S545, the UE starts the retry wait timer with the retry wait time value received in the PDN CONNECTIVITY REJECT message in step S510, and does not initiate an attach procedure with the same PDN CONNECTIVITY REQUEST message sent by the UE 105 in step S505 until an earliest one of the following happens: a retry triggering event occurs (S550) or the retry wait timer expires (S535).

If, in step S540, if the retry wait time value is 0 or deactivated, the UE 105 proceeds to step S560.

In step S560, if the retry wait time is not deactivated, the US 105 proceeds to step S565 where the UE 105 can retry the same ESM message sent in step S505 for example by sending, to the MME 160, a PDN CONNECTIVITY REQUEST for the same APN as that for which the PDN CONNECTIVITY REQUEST of step S505 was sent.

In step S560, if the retry wait time is deactivated, the UE 105 proceeds to step S570.

In step S570, the UE 105 waits for a retry triggering event to be detected in step S550. In step S570, the UE 105 does not initiate an attach procedure for the same APN as that for which the PDN CONNECTIVITY REQUEST message of step S505 was sent until a retry triggering event occurs (S550).

If, in step S520, if the PDN CONNECTIVITY REJECT message was sent standalone, the UE 105 proceeds to step S540.

If, in step S515, the retry wait time is not included in the PDN CONNECTIVITY REJECT message, the UE 105 proceeds to step S570.

Figure 6:
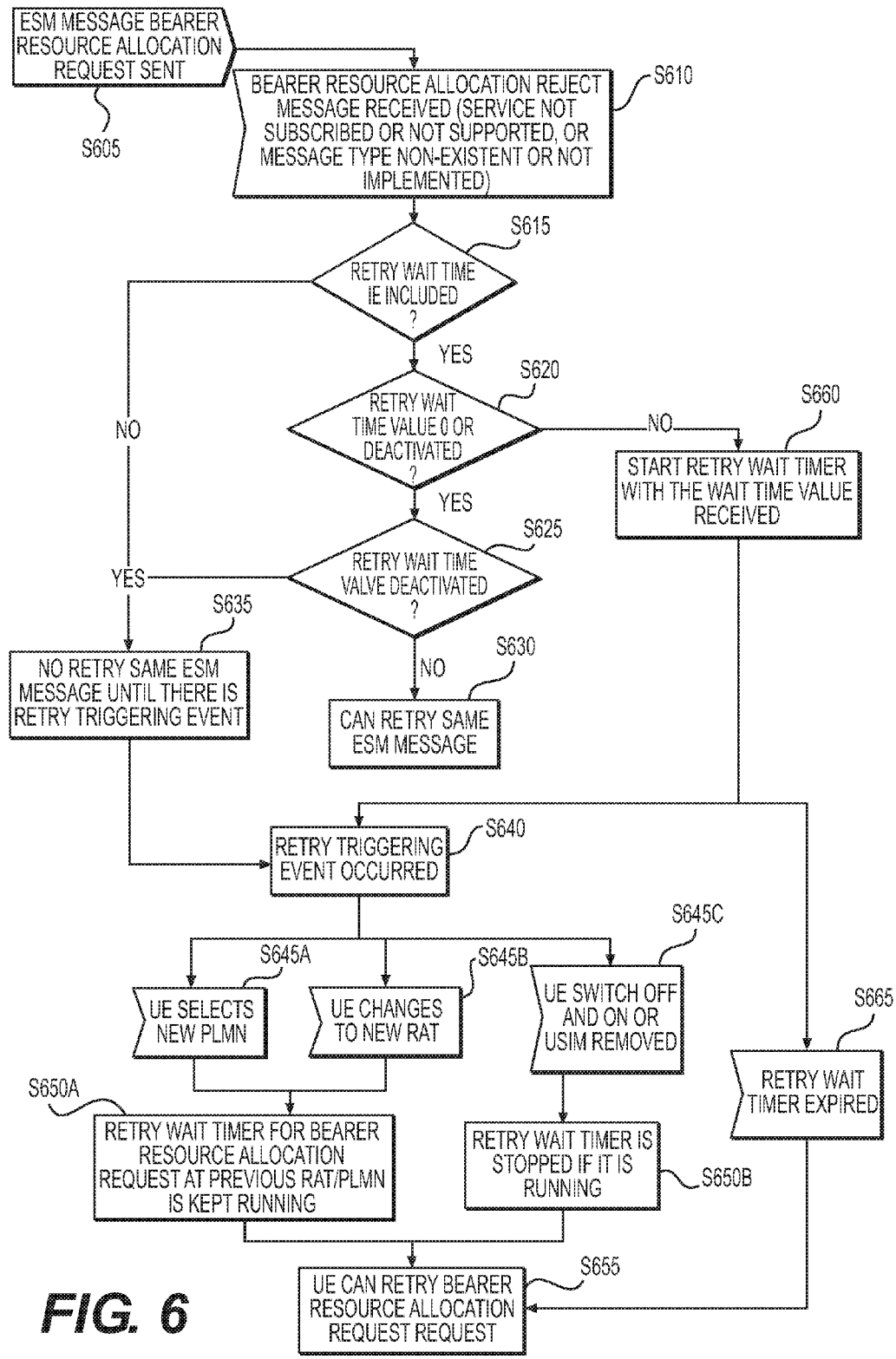
FIG. 6 is a flow chart illustrating an example of logic executed by a UE when handling a BEARER RESOURCE ALLOCATION REJECT message in accordance with one or more example embodiments.

FIG. 6 is a flow chart illustrating an example of logic executed by a UE when handling a BEARER RESOURCE ALLOCATION REJECT message in accordance with one or more example embodiments.

Referring to FIG. 6, in step S605, the UE sends a BEARER RESOURCE ALLOCATION REQUEST message, which is an ESM message, for example, to the MME 160.

In step S610, the UE 105 receives a BEARER RESOURCE ALLOCATION REJECT message, for example from the MME 160. The BEARER RESOURCE ALLOCATION REJECT message may indicate that the BEARER RESOURCE ALLOCATION REQUEST message of step S605 was rejected, and may include an ESM cause value of, for example, #32 "service option not supported" or #33 "requested service option not subscribed" or #8 (operator determined barring) or #27 (missing or unknown APN) or #97 "message type non-existent or not implemented".

In step S615, if an ESM retry wait time (e.g., a value for timer T3497) was included in the BEARER RESOURCE ALLOCATION REJECT message, the UE 105 proceeds to step S620.

In step S620, if the retry wait time value is not 0 or deactivated, the UE 105 proceeds to step S660.

In step S660, the UE starts the retry wait timer with the retry wait time value received in the BEARER RESOURCE ALLOCATION REJECT message in step S610, and does not send another BEARER RESOURCE ALLOCATION REQUEST for the same APN as that for which the BEARER RESOURCE ALLOCATION REQUEST message of step S605 was sent until an earliest one of the following happens: a retry triggering event occurs (S640) or the retry wait timer expires (S665).

After step S660, if the UE 105 detects that the retry wait timer has expired (S665), the UE 105 proceeds to step S655.

In step S655, the UE 105 performs a retry operation by sending a BEARER RESOURCE ALLOCATION REQUEST message, for example, to the MME 160. The BEARER RESOURCE ALLOCATION REQUEST sent in step S655 may be sent for the same APN as that for which the BEARER RESOURCE ALLOCATION REQUEST of step S605 was sent.

After step S660, if the UE 105 detects that a retry triggering event has occurred (S640), the UE 105 proceeds to step S650A/S650B. As is illustrated in FIG. 6, the retry triggering event can be, for example, the UE 105 selecting a new PLMN (S645A), the UE 105 changing to a new RAT (S645B) or the UE 105 switching off or the SIM/USIM of the UE 105 being removed (S645C).

In step S650A, the UE 105 keeps the retry wait timer for BEARER RESOURCE ALLOCATION REQUEST request at previous RAT/PLMN running if the retry wait timer is running, and proceeds to step S655. In step S650B, the UE 105 stops the retry wait timer if the retry wait timer is running, and proceeds to step S655 described above.

In step S620, if the retry wait time value is 0 or deactivated, the UE 105 proceeds to step S625.

In step S625, if the retry wait time is not deactivated, the UE 105 proceeds to step S630 where the UE 105 can retry the same ESM message sent in step S605 for example by sending, to the MME 160, a BEARER RESOURCE ALLOCATION REQUEST for the same APN as that for which the BEARER RESOURCE ALLOCATION REQUEST of step S705 was sent.

In step S625, if the retry wait time is deactivated, the UE 105 proceeds to step S635.

In step S635, the UE 105 waits for a retry triggering event to be detected in step S640. In step S635, the UE 105 does not send another BEARER RESOURCE ALLOCATION REQUEST for the same APN as that for which the BEARER RESOURCE ALLOCATION REQUEST message of step S605 was sent until a retry triggering event occurs (S640). Step S640 is described above.

If, in step S615, the retry wait time is not included in the BEARER RESOURCE ALLOCATION REJECT message, the UE 105 proceeds to step S635 described above.

Figure 7:
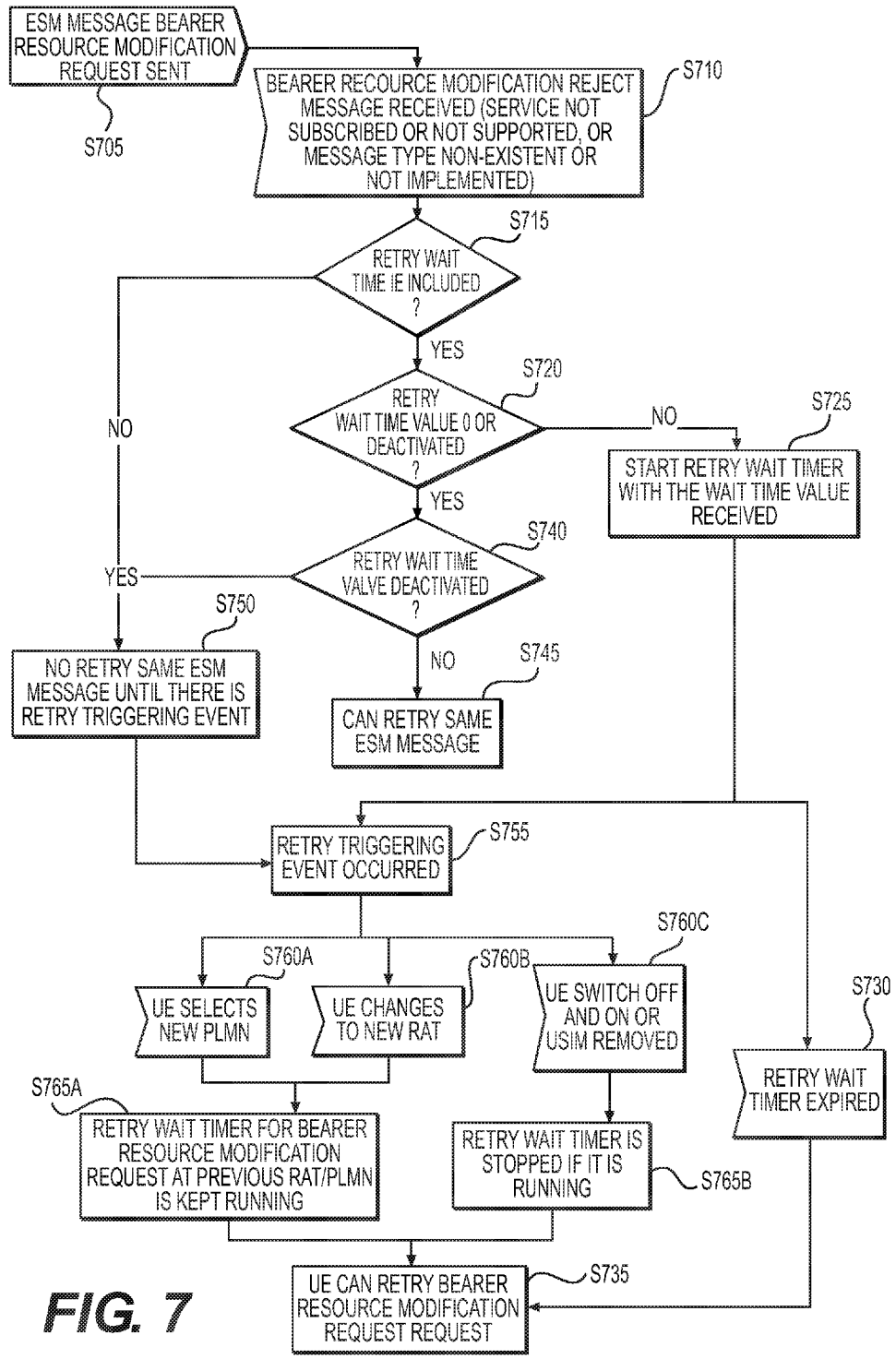
FIG. 7 is a flow chart illustrating an example of logic executed by a UE when handling a BEARER RESOURCE MODIFICATION REJECT message in accordance with one or more example embodiments.

FIG. 7 is a flow chart illustrating an example of logic executed by a UE when handling a BEARER RESOURCE MODIFICATION REJECT message in accordance with one or more example embodiments.

Referring to FIG. 7, in step S705, the UE sends a BEARER RESOURCE MODIFICATION REQUEST message, which is an ESM message, for example, to the MME 160.

In step S710, the UE 105 receives a BEARER RESOURCE MODIFICATION REJECT message, for example from the MME 160. The BEARER RESOURCE MODIFICATION REJECT message may indicate that the BEARER RESOURCE MODIFICATION REQUEST message of step S705 was rejected, and may include an ESM cause value of, for example, #32 "service option not supported" or #33 "requested service option not subscribed" or #8 (operator determined barring) or #27 (missing or unknown APN) or #97 "message type non-existent or not implemented".

In step S715, if an ESM retry wait time (e.g., a value for timer T3497) was included in the BEARER RESOURCE ALLOCATION REJECT message, the UE 105 proceeds to step S720.

In step S720, if the ESM retry wait time value is not 0 or deactivated, the UE 105 proceeds to step S725.

In step S725, the UE starts the retry wait timer with the retry wait time value received in the BEARER RESOURCE MODIFICATION REJECT message in step S710, and does not send another BEARER RESOURCE MODIFICATION REQUEST for the same APN as that for which the BEARER RESOURCE MODIFICATION REQUEST message of step S705 was sent until an earliest one of the following happens: a retry triggering event occurs (S755) or the retry wait timer expires (S730).

After step S725, if the UE 105 detects that the retry wait timer has expired (S730), the UE 105 proceeds to step S735.

In step S735, the UE 105 performs a retry operation by sending a BEARER RESOURCE MODIFICATION REQUEST message, for example, to the MME 160. The BEARER RESOURCE MODIFICATION REQUEST sent in step S735 may be sent for the same APN as that for which the BEARER RESOURCE MODIFICATION REQUEST of step S705 was sent.

After step S725, if the UE 105 detects that a retry triggering event has occurred (S755), the UE 105 proceeds to step S765A/S765B. As is illustrated in FIG. 7, the retry triggering event can be, for example, the UE 105 selecting a new PLMN (S760A), the UE 105 changing to a new RAT (S760B) or the UE 105 switching off or the SIM/USIM of the UE 105 being removed (S760C).

In step S765A, the UE 105 keeps the retry wait timer for BEARER RESOURCE MODIFICATION REQUEST request at previous RAT/PLMN running if the retry wait timer is running, and proceeds to step S735. In step S765B, the UE 105 stops the retry wait timer if the retry wait timer is running, and proceeds to step S735, which is described above.

In step S720, if the retry wait time value is 0 or deactivated, the UE 105 proceeds to step S740.

In step S740, if the retry wait time is not deactivated, the UE 105 proceeds to step S745 where the UE 105 can retry the same ESM message sent in step S705, for example by sending, to the MME 160, a BEARER RESOURCE MODIFICATION REQUEST for the same APN as that for which the BEARER RESOURCE MODIFICATION REQUEST of step S705 was sent.

In step S740, if the retry wait time is deactivated, the UE 105 proceeds to step S750.

In step S750, the UE 105 waits for a retry triggering event to be detected in step S755. In step S750, the UE 105 does not send another BEARER RESOURCE MODIFICATION REQUEST for the same APN as that for which the BEARER RESOURCE ALLOCATION REQUEST message of step S705 was sent until a retry triggering event occurs (S755). Step S755 is described above.

If, in step S715, the retry wait time is not included in the BEARER RESOURCE MODIFICATION REJECT message, the UE 105 proceeds to step S750, which is described above.

Figure 8:
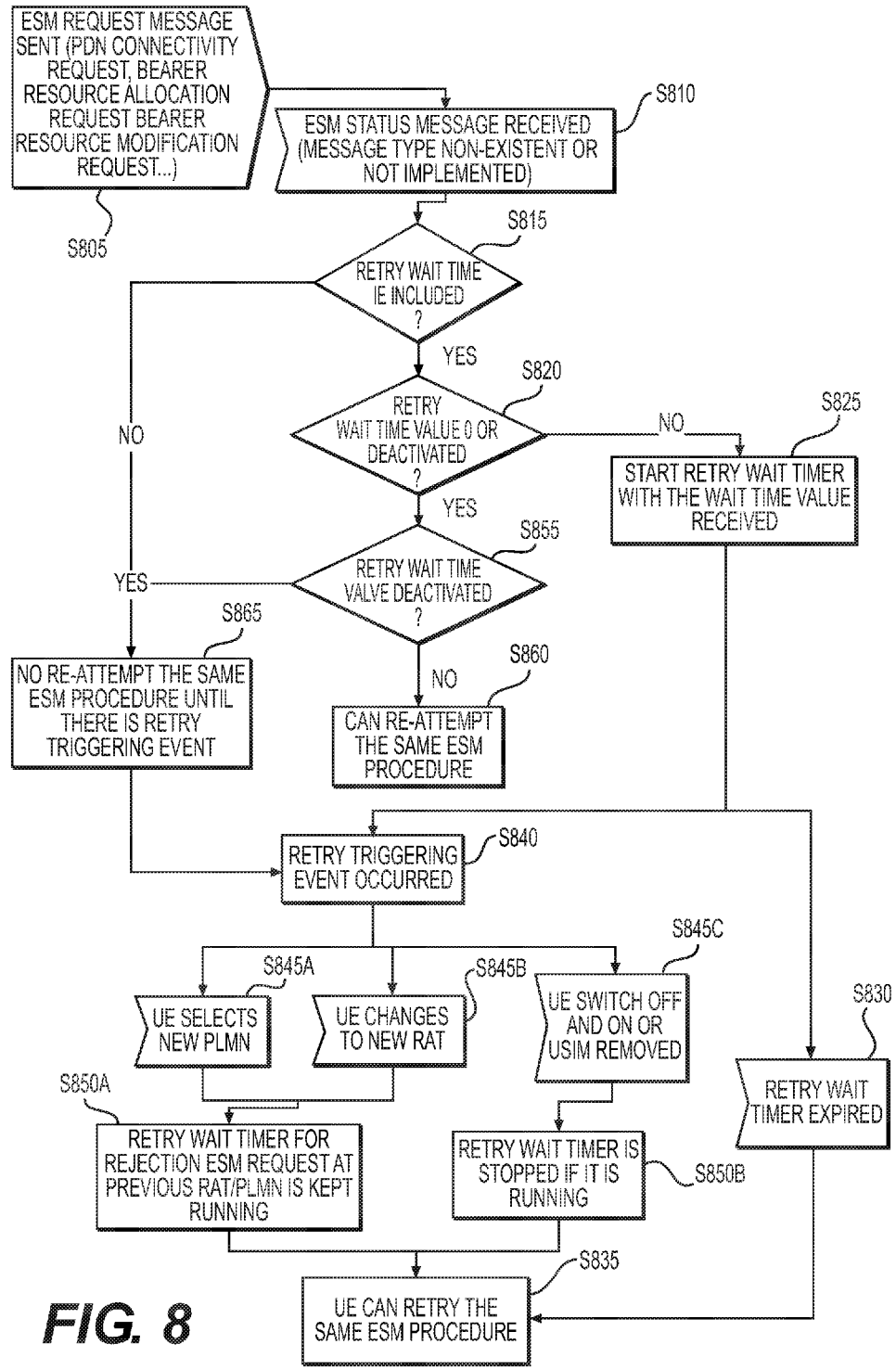
FIG. 8 is a flow chart illustrating an example of logic executed by a UE when handling a ESM STATUS message in accordance with one or more example embodiments.

FIG. 8 is a flow chart illustrating an example of logic executed by a UE when handling a ESM STATUS message in accordance with one or more example embodiments.

Referring to FIG. 8, in step S805, the UE attempt an ESM procedure by sending an ESM request message, for example, to the MME 160. The ESM request message sent in step S805 may be, for example, a PDN CONNECTIVITY REQUEST, BEARER RESOURCE ALLOCATION REQUEST, or BEARER RESOURCE MODIFICATION REQUEST.

In step S810, the UE 105 receives a ESM STATUS message, for example from the MME 160. The ESM STATUS message may indicate that the ESM message of step S805 was rejected, and may include an ESM cause value of, for example #97 "message type non-existent or not implemented".

In step S815, if an ESM retry wait time (e.g., a value for timer T3497) was included in the ESM STATUS message, the UE 105 proceeds to step S820.

In step S820, if the retry wait time value is not 0 or deactivated, the UE 105 proceeds to step S825.

In step S825, the UE starts the retry wait timer with the retry wait time value received in the ESM STATUS message in step S810, and does not reattempt the same ESM procedure as that associated with the ESM request message sent in step S805 until an earliest one of the following happens: a retry triggering event occurs (S840) or the retry wait timer expires (S830).

After step S825, if the UE 105 detects that the retry wait timer has expired (S830), the UE 105 proceeds to step S835.

In step S835, the UE 105 performs a retry operation by sending a ESM request message, for example, to the MME 160. The ESM request message sent in step S835 may be associated with the same ESM procedure as that with which the ESM request message of step S805 is associated.

After step S825, if the UE 105 detects that a retry triggering event has occurred (S840), the UE 105 proceeds to step S850A/S850B. As is illustrated in FIG. 8, the retry triggering event can be, for example, the UE 105 selecting a new PLMN (S845A), the UE 105 changing to a new RAT (S845B) or the UE 105 switching off or the SIM/USIM of the UE 105 being removed (S845C).

In step S850A, the UE 105 keeps the retry wait timer for rejected ESM request at previous RAT/PLMN running if the retry wait timer is running, and proceeds to step S835. In step S850B, the UE 105 stops the retry wait timer if the retry wait timer is running, and proceeds to step S835, which is described above.

In step S820, if the retry wait time value is 0 or deactivated, the UE 105 proceeds to step S855.

In step S855, if the retry wait timer is not deactivated, the UE 105 proceeds to step S860 where the UE 105 can attempt a retry operation by attempting the same ESM procedure previously attempted in step S805, for example, by resending the ESM message of step S805 to the MME 160.

In step S855, if the retry wait time is deactivated, the UE 105 proceeds to step S865.

In step S865, the UE 105 waits for a retry triggering event to be detected in step S840. In step S865, the UE 105 does not retry the ESM procedure attempted in step S805 until a retry triggering event occurs (S840). Step S840 is described above.

If, in step S815, the retry wait time is not included in the ESM STATUS message, the UE 105 proceeds to step S865, which is described above.

Providing UE Retry Restriction for GPRS Network

One or more example embodiments of providing UE retry restriction for a GPRS network will now be discussed below with reference to FIGS. 9-16 and communications network 100 in FIG. 1.

When session management requests (ACTIVATE PDP CONTEXT REQUEST, ACTIVATE SECONDARY PDP CONTEXT REQUEST or MODIFY PDP CONTEXT REQUEST) requested by a mobile (e.g., the UE 105) by the network (e.g., the GPRS network 110), and a reject message is sent back with SM cause #32 "service option not supported", #33 "requested service option not subscribed", #8 (operator determined barring), #27 (missing or unknown APN) or #97 "message type non-existent or not implemented", an SGSN (e.g., the SGSN 120) can choose to simply restrict the mobile retry based on a set of retry triggering criteria without consideration of retry wait time. The retry triggering criteria may include, for example, when the mobile selecting a new PLMN; the mobile moving to a new RAT; the mobile switching off or the SIM/USIM of the mobile being removed. According to one or more example embodiments, if any of the retry triggering conditions are met, the mobile can retry, as will be discussed in greater detail below with reference to FIG. 9.

Figure 9:
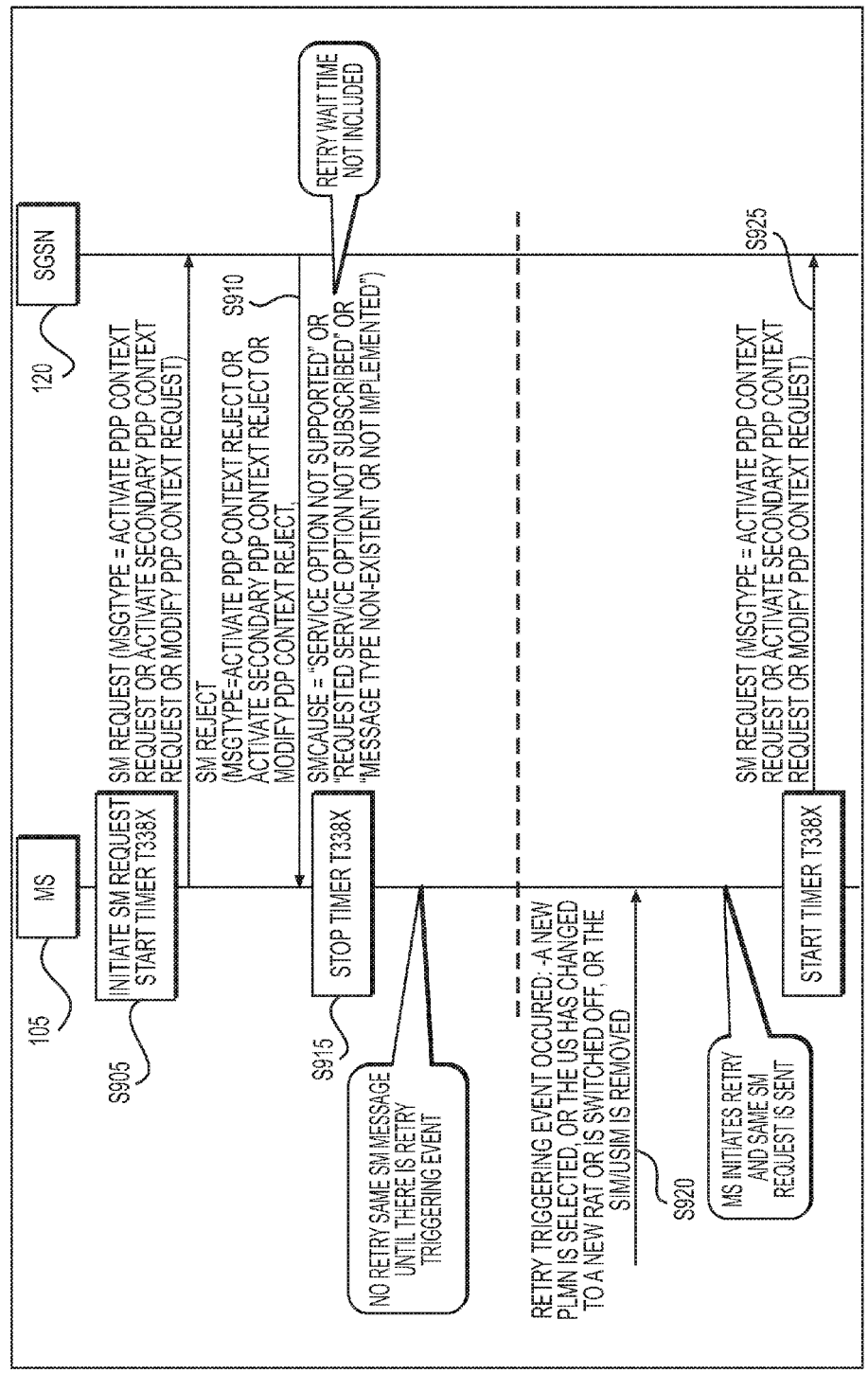
FIG. 9 illustrates a general packet radio service (GPRS) network example of providing UE retry restriction using an ESM reject message without a retry wait time according to at least one example embodiment.

FIG. 9 illustrates a GPRS network example of providing UE retry restriction using an ESM reject message without a retry wait time according to at least one example embodiment.

Referring to FIG. 9, in step S905 the UE 105 may initiate an SM request, start timer T338x and send an SM request message to the SGSN 120. The SM request message may have a message type value of, for example, ACTIVATE PDP CONTEXT REQUEST, ACTIVATE SECONDARY PDP CONTEXT REQUEST or MODIFY PDP CONTEXT REQUEST.

In step S910, the SGSN 120 may send an SM reject message to the UE 105. The SM reject message may have a message type value of, for example, ACTIVATE PDP CONTEXT REJECT, ACTIVATE SECONDARY PDP CONTEXT REJECT or MODIFY PDP CONTEXT REJECT. The SM reject message may have an SM cause value of, for example, "service option not supported", "requested service option not subscribed", or "message type non-existent or not implemented". The SM reject message sent in step S910 may not include a retry wait timer.

In step S915, the UE 105 stops timer T338x. According to one or more example embodiments, the UE 105 will not attempt a retry operation until a retry triggering event is detected.

In step S920, the UE 105 detects a retry triggering event including, for example, the UE 105 selecting a new PLMN; the UE 105 moving to a new RAT; the UE 105 switching off, or the SIM/USIM of the UE 105 being removed.

In step S925, as a result of detecting the retry triggering event in step S920, the UE 105 participates in a retry operation by sending another SM request to the SGSN 120 and starts the timer T338x. The SM request sent in step S920 may be of the same type as that described above with respect to step S905. Further, in the case that the retry triggering event detected in step S920 is a RAT change indicating that the UE 105 is changing from the GPRS network 110 to the LTE network 150 to the, the UE 105 sends an ESM message to the MME 160 in step S925, instead of, sending the SM request to the SGSN 120.

Accordingly, in the example shown in FIG. 9, after receiving a SM reject message from the SGSN 120 in step S910, the UE 105 does not attempt a retry operation by sending another SM request message to the SGSN 120 until after a retry triggering event is detected in step S920.

In the example shown in FIG. 9, no retry wait time is included in the SM reject message sent by the SGSN 120 in step S910. However, according to example embodiments, in addition to the retry triggering criteria discussed above with respect to FIG. 10, the SGSN 120 can choose to provide additional signaling indicating a retry wait time value to the UE 105 when the session management requests (ACTIVATE PDP CONTEXT REQUEST, ACTIVATE SECONDARY PDP CONTEXT REQUEST or MODIFY PDP CONTEXT REQUEST) are rejected by the network and the network wants to restrict the UE retry operations in a way that still allows a minimum of one retry operation in a given time interval provided by the network. In this case, the SGSN 120 includes a value for timer T3397 in the SM reject message and mobile retry of the same SM request is restricted by both the retry triggering criteria and the retry wait time. Inclusion of the retry timer in the SM reject message is illustrated in FIG. 10.

Figure 10:
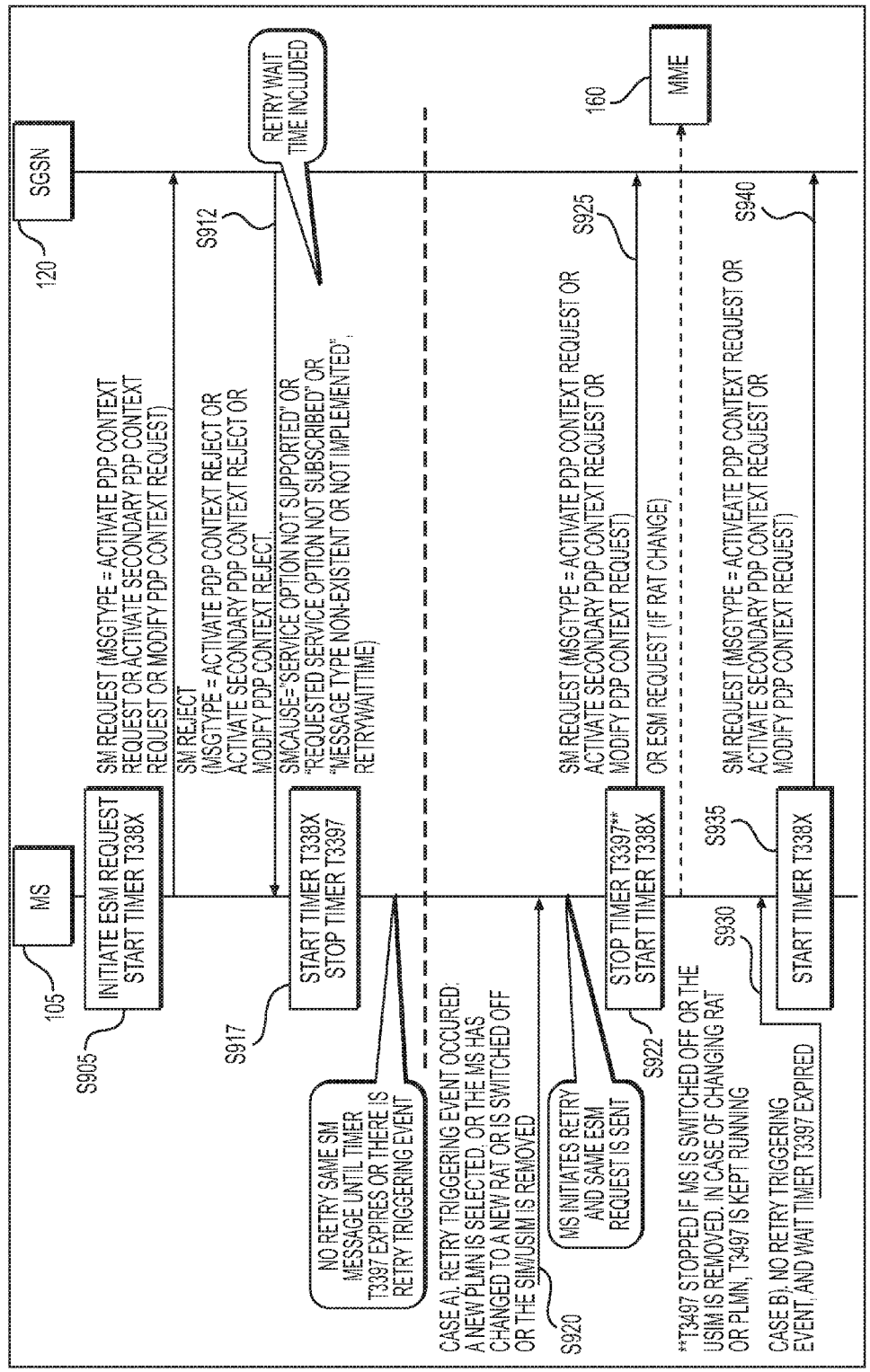
FIG. 10 illustrates a GPRS network example of providing UE retry restriction using an ESM reject message with a retry wait time according to at least one example embodiment.

FIG. 10 illustrates a GPRS network example of providing UE retry restriction using an ESM reject message with a retry wait time according to at least one example embodiment.

As is shown in FIG. 10, many of the operations in FIG. 10 are the same as those shown in FIG. 9. The operations shown in FIG. 10 differ from those shown in FIG. 9 as follows. After step S905, the SGSN 120 sends an SM reject message in step S912. The SM reject message sent in step S912 is the same as that described above with respect to step S910 with the exception that the SM reject message sent in step S912 additionally includes a retry wait time value retryWaitTime. After step S912, in step S917 the UE 105 stops timer T328x and starts a timer T3297, which may be initialized by the UE 105 using the timer value retryWaitTime received in step S912 via the SM status message. In the example shown in FIG. 10, there are two types of events which can permit the UE 105 to participate in a retry operation.

With respect to the first type of event, the UE 105 may detect a triggering event in step S920 in the same manner discussed above with respect to FIG. 9. In response to detecting the triggering event, the UE 105 stops the timer T3297 and starts the timer T328x in step S922. Next, in step S925, the UE 105 sends an SM request message in the same manner discussed above with respect to FIG. 9.

With respect to the second type of event, if the UE 105 determines that the ESM retry wait timer (e.g. timer T3497) expired before the UE 105 detected any retry triggering event (S930), the UE does not perform steps S922 and S925, and, instead, the UE 105 starts the timer T328x in step S935 and attempts a retry operation by sending another SM request message to the SGSN 120 in step S940.

According to one or more example embodiments, if the SGSN 120 receives, for example, from the UE 105, a session management message with message type not defined or not implemented by the receiver and the message is ignored, and if the SGSN 120 decides to return an SM STATUS message with cause #97 "message type non-existent or not implemented", then the SGSN 120 can choose to simply restrict the mobile retry of the same SM procedure based on a set of retry triggering criteria including, for example, the mobile selecting a new PLMN; the mobile moving to a new RAT; and the mobile switching off or SIM/USIM being removed. According to one or more example embodiments, if any of the retry triggering condition is met, the mobile can retry, as will be discussed in greater detail below with reference to FIG. 11.

Figure 11:
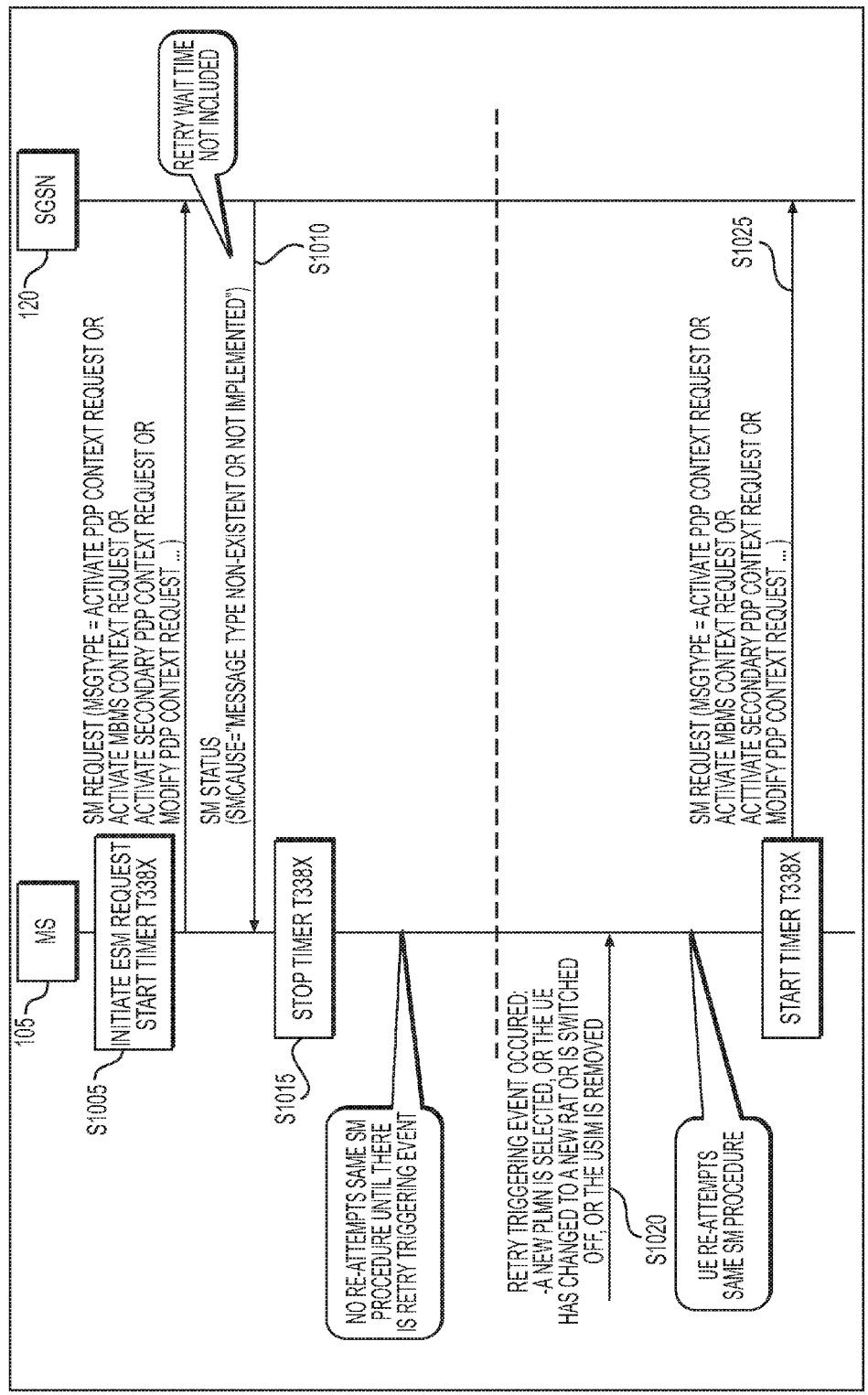
FIG. 11 illustrates a GPRS network example of providing UE retry restriction using an ESM status message without a retry wait time according to at least one example embodiment.

FIG. 11 illustrates a GPRS network example of providing UE retry restriction using an ESM status message without a retry wait time according to at least one example embodiment.

Referring to FIG. 11, in step S1005 the UE 105 may initiate an SM request, start timer T338x and send an SM request message to the SGSN 120. The SM request message may have a message type value of, for example, ACTIVATE PDP CONTEXT REQUEST, ACTIVATE SECONDARY PDP CONTEXT REQUEST or MODIFY PDP CONTEXT REQUEST.

In step S1010, the SGSN 120 may send an SM status message to the UE 105. The SM status message may have a SM cause value of, "message type non-existent or not implemented". The SM status message sent in step S1010 may not include a retry wait timer.

In step S1015, the UE 105 stops timer T338x. According to one or more example embodiments, the UE 105 will not attempt a retry operation until a retry triggering event is detected.

In step S1020, the UE 105 detects a retry triggering event including, for example, the UE 105 selecting a new PLMN; the UE 105 moving to a new RAT; the UE 105 switching off, or the SIM/USIM of the UE 105 being removed.

In step S1025, as a result of detecting the retry triggering event in step S1020, the UE 105 participates in a retry operation by sending another SM request to the SGSN 120 and starts the timer T338x. The SM request sent in step S1020 may be of the same type as that described above with respect to step S1005. Further, in the case that the retry triggering event detected in step S1020 is a RAT change indicating that the UE 105 is changing from the GPRS network 110 to the LTE network 150, the UE 105 sends an ESM message to the MME 160 in step S1025, instead of, sending the SM request to the SGSN 120.

Accordingly, in the example shown in FIG. 11, after receiving a SM status message from the SGSN 120 in step S1010, the UE 105 does not send another SM request message to the SGSN 120 until after a retry triggering event is detected in step S1020.

In the example shown in FIG. 11, no retry wait time is included in the SM status message sent by the SGSN 120 in step S1010. However, according to example embodiments, in addition to the retry triggering criteria discussed above with respect to FIG. 11, the SGSN 120 can also choose to provide additional signaling indicating a retry wait time value to the UE 105 if the network wants to restrict the mobile retry in a way to still allows a minimum one retry operation in a given time interval provided by the network. In this case, the SGSN 120 includes a value for timer T3397 in the SM STATUS message and mobile retry of the same SM request is restricted by both the retry triggering criteria and the retry wait time. Inclusion of the retry timer in the SM status message is illustrated in FIG. 12.

Figure 12:
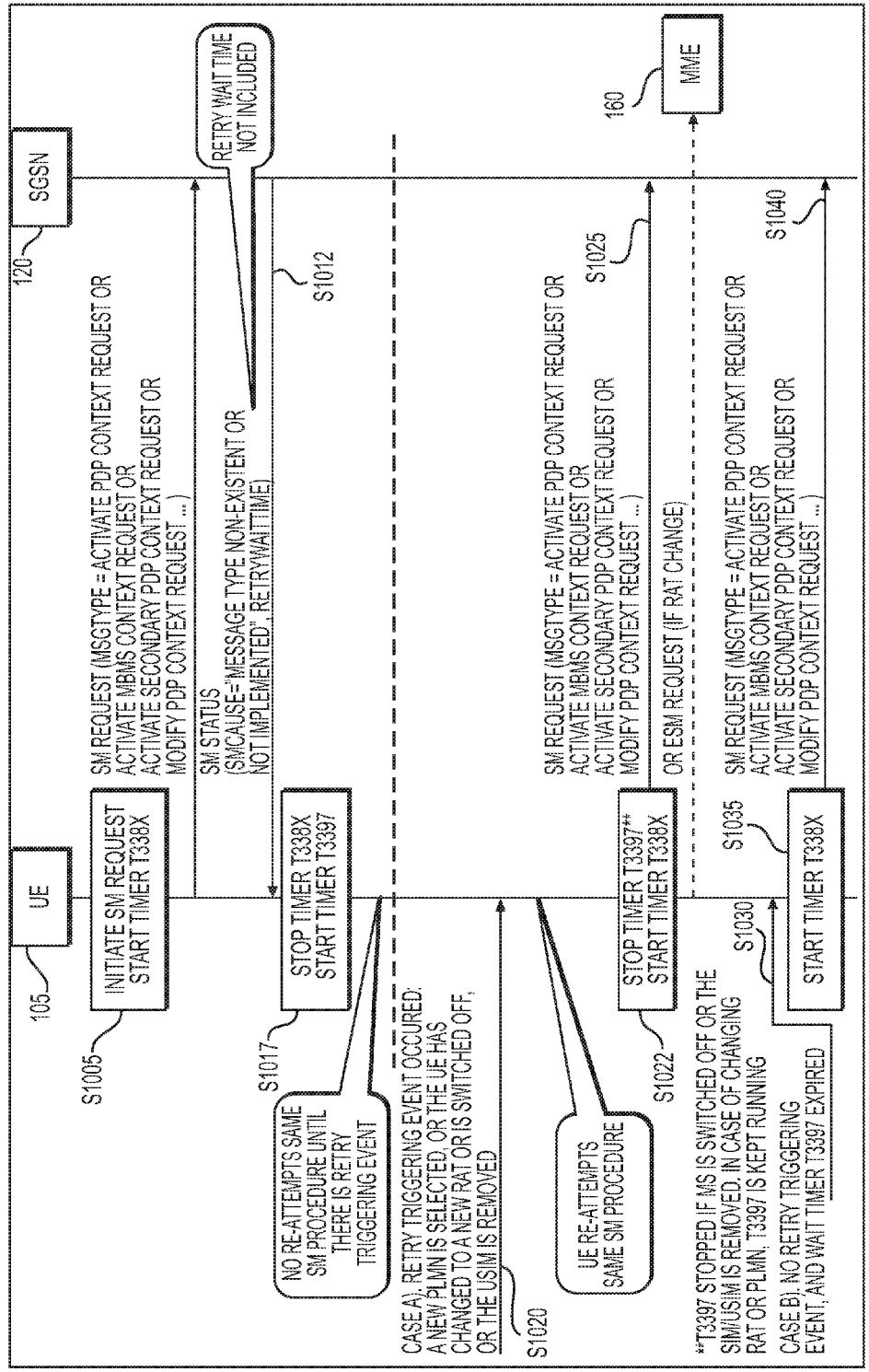
FIG. 12 illustrates a GPRS network example of providing UE retry restriction using an ESM status message with a retry wait time according to at least one example embodiment.

FIG. 12 illustrates a GPRS network example of providing UE retry restriction using an ESM status message with a retry wait time according to at least one example embodiment.

As is shown in FIG. 12, many of the operations in FIG. 12 are the same as those shown in FIG. 11. The operations shown in FIG. 12 differ from those shown in FIG. 11 as follows. After step S1005, the SGSN 120 sends an SM status message in step S1012. The SM status message sent in step S1012 is the same as that described above with respect to step S1010 with the exception that the SM status message sent in step S1012 additionally includes a retry wait time value retryWaitTime. After step S1012, in step S1017 the UE 105 stops timer T338x and starts a timer T3397, which may be initialized by the UE 105 using the timer value retryWaitTime received in step S1012 via the SM status message. In the example shown in FIG. 12, there are two types of events which can permit the UE 105 to participate in a retry operation.

With respect to the first type of event, the UE 105 may detect a retry triggering event in step S1020 in the same manner discussed above with respect to FIG. 11. In response to detecting the retry triggering event, the UE 105 stops the timer T3397 and starts the timer T338x in step S1022. Next, in step S1025, the UE 105 sends an SM request message in the same manner discussed above with respect to FIG. 11.

With respect to the second type of event, if the UE 105 determines that the timer T3397 expired before the UE 105 detected any retry triggering event (S1030), the UE does not perform steps S1022 and S1025, and, instead, the UE 105 starts the timer T338x in step S1035 and sends another SM request message to the SGSN 120 in step S1040.

As used herein, the act of a UE starting/stopping the timer T3397 in association with an SM request of a particular SM request type for a particular APN sent by the UE refers to the UE starting/stopping a T3397 timer instance for the particular SM request type and the particular APN in a given PLMN.

In the examples for providing UE retry restriction for a GPRS network discussed above with respect to FIGS. 9-12, a new timer value T3397 is introduced. According to one or more example embodiments, the timer value T3397 may have the attributes shown below in table 6.

TABLE 6

| TIMER NUM. | TIMER VALUE | STATE | CAUSE OF START | NORMAL STOP |
|---|---|---|---|---|
| T3397 | operator dependent | PDP-ACT-PEND | ACTIVATE PDP CONTEXT REJECT, ACTIVATE SECONDARY PDP CONTEXT REJECT OR MODIFY PDP CONTEXT REJECT, SM STATUS with a timer value for T3397 received | a new PLMN is selected, the MS has changed to a new RAT, the MS is switched off or SIM/USIM is removed |

The value of timer T3397 can be provided by an operator of communications network 100 when a request to activate a PDP context or a request to modify a PDP context is rejected by the network with SM cause #32 "service option not supported" or #33 "requested service option not subscribed" or #8 (operator determined barring) or #27 (missing or unknown APN) or #97 "message type non-existent or not implemented", or when an SM STATUS message is received. According to one or more example embodiments, the value of the timer when included with SM cause #32, #33, #8, #27 or #97 may be taken randomly or, alternatively, pseudo randomly from an operator dependent range not greater than 72 hours.

Accordingly, if the session management (SM) cause value is #32 "service option not supported" or #33 "requested service option not subscribed" or #8 (operator determined barring) or #27 (missing or unknown APN) or #97 "message type non-existent or not implemented", the network may include a value for timer T3397 in the following messages:

ACTIVATE PDP CONTEXT REJECT message;

ACTIVATE SECONDARY PDP CONTEXT REJECT message; or

MODIFY PDP CONTEXT REJECT message.

If the session management (SM) cause value is #97 "Message type non-existent or not implemented", the network may include a value for timer T3397 in the SM STATUS message.

Tables 7-10 below show example contents of existing reject and status messages that are modified to include the ESM retry wait timer (e.g. timer T3497) according to one or more example embodiments. In tables 2-5, the underlined text represents the modifications made to the corresponding reject and status messages.

TABLE 7

ACTIVATE PDP CONTEXT REJECT message content

| IEI | Information Element | Type/Reference | Presence | Format | Length |
|---|---|---|---|---|---|
| | ... | | | | |
| | Activate PDP context reject message identity | Message type 10.4 | M | V | 1 |
| | ... | | | | |
| XX | SM Retry Wait Time value (e.g. T3397 value) | GPRS timer 3 10.5.7.4a | O | TLV | 3 |

TABLE 8

ACTIVATE SECONDARY PDP CONTEXT REJECT message content

| IEI | Information Element | Type/Reference | Presence | Format | Length |
|---|---|---|---|---|---|
| | ... | | | | |
| | Bearer resource allocation reject message identity | Message type 9.8 | M | V | 1 |
| | ... | | | | |
| XX | SM Retry Wait Time value (e.g. T3397 value) | GPRS timer 3 10.5.7.4a | O | TLV | 3 |

TABLE 9

MODIFY PDP CONTEXT REJECT message content

| IEI | Information Element | Type/Reference | Presence | Format | Length |
|---|---|---|---|---|---|
| | ... | | | | |
| | Bearer resource modification reject message identity | Message type 9.8 | M | V | 1 |
| | ... | | | | |
| XX | SM Retry Wait Time value (e.g. T3397 value) | GPRS timer 3 10.5.7.4a | O | TLV | 3 |

TABLE 10

SM STATUS message content

| IEI | Information Element | Type/Reference | Presence | Format | Length |
|---|---|---|---|---|---|
| | ... | | | | |
| | ESM status message identity | Message type 9.8 | M | V | 1 |
| | ... | | | | |
| XX | SM Retry Wait Time value (e.g. T3397 value) | GPRS timer 3 10.5.7.4a | O | TLV | 3 |

Figure 13:
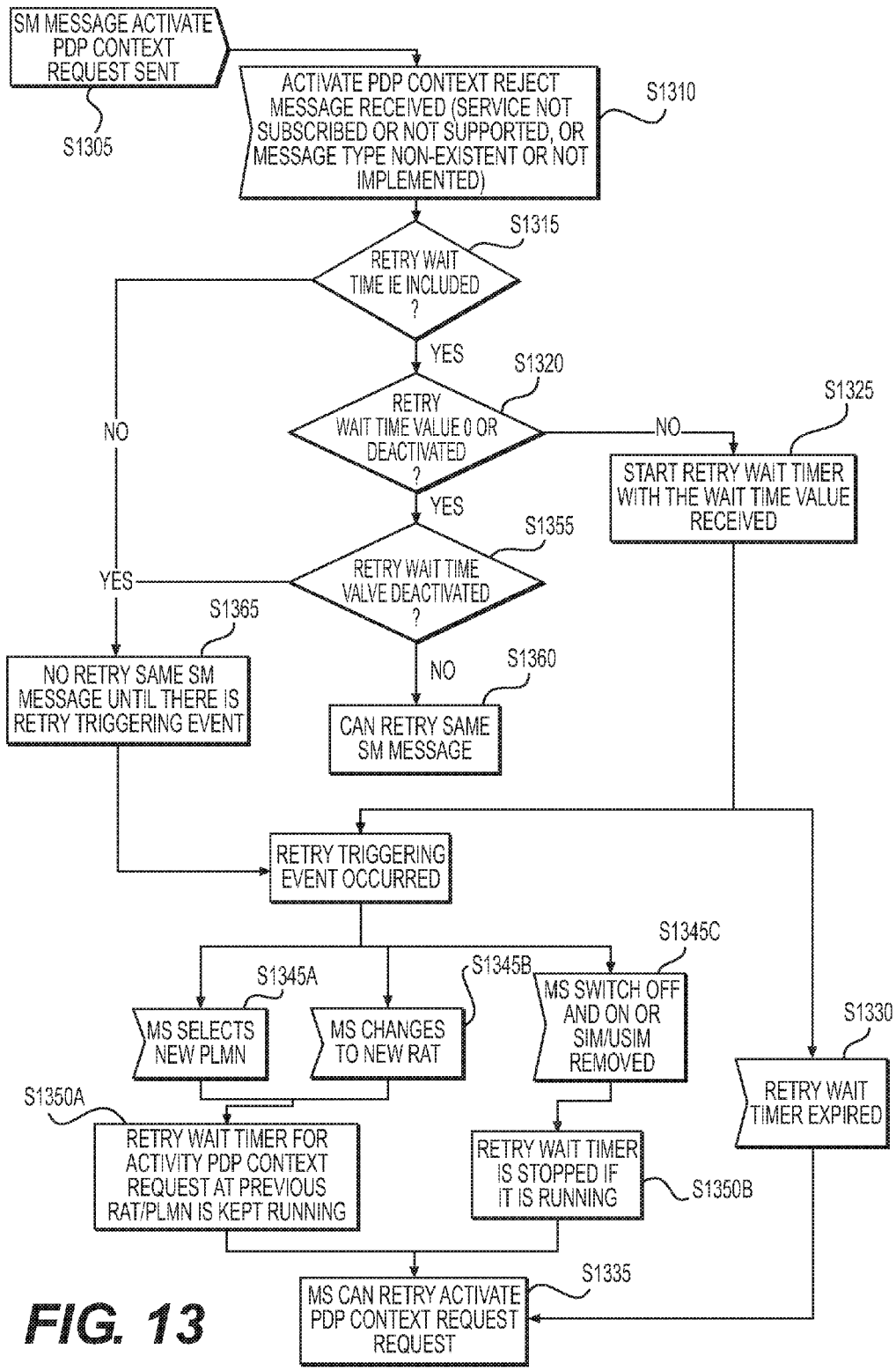
FIG. 13 is a flow chart illustrating an example of logic executed by a UE when handling an ACTIVATE PDP CONTEXT REJECT message in accordance with one or more example embodiments.

FIG. 13 is a flow chart illustrating an example of logic executed by a UE when handling an ACTIVATE PDP CONTEXT REJECT message in accordance with one or more example embodiments.

Referring to FIG. 13, in step S1305, the UE attempts an SM procedure by sending an ACTIVATE PDP CONTEXT REQUEST message, which is an SM message, for example, to the SGSN 120.

In step S1310, the UE 105 receives an ACTIVATE PDP CONTEXT REJECT message, for example, from the SGSN 120. The ACTIVATE PDP CONTEXT REJECT message may indicate that the ACTIVATE PDP CONTEXT REQUEST message sent in step S1305 is rejected, and may include an SM cause value of, for example, #32 "service option not supported", #33 "requested service option not subscribed", #8 (operator determined barring), #27 (missing or unknown APN) or #97 "message type non-existent or not implemented".

In step S1315, if a retry wait time (e.g., a value for timer T3397) was included in the ACTIVATE PDP CONTEXT REJECT message, the UE 105 proceeds to step S1320.

In step S1320, if the retry wait time value is not 0 or deactivated, the UE 105 proceeds to step S1325.

In step S1325, the UE starts the retry wait timer with the retry wait time value received in the ACTIVATE PDP CONTEXT REJECT message in step S1310, and does not send another ACTIVATE PDP CONTEXT REQUEST for the same APN as that for which the ACTIVATE PDP CONTEXT REQUEST message of step S1305 was sent until an earliest one of the following happens: a retry triggering event occurs (S1340) or the retry wait timer expires (S1330).

After step S1325, if the UE 105 detects that the retry wait timer has expired (S1330), the UE 105 proceeds to step S1335.

In step S1335, the UE 105 performs a retry operation by sending an ACTIVATE PDP CONTEXT REQUEST message, for example, to the SGSN 120. The ACTIVATE PDP CONTEXT REQUEST message sent in step S1335 may be sent for the same APN as that for which the ACTIVATE PDP CONTEXT REQUEST message of step S1335 was sent.

After step S1325, if the UE 105 detects that a retry triggering event has occurred (S1340), the UE 105 proceeds to step S1350A/S1350B. As is illustrated in FIG. 13, the retry triggering event can be, for example, the UE 105 selecting a new PLMN (S1345A), the UE 105 changing to a new RAT (S1345B) or the UE 105 switching off or the SIM/USIM of the UE 105 being removed (S1345C).

In step S1350A, the UE 105 keeps the retry wait timer for ACTIVATE PDP CONTEXT REQUEST request at previous RAT/PLMN running if the retry wait timer is running, and proceeds to step S1335. In step S1350B, the UE 105 stops the retry wait timer if the retry wait timer is running, and proceeds to step S1335, which is described above.

In step S1320, if the retry wait time value is 0 or deactivated, the UE 105 proceeds to step S1355.

In step S1355, if the retry wait timer is not deactivated, the UE 105 proceeds to step S1360 where the UE 105 can attempt a retry operation by attempting the same SM procedure previously attempted in step S1305, for example by sending, to the SGSN 120 160, an ACTIVATE PDP CONTEXT REQUEST for the same APN as that for which the ACTIVATE PDP CONTEXT REQUEST of step S1305 was sent.

In step S1355, if the retry wait time is deactivated, the UE 105 proceeds to step S1365.

In step S1365, the UE 105 waits for a retry triggering event to be detected in step S1340. In step S1365, the UE 105 does not send another ACTIVATE PDP CONTEXT REQUEST for the same APN as that for which the ACTIVATE PDP CONTEXT REQUEST message of step S1305 was sent until a retry triggering event occurs (S1340). Step S1340 is described above.

If, in step S1315, the retry wait time is not included in the ACTIVATE PDP CONTEXT REJECT message, the UE 105 proceeds to step S1365, which is described above.

Figure 14:
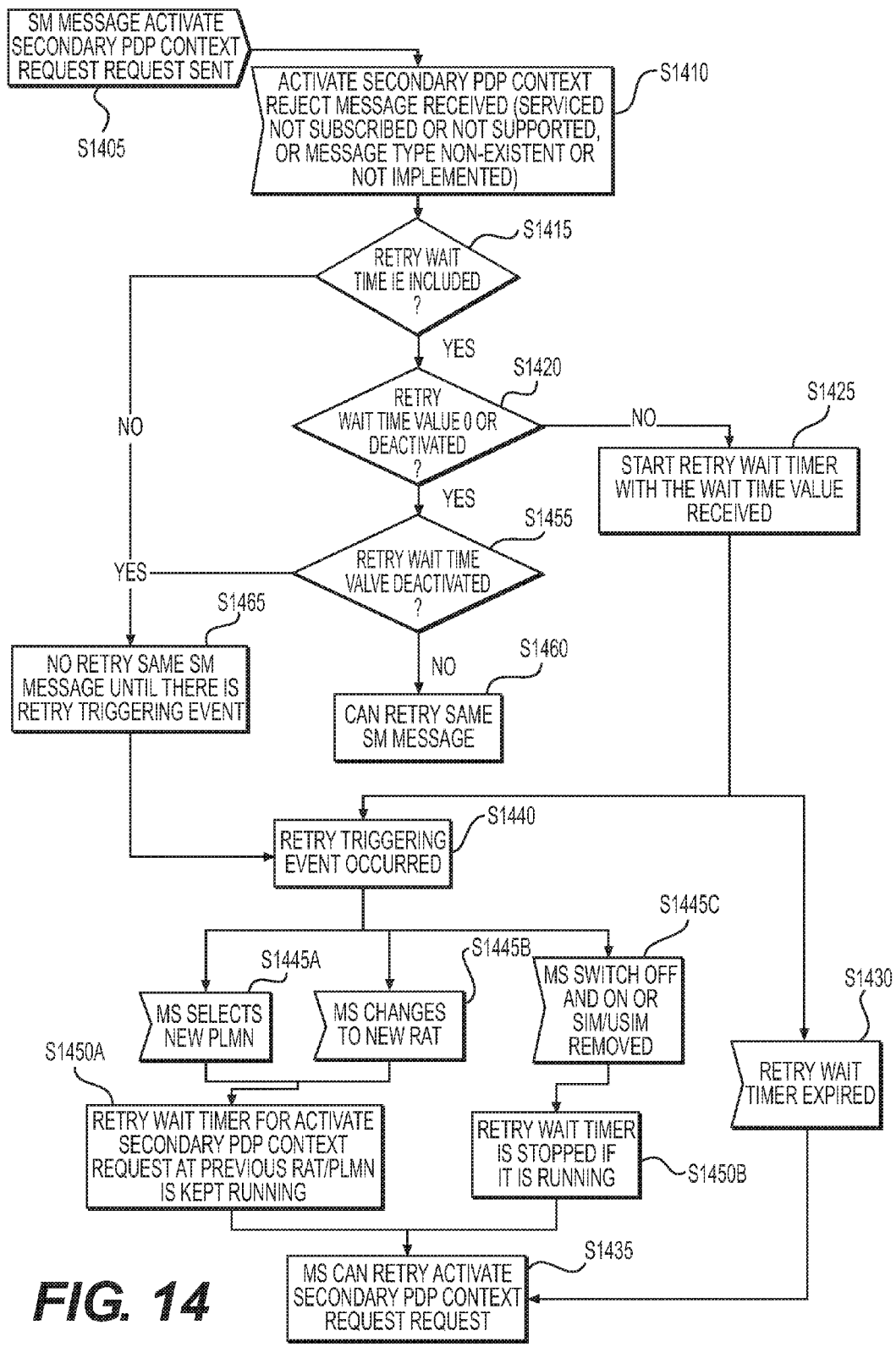
FIG. 14 is a flow chart illustrating an example of logic executed by a UE when handling an ACTIVATE SECONDARY PDP CONTEXT REJECT message in accordance with one or more example embodiments.

FIG. 14 is a flow chart illustrating an example of logic executed by a UE when handling an ACTIVATE SECONDARY PDP CONTEXT REJECT message in accordance with one or more example embodiments.

Referring to FIG. 14, in step S1405, the UE 105 attempts an SM procedure by sending an ACTIVATE SECONDARY PDP CONTEXT REQUEST message, which is an SM message, for example, to the SGSN 120.

In step S1410, the UE 105 receives an ACTIVATE SECONDARY PDP CONTEXT REJECT message, for example, from the SGSN 120. The ACTIVATE SECONDARY PDP CONTEXT REJECT message may indicate that the ACTIVATE SECONDARY PDP CONTEXT REQUEST message sent in step S1405 is rejected, and may include an SM cause value of, for example, #32 "service option not supported", #33 "requested service option not subscribed", #8 (operator determined barring), #27 (missing or unknown APN) or #97 "message type non-existent or not implemented".

In step S1415, if a retry wait time (e.g., a value for timer T3397) was included in the ACTIVATE SECONDARY PDP CONTEXT REJECT message, the UE 105 proceeds to step S1420.

In step S1420, if the retry wait time value is not 0 or deactivated, the UE 105 proceeds to step S1425.

In step S1425, the UE starts the retry wait timer with the retry wait time value received in the ACTIVATE SECONDARY PDP CONTEXT REJECT message in step S1410, and does not send another ACTIVATE SECONDARY PDP CONTEXT REQUEST for the same APN as that for which the ACTIVATE SECONDARY PDP CONTEXT REQUEST message of step S1405 was sent until an earliest one of the following happens: a retry triggering event occurs (S1440) or the retry wait timer expires (S1430).

After step S1425, if the UE 105 detects that the retry wait timer has expired (S1430), the UE 105 proceeds to step S1435.

In step S1435, the UE 105 performs a retry operation by sending an ACTIVATE SECONDARY PDP CONTEXT REQUEST message, for example, to the SGSN 120. The ACTIVATE SECONDARY PDP CONTEXT REQUEST message sent in step S1435 may be sent for the same APN as that for which the ACTIVATE SECONDARY PDP CONTEXT REQUEST message of step S1435 was sent.

After step S1425, if the UE 105 detects that a retry triggering event has occurred (S1440), the UE 105 proceeds to step S1450A/S1450B. As is illustrated in FIG. 14, the retry triggering event can be, for example, the UE 105 selecting a new PLMN (S1445A), the UE 105 changing to a new RAT (S1445B) or the UE 105 switching off or the SIM/USIM of the UE 105 being removed (S1445C).

In step S1450A, the UE 105 keeps the retry wait timer for ACTIVATE SECONDARY PDP CONTEXT REQUEST request at previous RAT/PLMN running if the retry wait timer is running, and proceeds to step S1435. In step S1450B, the UE 105 stops the retry wait timer if the retry wait timer is running, and proceeds to step S1435, which is described above.

In step S1420, if the retry wait time value is 0 or deactivated, the UE 105 proceeds to step S1455.

In step S1455, if the retry wait timer is not deactivated, the UE 105 proceeds to step S1460 where the UE 105 can attempt a retry operation by attempting the same SM procedure previously attempted in step S1405, for example by sending, to the SGSN 120, an ACTIVATE SECONDARY PDP CONTEXT REQUEST for the same APN as that for which the ACTIVATE SECONDARY PDP CONTEXT REQUEST of step S1405 was sent.

In step S1455, if the retry wait time is deactivated, the UE 105 proceeds to step S1465.

In step S1465, the UE 105 waits for a retry triggering event to be detected in step S1440. In step S1465, the UE 105 does not send another ACTIVATE SECONDARY PDP CONTEXT REQUEST for the same APN as that for which the ACTIVATE SECONDARY PDP CONTEXT REQUEST message of step S1405 was sent until a retry triggering event occurs (S1440). Step S1440 is described above.

If, in step S1415, the retry wait time is not included in the ACTIVATE SECONDARY PDP CONTEXT REJECT message, the UE 105 proceeds to step S1465, which is described above.

Figure 15:
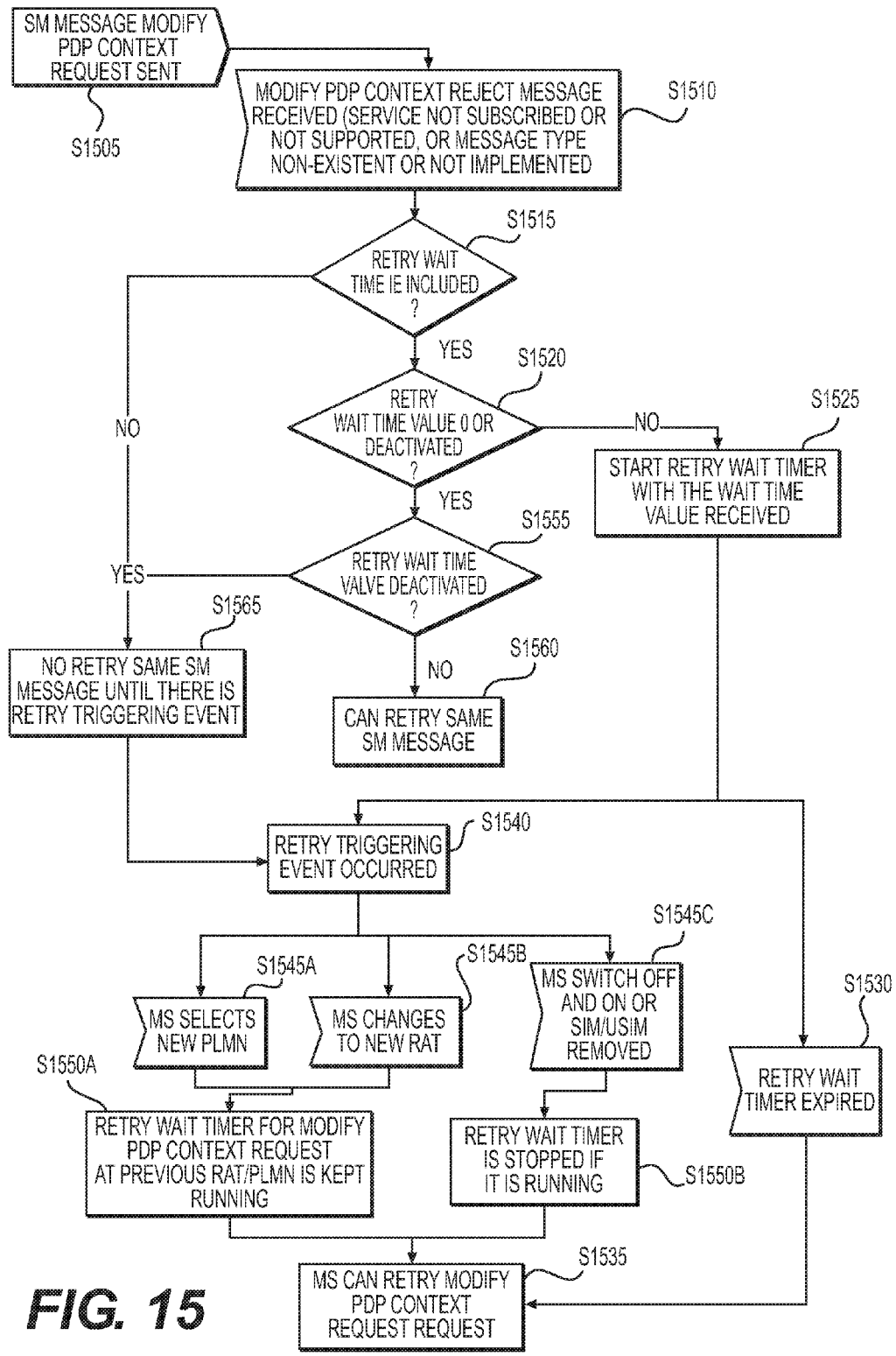
FIG. 15 is a flow chart illustrating an example of logic executed by a UE when handling a MODIFY PDP CONTEXT REJECT message in accordance with one or more example embodiments.

FIG. 15 is a flow chart illustrating an example of logic executed by a UE when handling a MODIFY PDP CONTEXT REJECT message in accordance with one or more example embodiments.

Referring to FIG. 15, in step S1505, the UE 105 attempts an SM procedure by sending a MODIFY PDP CONTEXT REQUEST message, which is an SM message, for example, to the SGSN 120.

In step S1510, the UE 105 receives a MODIFY PDP CONTEXT REJECT message, for example, from the SGSN 120. The MODIFY PDP CONTEXT REJECT message may indicate that the MODIFY PDP CONTEXT REQUEST message sent in step S1505 is rejected, and may include an SM cause value of, for example, #32 "service option not supported", #33 "requested service option not subscribed", #8 (operator determined barring), #27 (missing or unknown APN), or #97 "message type non-existent or not implemented".

In step S1515, if a retry wait time (e.g., a value for timer T3397) was included in the MODIFY PDP CONTEXT REJECT message, the UE 105 proceeds to step S1520.

In step S1520, if the retry wait time value is not 0 or deactivated, the UE 105 proceeds to step S1525.

In step S1525, the UE starts the retry wait timer with the retry wait time value received in the MODIFY PDP CONTEXT REJECT message in step S1510, and does not send another MODIFY PDP CONTEXT REQUEST for the same APN as that for which the MODIFY PDP CONTEXT REQUEST message of step S1505 was sent until an earliest one of the following happens: a retry triggering event occurs (S1540) or the retry wait timer expires (S1530).

After step S1525, if the UE 105 detects that the retry wait timer has expired (S1530), the UE 105 proceeds to step S1535.

In step S1535, the UE 105 performs a retry operation by sending a MODIFY PDP CONTEXT REQUEST message, for example, to the SGSN 120. The MODIFY PDP CONTEXT REQUEST message sent in step S1535 may be sent for the same APN as that for which the MODIFY PDP CONTEXT REQUEST message of step S1535 was sent.

After step S1525, if the UE 105 detects that a retry triggering event has occurred (S1540), the UE 105 proceeds to step S1550A/S1550B. As is illustrated in FIG. 15, the retry triggering event can be, for example, the UE 105 selecting a new PLMN (S1545A), the UE 105 changing to a new RAT (S1545B) or the UE 105 switching off or the SIM/USIM of the UE 105 being removed (S1545C).

In step S1550A, the UE 105 keeps the retry wait timer for MODIFY PDP CONTEXT REQUEST request at previous RAT/PLMN running if the retry wait timer is running, and proceeds to step S1535. In step S1550B, the UE 105 stops the retry wait timer if the retry wait timer is running, and proceeds to step S1535, which is described above.

In step S1520, if the retry wait time value is 0 or deactivated, the UE 105 proceeds to step S1555.

In step S1555, if the retry wait timer is not deactivated, the UE 105 proceeds to step S1560 where the UE 105 can attempt a retry operation by attempting the same SM procedure previously attempted in step S1505, for example by sending, to the SGSN 120, a MODIFY PDP CONTEXT REQUEST for the same APN as that for which the MODIFY PDP CONTEXT REQUEST of step S1505 was sent.

In step S1555, if the retry wait time is deactivated, the UE 105 proceeds to step S1565.

In step S1565, the UE 105 waits for a retry triggering event to be detected in step S1540. In step S1565, the UE 105 does not send another MODIFY PDP CONTEXT REQUEST for the same APN as that for which the MODIFY PDP CONTEXT REQUEST message of step S1505 was sent until a retry triggering event occurs (S1540). Step S1540 is described above.

If, in step S1515, the retry wait time is not included in the MODIFY PDP CONTEXT REJECT message, the UE 105 proceeds to step S1565, which is described above.

Figure 16:
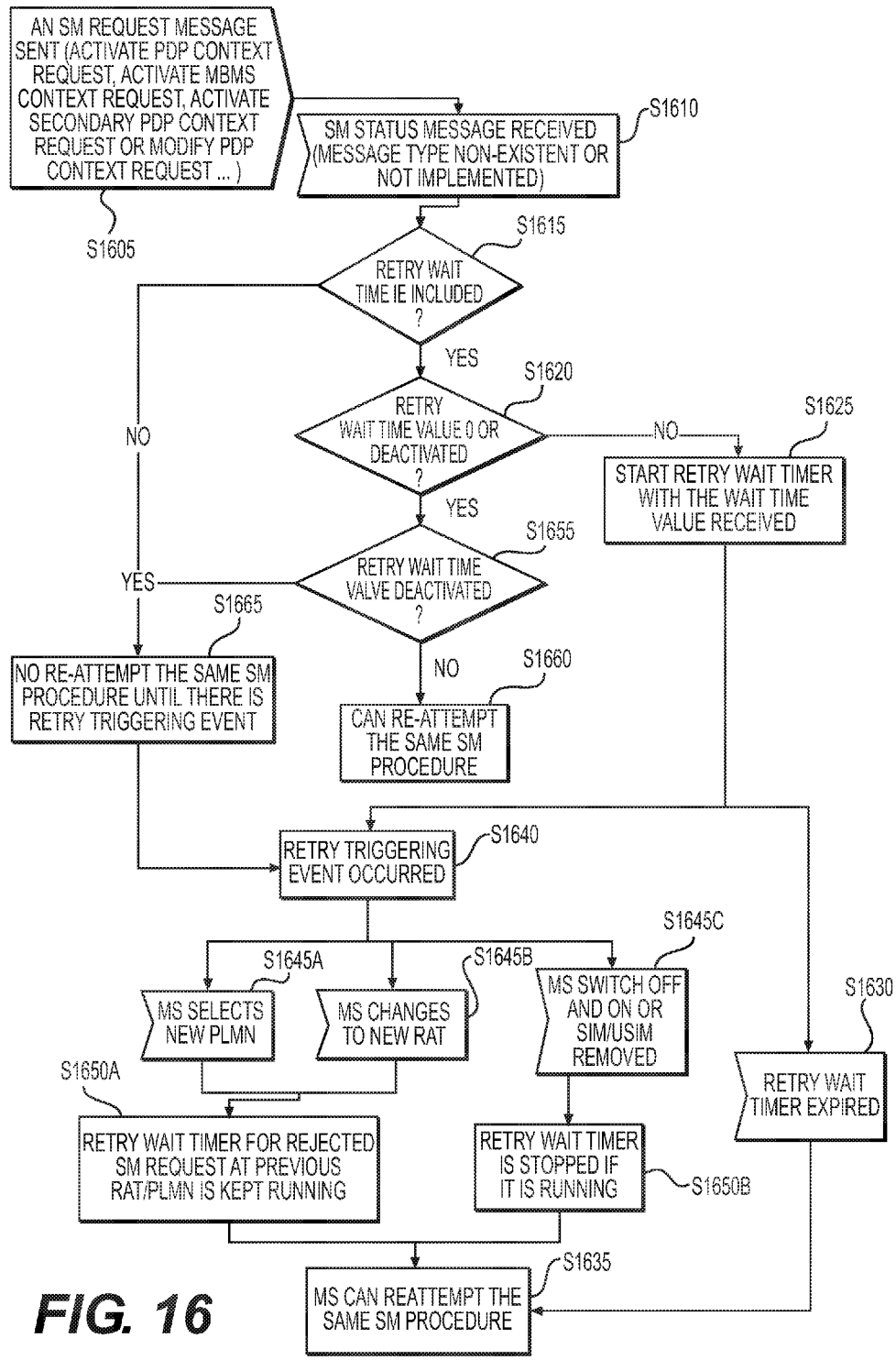
FIG. 16 is a flow chart illustrating an example of logic executed by a UE when handling a SM STATUS message in accordance with one or more example embodiments.

FIG. 16 is a flow chart illustrating an example of logic executed by a UE when handling a SM STATUS message in accordance with one or more example embodiments.

Referring to FIG. 16, in step S1605, the UE attempt an SM procedure by sending an SM request message, for example, to the SGSN 120. The SM request message sent in step S1605 may be, for example, an ACTIVATE PDP CONTEXT REQUEST, ACTIVATE SECONDARY PDP CONTEXT REQUEST, ACTIVATE MBMS CONTEXT REQUEST, OR MODIFY PDP CONTEXT REQUEST.

In step S1610, the UE 105 receives a SM STATUS message, for example from the SGSN 120. The SM STATUS message may indicate that the SM message of step S1605 was rejected, and may include an SM cause value of, for example #97 "message type non-existent or not implemented".

In step S1615, if a retry wait time (e.g., a value for timer T3397) was included in the SM STATUS message, the UE 105 proceeds to step S1620.

In step S1620, if the retry wait time value is not 0 or deactivated, the UE 105 proceeds to step S1625.

In step S1625, the UE starts the retry wait timer with the retry wait time value received in the SM STATUS message in step S1610, and does not retry the same SM procedure as that associated with the SM request message sent in step S1605 until an earliest one of the following happens: a retry triggering event occurs (S1640) or the retry wait timer expires (S1630).

After step S1625, if the UE 105 detects that the retry wait timer has expired (S1630), the UE 105 proceeds to step S1635.

In step S1635, the UE 105 performs a retry operation by sending a SM request message, for example, to the SGSN 120. The SM request message sent in step S1635 may be associated with the same SM procedure as that with which the SM request message of step S1605 is associated.

After step S1625, if the UE 105 detects that a retry triggering event has occurred (S1640), the UE 105 proceeds to step S1650A/S1650B. As is illustrated in FIG. 16, the retry triggering event can be, for example, the UE 105 selecting a new PLMN (S1645A), the UE 105 changing to a new RAT (S1645B) or the UE 105 switching off or the SIM/USIM of the UE 105 being removed (S1645C).

In step S1650A, the UE 105 keeps the retry wait timer for rejected SM request at previous RAT/PLMN running if the retry wait timer is running, and proceeds to step S1635. In step S1650B, the UE 105 stops the retry wait timer if the retry wait timer is running, and proceeds to step S1635, which is described above.

In step S1620, if the retry wait time value is 0 or deactivated, the UE 105 proceeds to step S1655.

In step S1655, if the retry wait timer is not deactivated, the UE 105 proceeds to step S1660 where the UE 105 can attempt a retry operation by attempting the same SM procedure previously attempted in step S1605, for example, by resending the SM message of step S1605 to the SGSN 120.

In step S1655, if the retry wait time is deactivated, the UE 105 proceeds to step S1665.

In step S1665, the UE 105 waits for a retry triggering event to be detected in step S1640. In step S1665, the UE 105 does not retry the SM procedure attempted in step S1605 until a retry triggering event occurs (S1640). Step S1640 is described above.

If, in step S1615, the retry wait time is not included in the SM STATUS message, the UE 105 proceeds to step S1665, which is described above.

Providing UE Retry Restriction with a RAT Dependency Indication

Examples for providing UE retry restriction using retriggering events or retriggering events and retry timers are discussed above with reference to FIGS. 3-16. As is explained above, in the examples discussed above with reference to FIGS. 3-16, if no wait time is included in a reject or status message received at the UE 105, the UE 105 may refrain from performing a retry operation until a retriggering event occurs. Further, if the UE 105 receives a wait time in a reject or status message, the UE 105 may refrain from performing a retry operation until after the earlier of (i) a retriggering event occurring, and (ii) the retry wait timer expiring.

Further, according to at least some example embodiments, a wait time value may be configured in the UE 105 such that the UE 105 may always refrain from performing a retry operation until after the earlier of (i) a retriggering event occurring and (ii) the retry wait timer expiring, even if no wait timer is included in a reject of status message received at the UE. For example, as will be discussed in greater detail below with reference to FIGS. 17-26*b*, if no wait timer value 105 is sent to the UE 105 in a reject of status message, the UE 105 may initialize a retry wait timer using the wait time value configured in the UE.

Additionally, according to at least some example embodiments, the UE 105 may operate in a RAT independent mode or a RAT dependent mode.

In the RAT independent mode, once an attempt by the UE 105 to perform a first ESM or SM procedure is rejected in a first RAT (e.g., LTE or GPRS), the UE 105 does not attempt to perform an ESM or SM procedure of the same service type as the first ESM procedure in any RAT until after the earlier of (i) a retriggering event occurring and (ii) the retry wait timer expiring. For example, both GPRS and EPS RATs have particular Request messages associated with the service of setting up a PDN connection. Accordingly, ESM and SM request messages for setting up a PDN connection are examples of request messages of a first service type. Further, both GPRS and EPS RATs have particular Request messages associated with the service of establishing bearers within the PDN connection. Accordingly, ESM and SM request messages for establishing bearers within the PDN connection are examples of request messages of a second service type. Accordingly, as an example, if the UE 105 operating in RAT independent mode sends an ESM Request with the message type PDN CONNECTIVITY REQUEST while attached to an EPS network, and the UE 105 switches to a GPRS network thereafter, the UE 105 will restrict itself from sending an SM Request with the message type ACTIVATE PDP CONTEXT REQUEST until after the earlier of (i) a retriggering event occurring and (ii) the retry wait timer expiring. While in RAT independent mode, the UE 105 will operate in the manner discussed above because, despite being associated with different RATs (i.e., EPS and GPRS) the PDN CONNECTIVITY REQUEST ESM Request is considered to have the same service type as the ACTIVATE PDP CONTEXT REQUEST SM Request.

In the RAT dependent mode, once an attempt by the UE 105 to perform an ESM or SM procedure is rejected in a first RAT (e.g., LTE or GPRS), the UE 105 can immediately attempt to perform the ESM or SM procedure once in another RAT, even before (i) a retriggering event occurring and (ii) the retry wait timer expiring. For example, if an SM request message sent by the UE 105 to the SGSN 120 is rejected, the UE 105 can immediately attempt to send an ESM request message to the MME 160, without waiting for a retriggering event or the expiration of the retry timer, even if the ESM request message corresponds to the same type of procedure as the SM request message.

As will be discussed in greater detail below with reference to FIGS. 17-26B, a UE in communication network 100 may determine whether to operate in RAT dependent mode or RAT independent mode based on the contents of an SM/ESM reject or status message.

Figure 17:
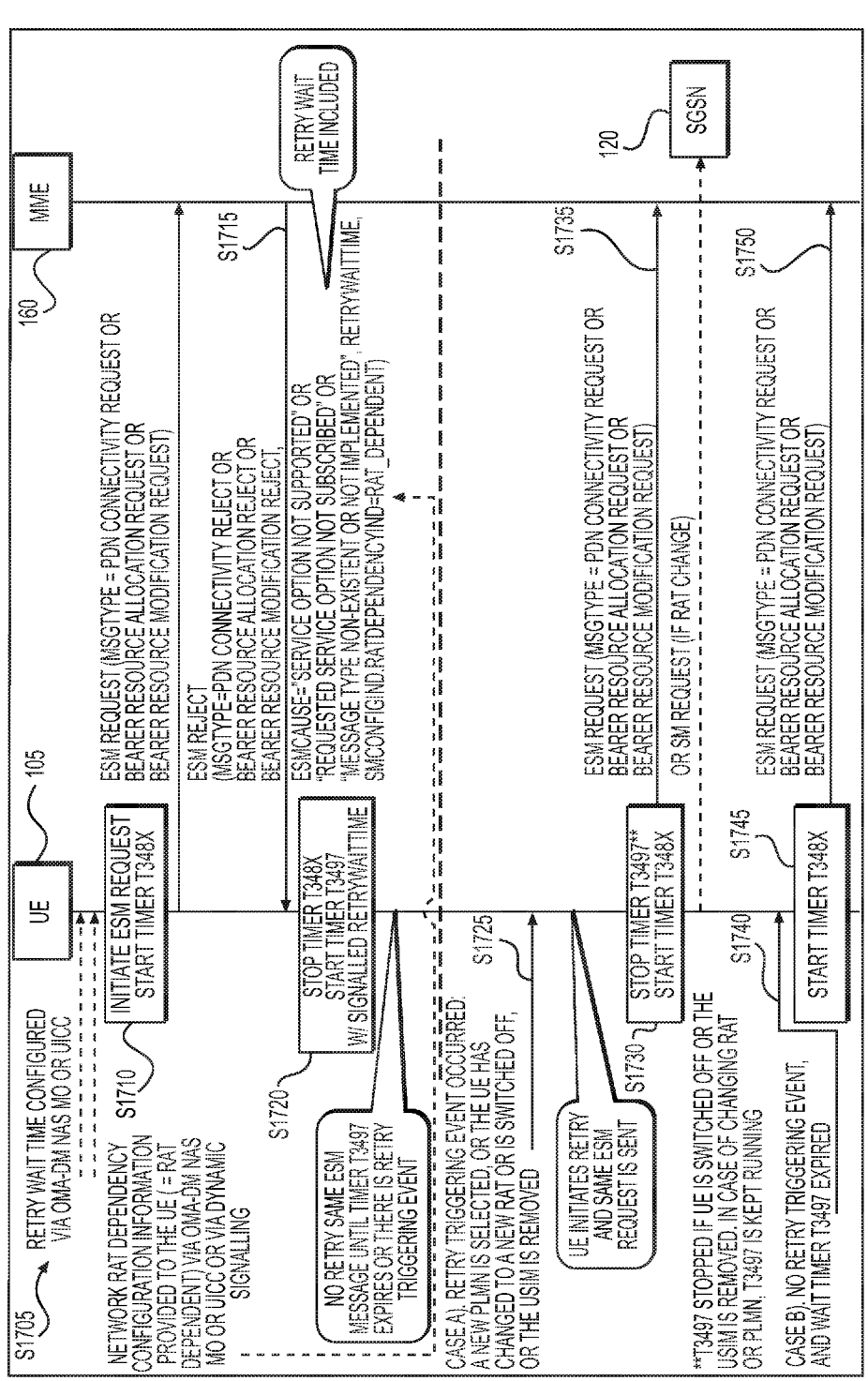
FIG. 17 illustrates a 4G EPC network example of providing UE retry restriction using an RAT dependency indicator indicating an RAT independent mode and a retry wait time in an ESM reject message.

FIG. 17 illustrates a 4G EPC network example of providing UE retry restriction using an RAT dependency indicator indicating an RAT independent mode and a retry wait time in an ESM reject message.

Referring to FIG. 17, in step S1705, a wait time is configured for the UE 105. The wait time may be configured in the UE 105 through, for example, open mobile alliance (OMA) device management—(DM) protocol signaling, non-access stratum (NAS) signaling, or configuration of a universal integrated circuit card (UICC) included in the UE 105.

In step S1710 the UE 105 may initiate an ESM request, start timer T348x and send an ESM request message to the MME 160. The ESM request message may have a message type value of, for example, PDN CONNECTIVITY REQUEST, BEARER RESOURCE ALLOCATION REQUEST, or BEARER RESOURCE MODIFICATION REQUEST.

In step S1715, the MME 160 may send an ESM reject message to the UE 105. The ESM reject message may have a message type value of, for example, PDN CONNECTIVITY REJECT, BEARER RESOURCE ALLOCATION REJECT, or BEARER RESOURCE MODIFICATION REJECT. The ESM reject message may have an ESM cause value of, for example, "service option not supported", "requested service option not subscribed", or "message type non-existent or not implemented". The ESM reject message sent in step S1715 may also include a retry wait time value retryWaitTime. Further, according to at least some example embodiments, the communications network 100 may employ dynamic signaling to instruct the UE 105 to operate in a RAT dependent mode by including a RAT dependency indicator (e.g., RAT_dependent) in the ESM reject message sent in step S1715. In addition to, or as an alternative to, including a RAT dependency indicator in the ESM reject message sent in step S1715, a RAT dependency mode of the UE 105 may be configured in the UE 105 through, for example, OMA-DM protocol signaling, NAS signaling, or configuration of a UICC included in the UE 105. In the example shown in FIG. 17, the UE 105 is configured with a RAT dependency mode type of RAT dependent. According to one or more example embodiments, an RAT dependency mode type configured in the UE 105 may indicate a default RAT dependency mode which the UE 105 uses if no RAT dependency indicator is included in the ESM reject message sent in step S1715.

In step S1720, the UE 105 stops timer T348x, and starts ESM retry wait timer (e.g. timer T3497) with the timer value retryWaitTime received in step S1715. According to one or more example embodiments, the UE 105 will not attempt a retry operation until the earlier of (a) a retry triggering event occurring (S1725), and (b) the ESM retry wait timer T3497 expiring (S1740).

With respect to (a) the retry triggering event, in step S1725, the UE 105 detects a retry triggering event before the ESM retry wait timer (e.g. timer T3497) expires. The retry triggering event detected in step S1725 may be, for example, the UE 105 selecting a new PLMN; the UE 105 moving to a new RAT; the UE 105 switching off, or the SIM/USIM of the UE 105 being removed.

As a result of detecting the retry triggering event in step S1725, the UE 105 performs steps S1730 and S1735.

In step S1730, if the triggering event is the UE changing RAT or PLMN, the ESM retry wait timer (e.g. timer T3497) is kept running. In case the trigger event is the UE switching off or the USIM removal, the UE 105 stops the ESM retry wait timer (e.g. timer T3497).

Further, in step S1735, the UE 105 participates in a retry operation by sending another ESM request to the MME 160 and starts the timer T348x. The ESM request sent in step S1735 may be of the same type as that described above with respect to step S1710. Further, in the case that the retry triggering event detected in step S1725 is a RAT change indicating that the UE 105 is changing from the LTE network 150 to the GPRS network 110, the UE 105 sends an SM message to the SGSN 120 in step S1735, instead of, sending the ESM request to the MME 160.

With respect to (b) the ESM retry timer expiring, if the UE 105 determines that the ESM retry wait timer (e.g. timer T3497) expired before the UE 105 detected any retry triggering event (S1740), the UE 105 does not perform steps S1730 and S1735, and, instead, the UE 105 starts the timer T348x in step S1745 and sends another ESM request message to the MME 160 in step S1750.

Accordingly, in the example shown in FIG. 17, after receiving a ESM reject message from the MME 160 in step S1715, the UE 105 does not attempt a retry operation by sending another ESM request message to the MME 160 until after the earlier of (a) a retry triggering event occurring, and (b) the ESM retry wait timer (e.g. timer T3497) expiring. Further, the ESM reject message may indicate an RAT dependency mode in which the UE 105 is to operate.

Figure 18:
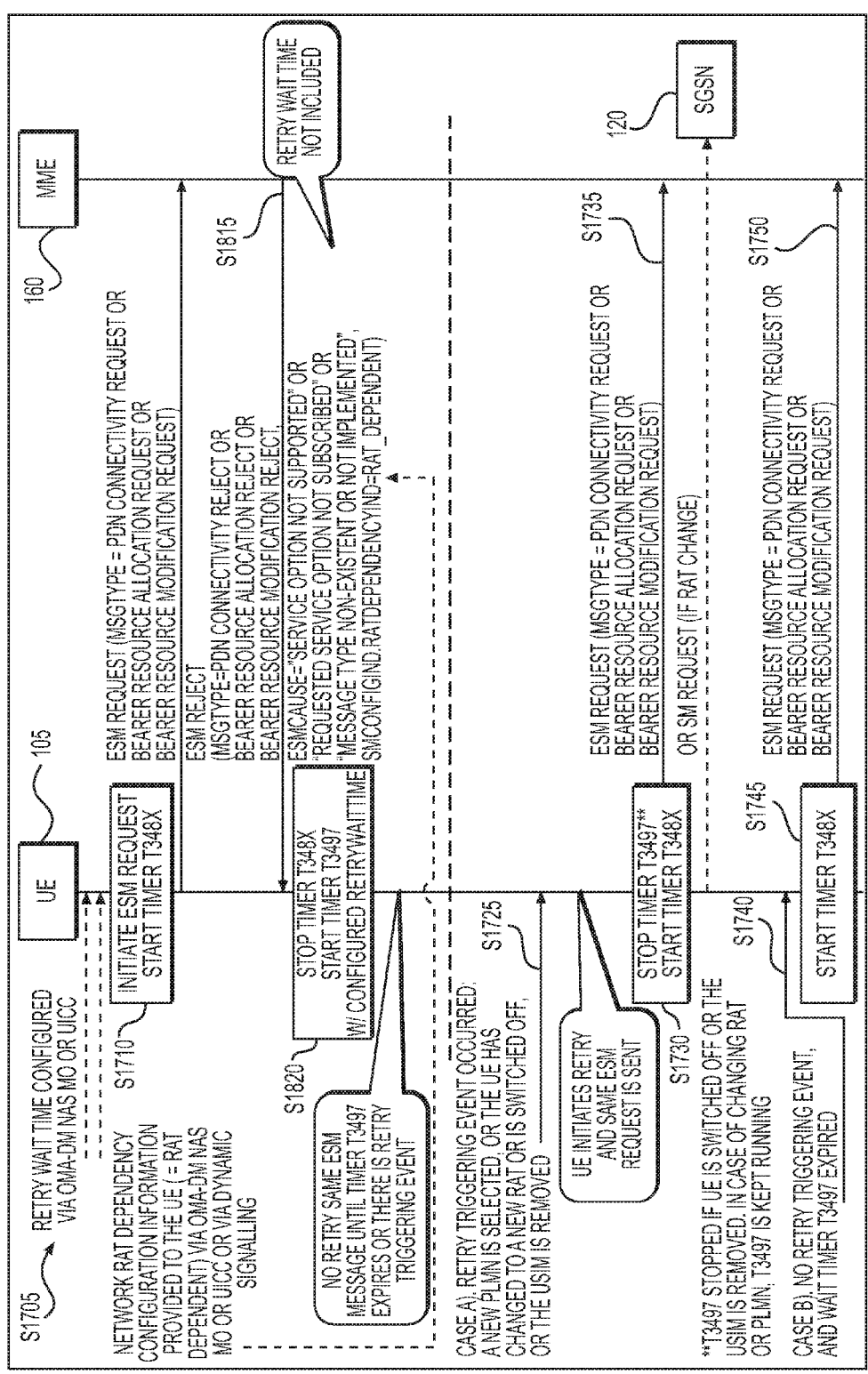
FIG. 18 illustrates a 4G EPC network example of providing UE retry restriction using an RAT dependency indicator indicating an RAT dependent mode without a retry wait time in an ESM reject message.

FIG. 18 illustrates a 4G EPC network example of providing UE retry restriction using an RAT dependency indicator indicating an RAT dependent mode without a retry wait time in an ESM reject message.

As is shown in FIG. 18, many of the operations in FIG. 18 are the same as those shown in FIG. 17. The operations shown in FIG. 18 differ from those shown in FIG. 17 as follows. After step S1710, in step S1815, the MME 160 sends an ESM reject message to the UE 105. The ESM reject message sent in step S1815 is the same as that described above with respect to step S1715 with the exception that the ESM reject message sent in step S1815 does not include a retry wait time value retryWaitTime. Further, after the UE 105 receives the ESM reject message in step S1815, in step S1820, the UE 105 stops the timer T348x, and starts the ESM retry wait timer (e.g. timer T3497) using, as the initial timer value of the ESM retry wait timer (e.g. timer T3497), the timer value configured in the UE 105 in step S1705. According to one or more example embodiments, after step S1820, in the same manner discussed above with respect to FIG. 17, the UE 105 will not attempt a retry operation until the earlier of (a) a retry triggering event occurring (S1725), and (b) the ESM retry wait timer (e.g. timer T3497) expiring (S1740).

Figure 19:
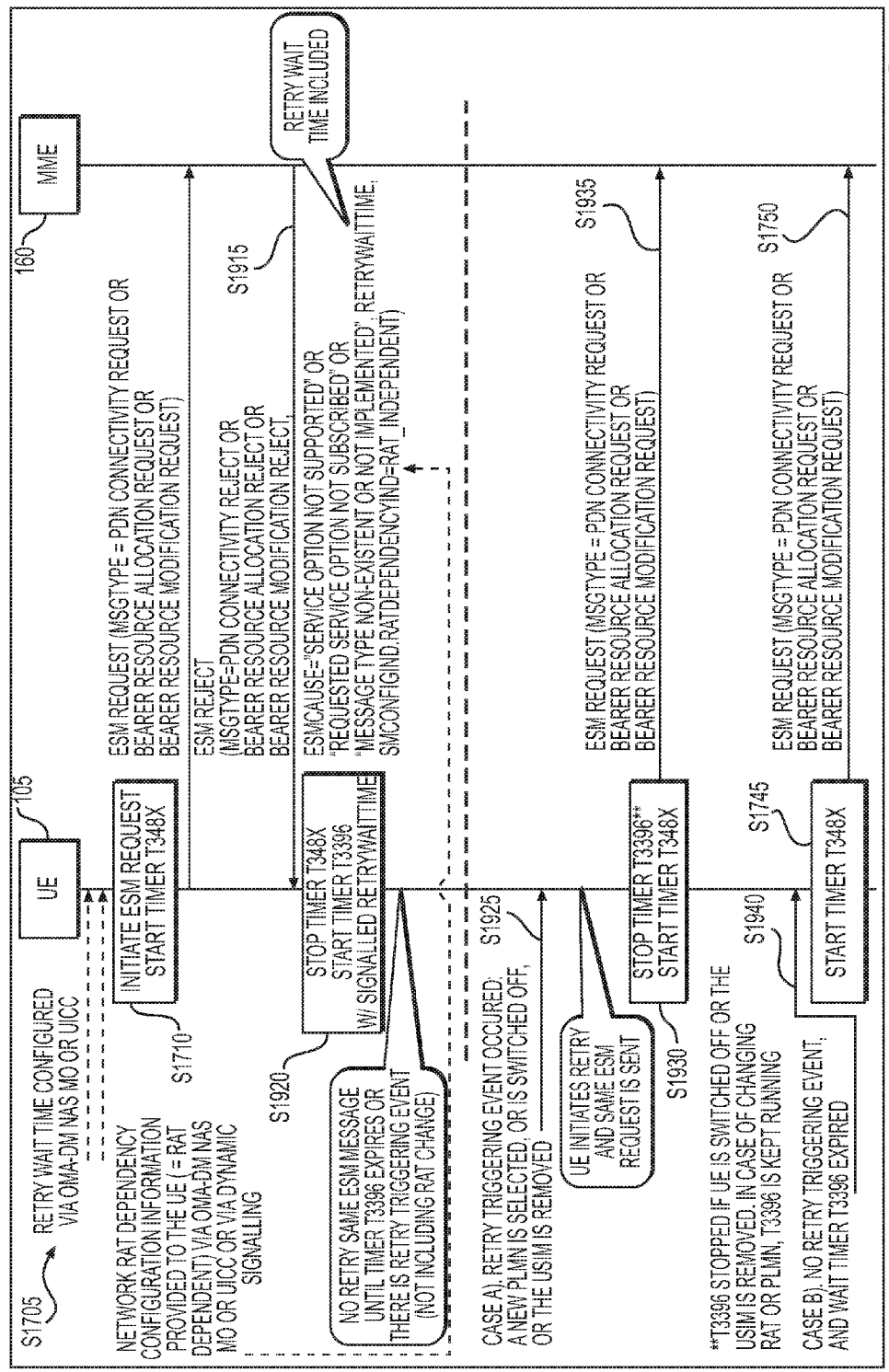
FIG. 19 illustrates a 4G EPC network example of providing UE retry restriction using a RAT dependency indicator indicating an RAT independent mode and a retry wait time value in an ESM reject message.

FIG. 19 illustrates a 4G EPC network example of providing UE retry restriction using a RAT dependency indicator indicating an RAT independent mode and a retry wait time value in an ESM reject message.

As is shown in FIG. 19, many of the operations in FIG. 19 are the same as those shown in FIG. 17. The operations shown in FIG. 19 differ from those shown in FIG. 17 as follows. After step S1710, the MME 160 sends an ESM reject message in step S1915. The ESM reject message sent in step S1915 is the same as that described above with respect to step S1715 with the exception that the ESM reject message sent in step S1915 includes an RAT dependency indicator RAT_independent, which indicates an RAT independent mode. Further, step S1920 is the same as step S1720 with the exception that, instead of starting ESM retry wait timer (e.g. timer T3497), in step S1920 the UE 105 starts retry wait timer T3396. In step S1920, the UE 105 may start the timer T3396 using the timer value retryWaitTime included in the ESM reject message received in step S1915. Step S1925 may be the same as step S1725 with the exception that the UE 105 changing to a new RAT is no longer a retry triggering event. For example, because, in FIG. 19, the UE 105 is operating in the RAT independent mode, the UE 105 does not perform a retry operation simply because the UE 105 changes RATs. Further, step S1930 may be the same as step S1730 with the exception that the retry wait timer T3396 is used in step S1930 instead of the ESM retry wait timer (e.g. timer T3497). Further, step S1935 may be the same as step S1735 with the exception that no ESM request message is sent from the UE 105 to the SGSN 120 because, as is discussed above, in RAT independent mode, changing the RAT of the UE 105 is not a retry triggering event. Further, step S1940, is the same as step S1740 with the exception that step S1940 takes place when the retry timer T3396 expires. Accordingly, the UE 105 will not attempt a retry operation until the earlier of (a) a retry triggering event occurring (S1925), and (b) the retry wait timer T3396 expiring (S1940).

As used herein, the act of a UE starting/stopping the timer T3396 in association with an ESM/SM request of a particular ESM/SM request type for a particular APN sent by the UE refers to the UE starting/stopping a T3396 timer instance for the particular ESM/SM request type and the particular APN in a given PLMN.

FIG. 20 illustrates a 4G EPC network example of providing UE retry restriction using a RAT dependency indicator indicating an RAT independent mode and no retry wait time value in an ESM reject message.

As is shown in FIG. 20, many of the operations in FIG. 20 are the same as those shown in FIG. 19. The operations shown in FIG. 20 differ from those shown in FIG. 19 as follows. After step S1710, in step S2015, the MME 160 sends an ESM reject message to the UE 105. The ESM reject message sent in step S2015 is the same as that described above with respect to step S1915 with the exception that the ESM reject message sent in step S2015 does not include a retry wait time value retryWaitTime. Further, after the UE 105 receives the ESM reject message in step S2015, in step S2020, the UE 105 stops the timer T348x, and starts the timer T3396 using, as the initial timer value of the timer T3396, the timer value configured in the UE 105 in step S1705. According to one or more example embodiments, after step S2020, in the same manner discussed above with respect to FIG. 19, the UE 105 will not attempt a retry operation until the earlier of (a) a retry triggering event occurring (S1925), and (b) the retry wait timer T3396 expiring (S1940).

FIGS. 21A and 21B illustrate 4G EPC network examples of providing UE retry restriction using the absence or presence of a retry wait time value in an ESM reject message as a RAT dependency indicator indicating an RAT independent mode.

Referring to FIG. 21A, in step S2105, a wait time is configured for the UE 105. The wait time may be configured in the UE 105 through, for example, OMA-DM protocol signaling, NAS signaling, or configuration of a UICC included in the UE 105.

In step S2110 the UE 105 may initiate an ESM request start timer T348x and send an ESM request message to the MME 160. The ESM request message may have a message type value of, for example, PDN CONNECTIVITY REQUEST, BEARER RESOURCE ALLOCATION REQUEST, or BEARER RESOURCE MODIFICATION REQUEST.

In step S2115, the MME 160 may send an ESM reject message to the UE 105. The ESM reject message may have a message type value of, for example, PDN CONNECTIVITY REJECT, BEARER RESOURCE ALLOCATION REJECT, or BEARER RESOURCE MODIFICATION REJECT. The ESM reject message may have an ESM cause value of, for example, "service option not supported", "requested service option not subscribed", or "message type non-existent or not implemented". The ESM reject message sent in step S2115 may not include a retry wait time value retryWaitTime. According to at least some example embodiments, in the example shown in FIG. 21A, when the UE 105 receives the ESM reject message not including the retry wait time in step S2115, the UE 105 may interpret the absence of the retry wait time in the ESM reject message as an indication that the UE 105 is to operate in the RAT dependent mode.

In step S2120, the UE 105 stops timer T348x, and starts ESM retry wait timer (e.g. timer T3497) with the retry wait time value configured in the UE 105 in step S2105. According to one or more example embodiments, the UE 105 will not attempt a retry operation until the earlier of (a) a retry triggering event occurring (S2125), and (b) the ESM retry wait timer (e.g. timer T3497) expiring (S2140).

With respect to (a) the retry triggering event, in step S2125, the UE 105 detects a retry triggering event before the ESM retry wait timer (e.g. timer T3497) expires. The retry triggering event detected in step S2125 may be, for example, the UE 105 selecting a new PLMN; the UE 105 moving to a new RAT; the UE 105 switching off, or the SIM/USIM of the UE 105 being removed.

As a result of detecting the retry triggering event in step S2125, the UE 105 performs steps S2130 and S2135.

In step S2130, if the triggering event is the UE changing RAT or PLMN, the ESM retry wait timer (e.g. timer T3497) is kept running. In case the trigger event is the UE switching off or the USIM removal, the UE 105 stops the ESM retry wait timer (e.g. timer T3497).

Further, in step S2135, the UE 105 participates in a retry operation by sending another ESM request to the MME 160 and starts the timer T348x. The ESM request sent in step S2135 may be of the same type as that described above with respect to step S2110. Further, in the case that the retry triggering event detected in step S2125 is a RAT change indicating that the UE 105 is changing from the LTE network 150 to the GPRS network 110, the UE 105 sends an SM message to the SGSN 120 in step S2135, instead of, sending the ESM request to the MME 160.

With respect to (b) the ESM retry timer expiring, if the UE 105 determines that the ESM retry wait timer (e.g. timer T3497) expired before the UE 105 detected any retry triggering event (S2140), the UE 105 does not perform steps S2130 and S2135, and, instead, the UE 105 starts the timer T348x in step S2145 and sends another ESM request message to the MME 160 in step S2150.

Accordingly, in the example shown in FIG. 21A, after receiving a ESM reject message from the MME 160 in step S2115, the UE 105 does not attempt a retry operation by sending another ESM request message to the MME 160 until after the earlier of (a) a retry triggering event occurring, and (b) the ESM retry wait timer (e.g. timer T3497) expiring. Further, the absence of the retry timer value retryWaitTime from the ESM reject message may indicate that the UE 105 is to operate in the RAT dependent mode.

As is shown in FIG. 21B, many of the operations in FIG. 21B are the same as those shown in FIG. 21A. The operations shown in FIG. 21B differ from those shown in FIG. 21A as follows. After step S2110, the MME 160 sends an ESM reject message to the UE 105 in step S2117. The ESM reject message sent in step S2117 may be the same as the ESM message S2115 with the exception that the ESM message sent in step S2117 includes a retry timer retryWaitTime. According to at least some example embodiments, in the example shown in FIG. 21B, when the UE 105 receives the ESM reject message including the retry wait time value retryWaitTime in step S2115, the UE 105 may interpret the presence of the retry wait time value in the ESM reject message as an indication that the UE 105 is to operate in the RAT independent mode. Step S2122 may be the same as step S2120 with the exception that the UE 105 starts the retry timer T3396 instead of the ESM retry wait timer (e.g. timer T3497). Further, in step S2122, instead of using the timer value configured in the UE 105 in step S2105, the UE 105 starts the retry timer T3396 using the timer value retryWaitTime included in the ESM reject message received by the UE 105 in step S2117. Step S2127 may be the same as step S2125 with the exception that the UE 105 changing to a new RAT is no longer a retry triggering event. For example, because, in FIG. 21B, the UE 105 is operating in the RAT independent mode, the UE 105 does not perform a retry operation simply because the UE 105 changes RATs. Further, step S2132 may be the same as step S2130 with the exception that the timer T3396 is used in step S2132 instead of the ESM retry wait timer (e.g. timer T3497). Further, step S2137 may be the same as step S2135 with the exception that no ESM request message is sent from the UE 105 to the SGSN 120 because, as is discussed above, in RAT independent mode, changing the RAT of the UE 105 is not a retry triggering event. Further, step S2142 is the same as step S2140 with the exception that step S2142 takes place when the retry timer T3396 expires. Accordingly, in FIG. 21B, the UE 105 will not attempt a retry operation until the earlier of (a) a retry triggering event occurring (S2127), and (b) the retry wait timer T3396 expiring (S2140).

FIG. 22 illustrates a GPRS network example of providing UE retry restriction using an RAT dependency indicator indicating an RAT independent mode and a retry wait time in an SM reject message.

Referring to FIG. 22, in step S2205, a wait time is configured for the UE 105. The wait time may be configured in the UE 105 through, for example, OMA-DM protocol signaling, NAS signaling, or configuration of a UICC included in the UE 105.

In step S2210 the UE 105 may initiate an SM request, start timer T338x and send an SM request message to the SGSN 120. The SM request message may have a message type value of, for example, ACTIVATE PDP CONTEXT REQUEST, ACTIVATE SECONDARY PDP CONTEXT REQUEST, OR MODIFY PDP CONTEXT REQUEST.

In step S2215, the SGSN 120 may send an SM reject message to the UE 105. The SM reject message may have a message type value of, for example, ACTIVATE PDP CONTEXT REJECT, ACTIVATE SECONDARY PDP CONTEXT REJECT, OR MODIFY PDP CONTEXT REJECT. The SM reject message may have an SM cause value of, for example, "service option not supported", "requested service option not subscribed", or "message type non-existent or not implemented". The SM reject message sent in step S2215 may also include a retry wait time value retryWaitTime. Further, according to at least some example embodiments, the communications network 100 may employ dynamic signaling to instruct the UE 105 to operate in a RAT dependent mode by including a RAT dependency indicator RAT_dependent in the SM reject message sent in step S2215. In addition to, or as an alternative to, including a RAT dependency indicator in the SM reject message sent in step S2215, an RAT dependency mode of the UE 105 may be configured in the UE 105 through, for example, OMA-DM protocol signaling, NAS signaling, or configuration of a UICC included in the UE 105. In the example shown in FIG. 22, the UE 105 is configured with a RAT dependency mode type of RAT dependent. According to one or more example embodiments, an RAT dependency mode type configured in the UE 105 may indicate a default RAT dependency mode which the UE 105 uses if no RAT dependency indicator is included in the SM reject message sent in step S2215.

In step S2220, the UE 105 stops timer T338x, and starts timer T3397 with the timer value retryWaitTime received in step S2215. According to one or more example embodiments, the UE 105 will not attempt a retry operation until the earlier of (a) a retry triggering event occurring (S2225), and (b) the retry wait timer T3397 expiring (S2240).

With respect to (a) the retry triggering event occurring, in step S2225, the UE 105 detects a retry triggering event before the retry wait timer T3397 expires. The retry triggering event detected in step S2225 may be, for example, the UE 105 selecting a new PLMN; the UE 105 moving to a new RAT; the UE 105 switching off, or the SIM/USIM of the UE 105 being removed.

As a result of detecting the retry triggering event in step S2225, the UE 105 performs steps S2230 and S2235.

In step S2230, the UE 105 stops the timer T3397 and starts the timer T338x.

Further, in step S2235, the UE 105 participates in a retry operation by sending another SM request to the SGSN 120. The SM request sent in step S2235 may be of the same type as that described above with respect to step S2210. Further, in the case that the retry triggering event detected in step S2225 is a RAT change indicating that the UE 105 is changing from the GPRS network 110 to the LTE network 150, the UE 105 sends an ESM message to the MME 160 in step S2235, instead of, sending the SM request to the SGSN 120.

With respect to (b) the ESM retry timer expiring, if the UE 105 determines that the ESM retry wait timer (e.g. timer T3397) expired before the UE 105 detected any retry triggering event (S2240), the UE 105 does not perform steps S2230 and S2235, and, instead, the UE 105 starts the timer T338x in step S2245 and sends another ESM request message to the MME 160 in step S2250.

Accordingly, in the example shown in FIG. 22, after receiving a SM reject message from the SGSN 120 in step S2215, the UE 105 does not attempt a retry operation by sending another SM request message to the SGSN 120 until after the earlier of (a) a retry triggering event occurring, and (b) the retry wait timer T3397 expiring. Further, the SM reject message may indicate an RAT dependency mode in which the UE 105 is to operate.

Figure 23:
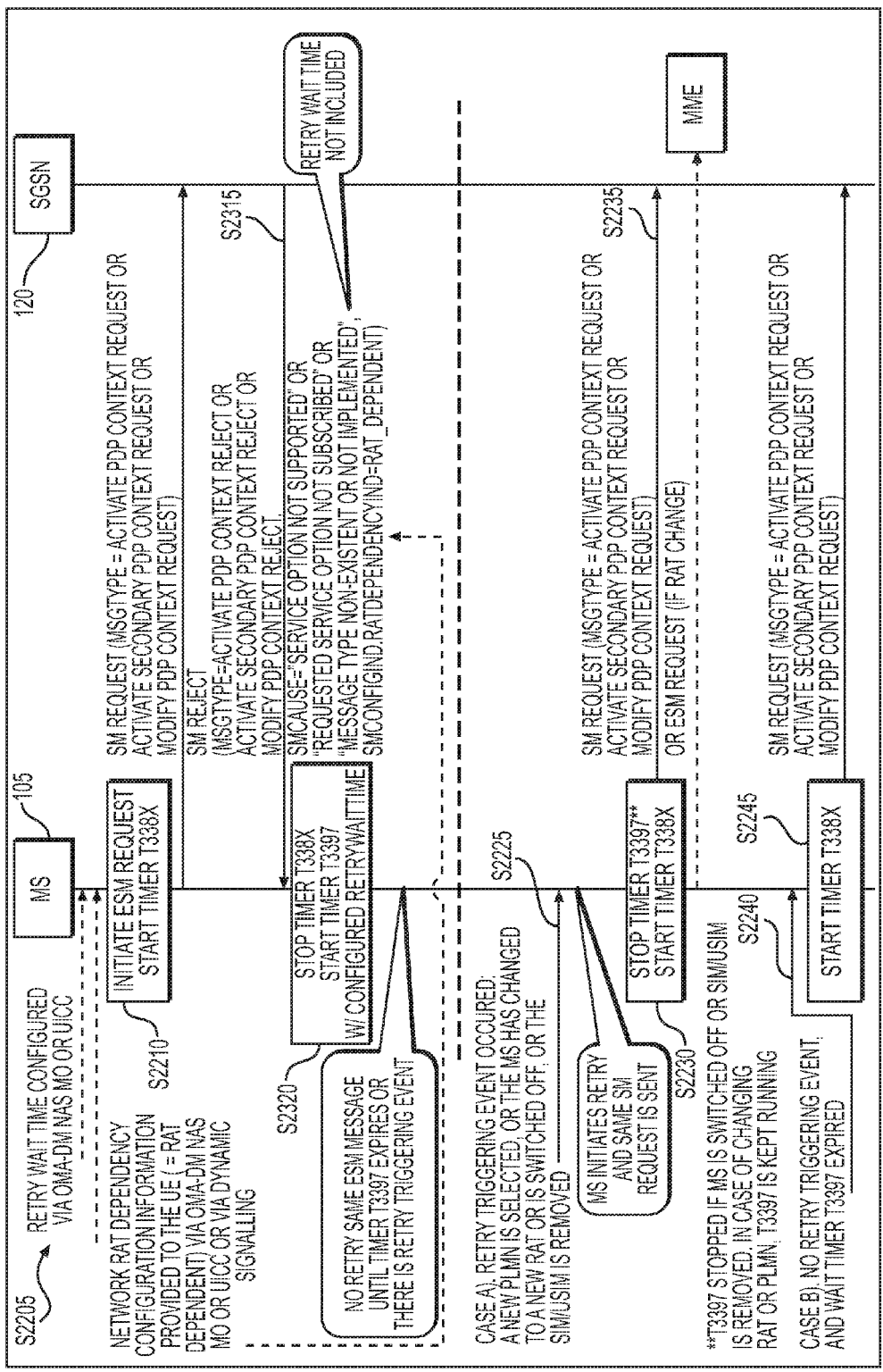
FIG. 23 illustrates a GPRS network example of providing UE retry restriction using an RAT dependency indicator indicating an RAT dependent mode without a retry wait time in an SM reject message.

FIG. 23 illustrates a GPRS network example of providing UE retry restriction using an RAT dependency indicator indicating an RAT dependent mode without a retry wait time in an SM reject message.

As is shown in FIG. 23, many of the operations in FIG. 23 are the same as those shown in FIG. 22. The operations shown in FIG. 23 differ from those shown in FIG. 22 as follows. After step S2210, in step S2315, the SGSN 120 sends an SM reject message to the UE 105. The SM reject message sent in step S2315 is the same as that described above with respect to step S2215 with the exception that the SM reject message sent in step S2315 does not include a retry wait time value retryWaitTime. Further, after the UE 105 receives the SM reject message in step S2315, in step S2320, the UE 105 stops the timer T338x, and starts the timer T3397 using, as the initial timer value of the timer T3397, the timer value configured in the UE 105 in step S2205. According to one or more example embodiments, after step S2320, in the same manner discussed above with respect to FIG. 22, the UE 105 will not attempt a retry operation until the earlier of (a) a retry triggering event occurring (S2225), and (b) the retry wait timer T3397 expiring (S2240).

Figure 24:
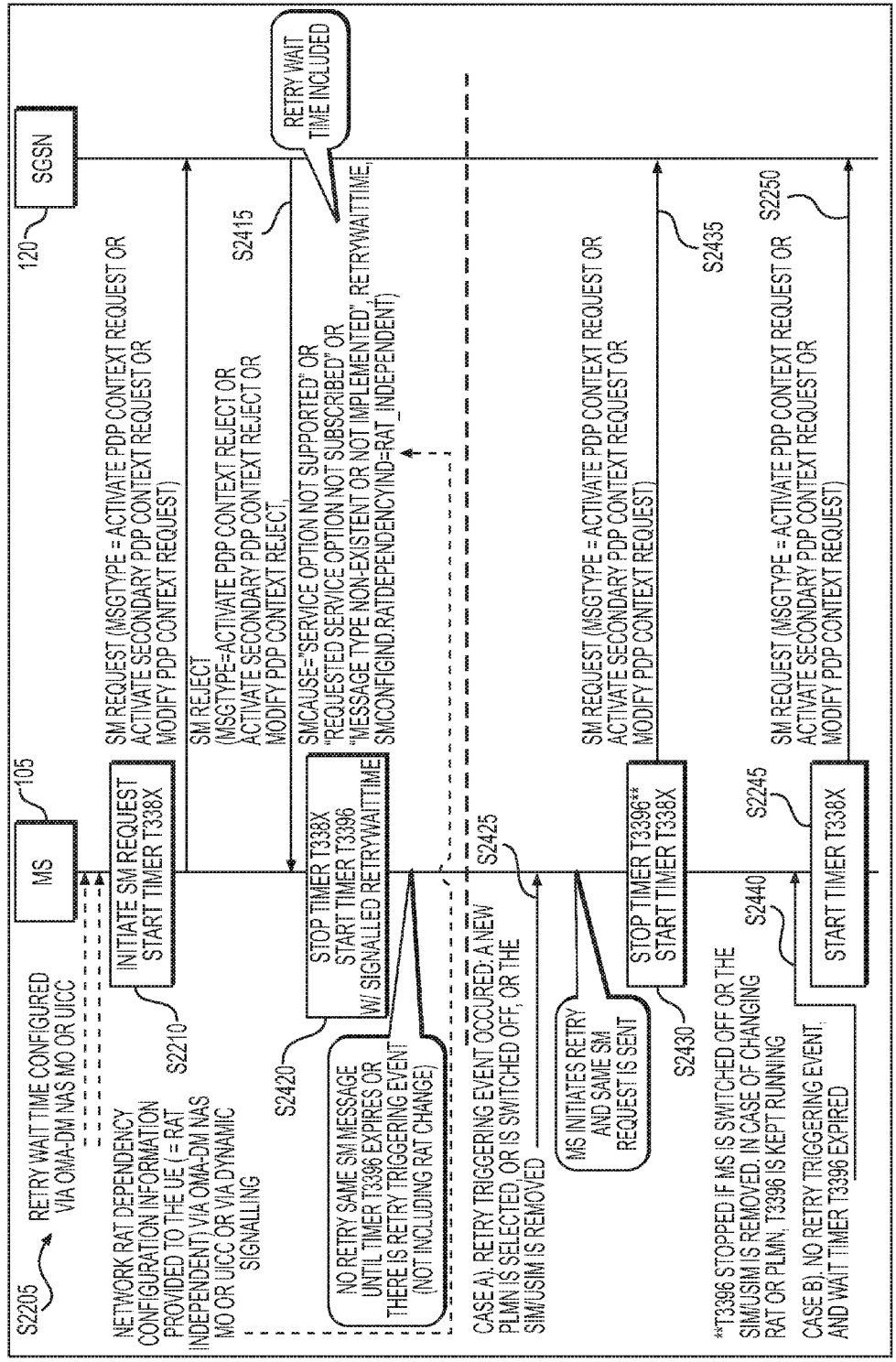
FIG. 24 illustrates a GPRS network example of providing UE retry restriction using a RAT dependency indicator indicating an RAT independent mode and a retry wait time value in an SM reject message.

FIG. 24 illustrates a GPRS network example of providing UE retry restriction using a RAT dependency indicator indicating an RAT independent mode and a retry wait time value in an SM reject message.

As is shown in FIG. 24, many of the operations in FIG. 24 are the same as those shown in FIG. 22. The operations shown in FIG. 24 differ from those shown in FIG. 22 as follows. After step S2210, the SGSN 120 sends an SM reject message in step S2415. The SM reject message sent in step S2415 is the same as that described above with respect to step S2215 with the exception that the SM reject message sent in step S2415 includes an RAT dependency indicator RAT_independent, which indicates an RAT independent mode. Further, step S2420 is the same as step S2220 with the exception that, instead of starting retry wait timer T3397, in step S2420 the UE 105 starts retry wait timer T3396. In step S2420, the UE 105 may start the timer T3396 using the timer value retryWaitTime included in the SM reject message received in step S2415. Step S2425 may be the same as step S2225 with the exception that the UE 105 changing to a new RAT is no longer a retry triggering event. For example, because, in FIG. 24, the UE 105 is operating in the RAT independent mode, the UE 105 does not perform a retry operation simply because the UE 105 changes RATs. Further, step S2430 may be the same as step S2230 with the exception that the timer T3396 is used in step S2430 instead of the timer T3397. Further, step S2435 may be the same as step S2235 with the exception that no SM request message is sent from the UE 105 to the SGSN 120 because, as is discussed above, in RAT independent mode, changing the RAT of the UE 105 is not a retry triggering event. Further, step S2440, is the same as step S2240 with the exception that step S2440 takes place when the retry timer T3396 expires. Accordingly, the UE 105 will not attempt a retry operation until the earlier of (a) a retry triggering event occurring (S2425), and (b) the retry wait timer T3396 expiring (S2440).

Figure 25:
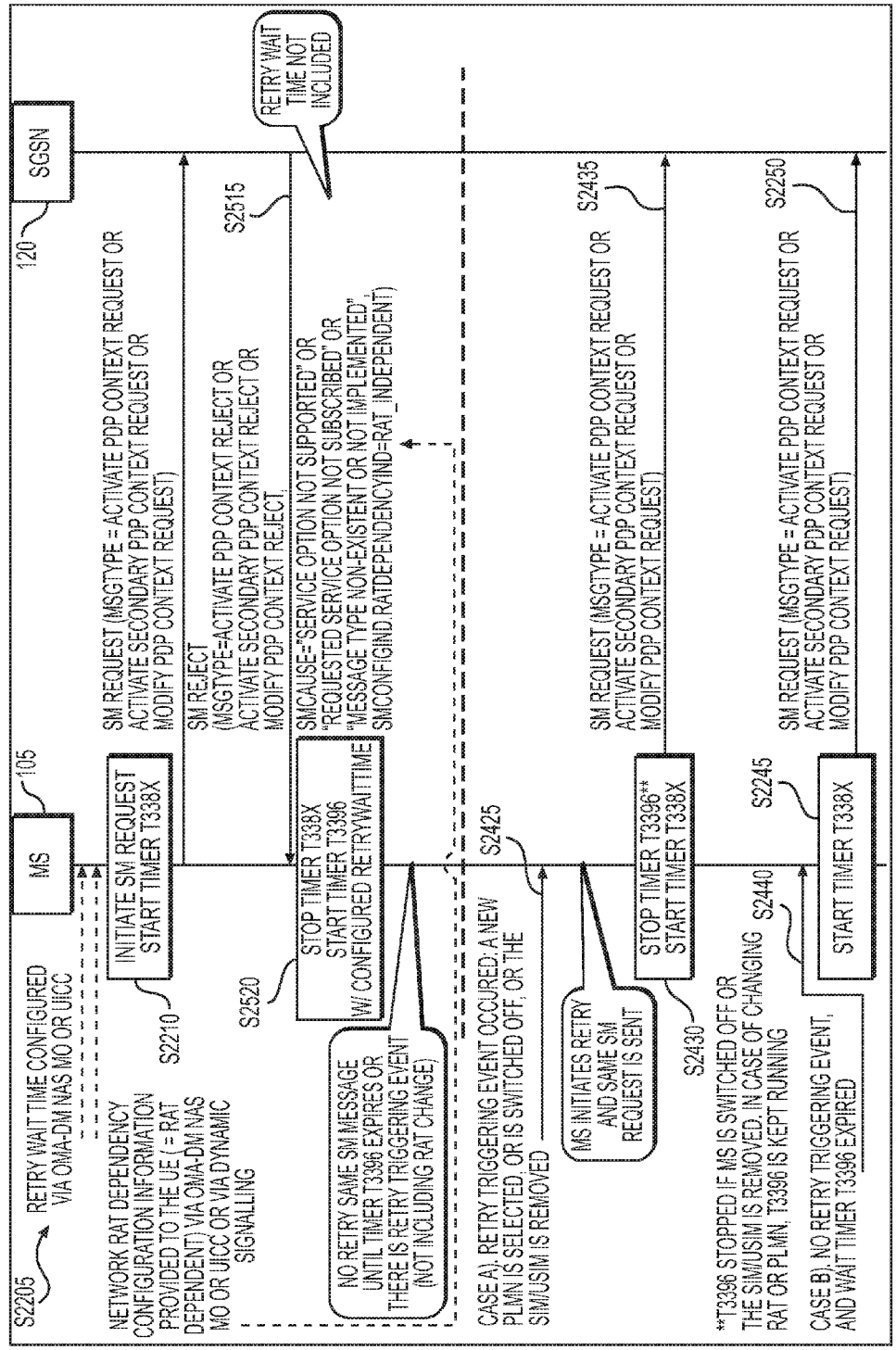
FIG. 25 illustrates a GPRS network example of providing UE retry restriction using a RAT dependency indicator indicating an RAT independent mode and no retry wait time value in an SM reject message.

FIG. 25 illustrates a GPRS network example of providing UE retry restriction using a RAT dependency indicator indicating an RAT independent mode and no retry wait time value in an SM reject message.

As is shown in FIG. 25, many of the operations in FIG. 25 are the same as those shown in FIG. 24. The operations shown in FIG. 25 differ from those shown in FIG. 24 as follows. After step S2210, in step S2515, the SGSN 120 sends an SM reject message to the UE 105. The SM reject message sent in step S2515 is the same as that described above with respect to step S2415 with the exception that the SM reject message sent in step S2515 does not include a retry wait time value retryWaitTime. Further, after the UE 105 receives the SM reject message in step S2515, in step S2520, the UE 105 stops the timer T338x, and starts the timer T3396 using, as the initial timer value of the timer T3396, the timer value configured in the UE 105 in step S2205. According to one or more example embodiments, after step S2520, in the same manner discussed above with respect to FIG. 24, the UE 105 will not attempt a retry operation until the earlier of (a) a retry triggering event occurring (S2425), and (b) the retry wait timer T3396 expiring (S2440).

Figure 26A:
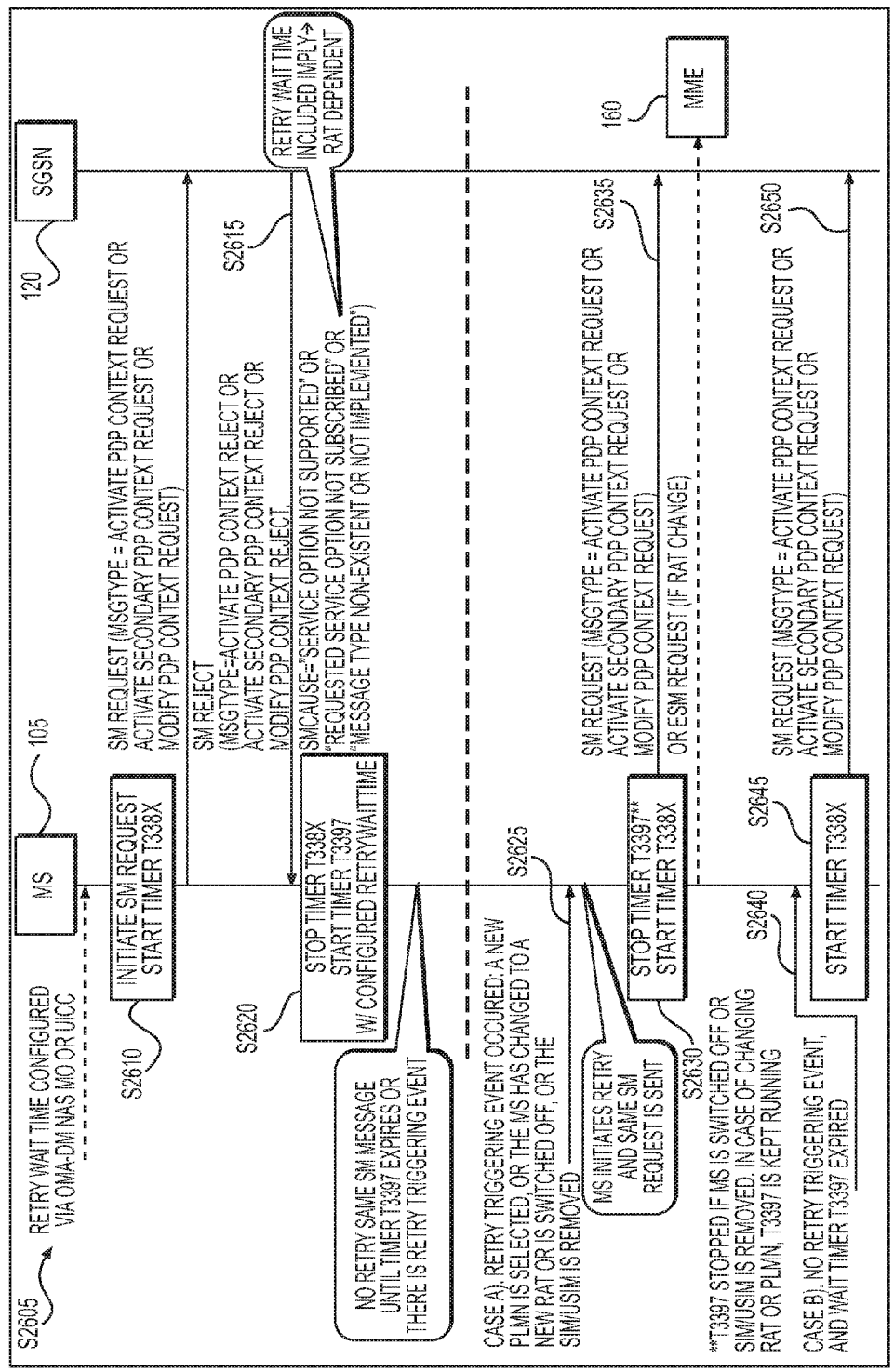
FIGS. 26A and 26B illustrate GPRS network examples of providing UE retry restriction using the absence or presence of a retry wait time value in an SM reject message as a RAT dependency indicator indicating an RAT independent mode.
Figure 26B:
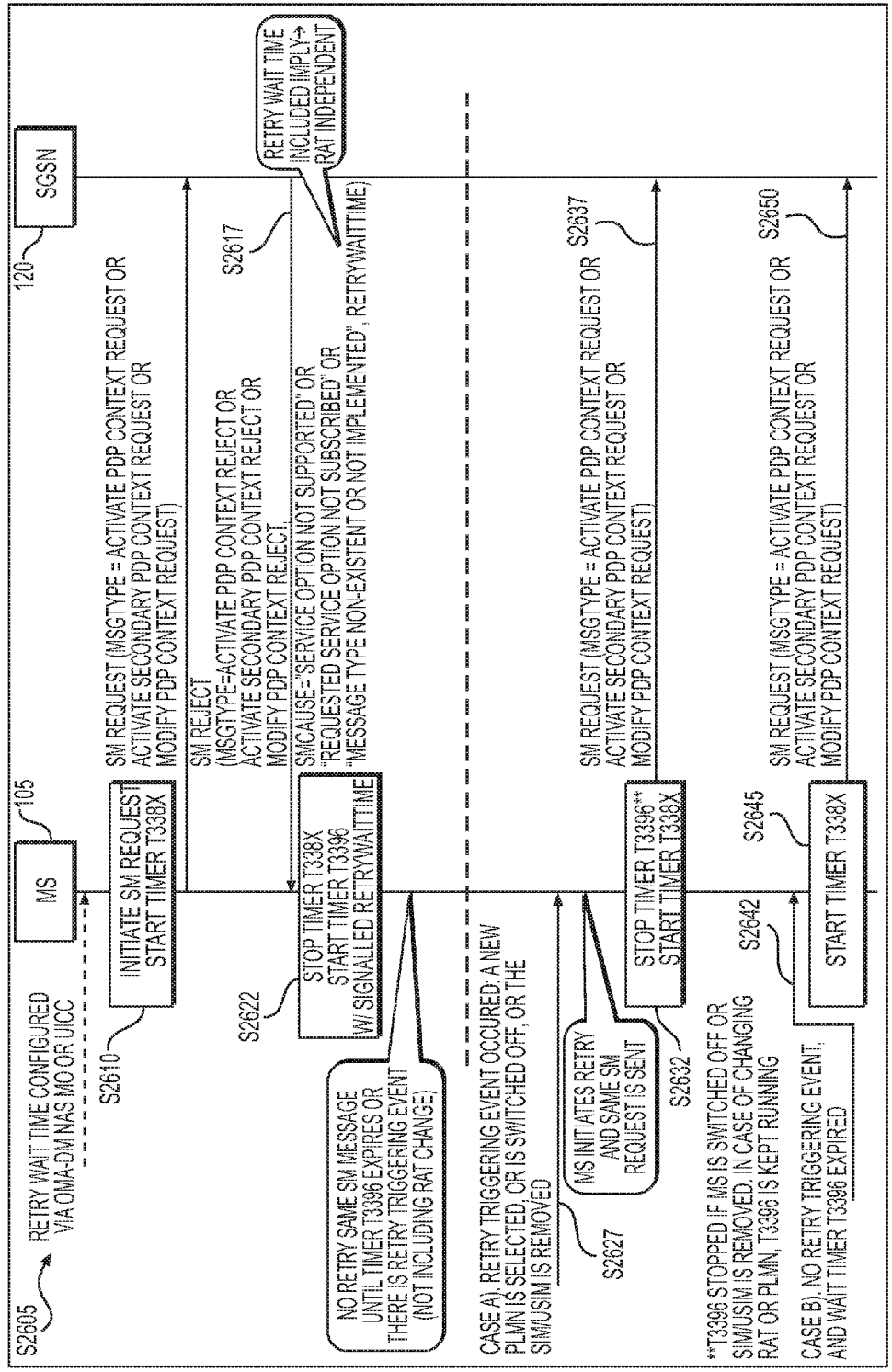

FIGS. 26A and 26B illustrate GPRS network examples of providing UE retry restriction using the absence or presence of a retry wait time value in an SM reject message as a RAT dependency indicator indicating an RAT independent mode.

Referring to FIG. 26A, in step S2605, a wait time is configured for the UE 105. The wait time may be configured in the UE 105 through, for example, OMA-DM protocol signaling, NAS signaling, or configuration of a UICC included in the UE 105.

In step S2610 the UE 105 may initiate an SM request, start timer T338x and send an SM request message to the SGSN 120. The SM request message may have a message type value of, for example, ACTIVATE PDP CONTEXT REQUEST, ACTIVATE SECONDARY PDP CONTEXT REQUEST, OR MODIFY PDP CONTEXT REQUEST.

In step S2615, the SGSN 120 may send an SM reject message to the UE 105. The SM reject message may have a message type value of, for example, ACTIVATE PDP CONTEXT REJECT, ACTIVATE SECONDARY PDP CONTEXT REJECT, OR MODIFY PDP CONTEXT REJECT. The SM reject message may have an SM cause value of, for example, "service option not supported", "requested service option not subscribed", or "message type non-existent or not implemented". The SM reject message sent in step S2615 may not include a retry wait time value retryWaitTime. According to at least some example embodiments, in the example shown in FIG. 26A, when the UE 105 receives the SM reject message not including the retry wait time in step S2615, the UE 105 may interpret the absence of the retry wait time in the SM reject message as an indication that the UE 105 is to operate in the RAT dependent mode.

In step S2620, the UE 105 stops timer T338x, and starts retry timer T3397 with the retry wait time value configured in the UE 105 in step S2605. According to one or more example embodiments, the UE 105 will not attempt a retry operation until the earlier of (a) a retry triggering event occurring (S2625), and (b) the retry wait timer T3397 expiring (S2640).

With respect to (a) the retry triggering event occurring, in step S2625, the UE 105 detects a retry triggering event before the retry wait timer T3397 expires. The retry triggering event detected in step S2625 may be, for example, the UE 105 selecting a new PLMN; the UE 105 moving to a new RAT; the UE 105 switching off, or the SIM/USIM of the UE 105 being removed.

As a result of detecting the retry triggering event in step S2625, the UE 105 performs steps S2630 and S2635.

In step S2630, the UE 105 stops the timer T3397 and starts the timer T338x.

Further, in step S2635, the UE 105 participates in a retry operation by sending another SM request to the SGSN 120. The SM request sent in step S2635 may be of the same type as that described above with respect to step S2610. Further, in the case that the retry triggering event detected in step S2625 is a RAT change indicating that the UE 105 is changing from the GPRS network 110 to the LTE network 150, the UE 105 sends an ESM message to the MME 160 in step S2635, instead of, sending the SM request to the SGSN 120.

With respect to (b) the ESM retry timer expiring, if the UE 105 determines that the ESM retry wait timer (e.g. timer T3396) expired before the UE 105 detected any retry triggering event (S2640), the UE 105 does not perform steps S2630 and S2635, and, instead, the UE 105 starts the timer T338x in step S2645 and sends another ESM request message to the MME 160 in step S2650.

Accordingly, in the example shown in FIG. 26A, after receiving a SM reject message from the SGSN 120 in step S2615, the UE 105 does not attempt a retry operation by sending another SM request message to the SGSN 120 until after the earlier of (a) a retry triggering event occurring, and (b) the retry wait timer T3397 expiring. Further, the absence of the retry timer value retryWaitTime from the SM reject message may indicate that the UE 105 is to operate in the RAT dependent mode.

As is shown in FIG. 26B, many of the operations in FIG. 26B are the same as those shown in FIG. 26A. The operations shown in FIG. 26B differ from those shown in FIG. 26A as follows. After step S2610, the SGSN 120 sends an SM reject message to the UE 105 in step S2617. The SM reject message sent in step S2617 may be the same as the SM message S2615 with the exception that the SM message sent in step S2617 includes a retry timer retryWaitTime. According to at least some example embodiments, in the example shown in FIG. 26B, when the UE 105 receives the SM reject message including the retry wait time value retryWaitTime in step S2615, the UE 105 may interpret the presence of the retry wait time value in the SM reject message as an indication that the UE 105 is to operate in the RAT independent mode. Step S2622 may be the same as step S2620 with the exception that the UE 105 starts the retry timer T3396 instead of the retry timer T3397. Further, in step S2622, instead of using the timer value configured in the UE 105 in step S2605, the UE 105 starts the retry timer T3396 using the timer value retryWaitTime included in the SM reject message received by the UE 105 in step S2617. Step S2627 may be the same as step S2625 with the exception that the UE 105 changing to a new RAT is no longer a retry triggering event. For example, because, in FIG. 26B, the UE 105 is operating in the RAT independent mode, the UE 105 does not perform a retry operation simply because the UE 105 changes RATs. Further, step S2632 may be the same as step S2630 with the exception that the timer T3396 is used in step S2632 instead of the timer T3397. Further, step S2637 may be the same as step S2635 with the exception that no SM request message is sent from the UE 105 to the SGSN 120 because, as is discussed above, in RAT independent mode, changing the RAT of the UE 105 is not a retry triggering event. Further, step S2642 is the same as step S2640 with the exception that step S2642 takes place when the retry timer T3396 expires. Accordingly, in FIG. 26B, the UE 105 will not attempt a retry operation until the earlier of (a) a retry triggering event occurring (S2627), and (b) the retry wait timer T3396 expiring (S2640).

FIGS. 3B, 4B, 10, 12, and 17-26 are described above with reference to an example in which a retry wait timer of UE 105 is kept running after the UE 105 detects a retry triggering event, which may be the UE 105 selecting a new PLMN, or the UE 105 selecting a new RAT, the UE 105 being switched off, or a SIM/USIM of the UE 105 being removed.

according to one or more example embodiments, if the retry wait time of the UE 105 is running when a retry triggering event is detected, and the retry triggering event is the UE 105 selecting a new PLMN or the UE 105 selecting a new RAT, the retry wait timer is not stopped, and the retry wait timer (which, in the present scenario, was started by the UE 105 when the UE 105 was connected to a previous PLMN or RAT) is allowed by the UE 105 to continue running. In the present alternate embodiment, the retry wait timer of the UE is stopped after the UE 105 detects a retry triggering event if the detected retry triggering event is the UE 105 being switched off or a SIM/USIM of the UE 105 being removed.

Example embodiments being thus described, it will be obvious that embodiments may be varied in many ways. Such variations are not to be regarded as a departure from example embodiments, and all such modifications are intended to be included within the scope of example embodiments.

What is claimed:

1. A method of operating a user equipment (UE) in a wireless communications network, the method comprising:
   sending, from the UE to a first network element, a first packet service session management request message indicating a request of a first session management service type for at least one of establishing a new packet data session or modifying an existing packet data session, the first packet service session management request message being sent towards a first access point name (APN);
   receiving, at the UE, an operation mode message;
   choosing, at the UE, an operation mode of the UE based on the operation mode message, the operation mode of the UE being a radio access technology (RAT) dependent operation mode or a RAT independent operation mode,
   receiving, at the UE, a rejection message,
   the rejection message indicating the request of the first session management service type has been rejected;
   starting a retry timer; and
   after receiving the rejection message,
      determining whether a retry trigger event has occurred, based on the operation mode of the UE, and
      performing a retry operation,
   the retry operation including sending, from the UE, a second packet service session management request message of the first session management service type towards the first APN,
   the retry operation being prevented by the UE such that the retry operation is not performed by the UE until after at least one of,
      an expiration of the retry timer of the UE, or
      a determination, at the UE, that the retry trigger event occurred.

2. The method of claim 1, wherein the first packet service session management request message is at least one of a general packet radio service (GPRS) session management (SM) message or an evolved packet system (EPS) session management (ESM) message.

3. The method of claim 2, wherein the first network element is at least one of a serving GPRS support node (SGSN) or a mobility management entity (MME).

4. The method of claim 1 further comprising:
   setting an initial value of the retry timer of the UE based on a first timer value,
   wherein, when UE receives a first message including a timer value, the first timer value is the timer value included in the first message.

5. The method of claim 4 wherein the first message is the rejection message.

6. The method of claim 4 further comprising:
   configuring a default timer value in the UE;
   wherein, when the UE does not receive a timer value in the first message, the first timer value is the default timer value configured in the UE.

7. The method of claim 1 wherein the retry trigger event is at least one of the UE changing the public land mobile network (PLMN) the UE is connected to, the UE changing a type of radio access technology (RAT) the UE is connected to, the UE switching off, a subscriber identity module (SIM) of the UE changing, or a universal SIM (USIM) of the UE changing.

8. The method of claim 7 wherein, when the UE changes the type of RAT the UE is connected to,
   the UE does not interpret the UE changing the type of RAT the UE is connected to as the retry triggering event, if the UE is operating in the RAT independent operation mode, and
   the UE does interpret the UE changing the type of RAT the UE is connected to as the retry triggering event, if the UE is operating in the RAT dependent operation mode.

9. The method of claim 1, wherein the rejection message received at the UE is the operation mode message.

10. A user equipment (UE) comprising:
    memory storing computer-readable instructions; and
    one or more processors configured to execute the computer-readable instructions such that the one or more processors are configured to perform operations including,
       sending, from the UE to a first network element, a first packet service session management request message indicating a request of a first session management service type for at least one of establishing a new packet data session or modifying an existing packet data session, the first packet service session management request message being sent towards a first access point name (APN);
       receiving, at the UE, an operation mode message;
       choosing, at the UE, an operation mode of the UE based on the operation mode message, the operation mode of the UE being a radio access technology (RAT) dependent operation mode or a RAT independent operation mode,
       receiving, at the UE, a rejection message,
       the rejection message indicating the request for of the first session management service type has been rejected;
       starting a retry timer; and
       after receiving the rejection message,
          determining whether a retry trigger event has occurred, based on the operation mode of the UE, and
          performing a retry operation,
       the retry operation including sending, from the UE, a second packet service session management request message of the first session management service type towards the first APN,
       the retry operation being prevented by the UE such that the retry operation is not performed by the UE until after at least one of,
          an expiration of the retry timer of the UE, or
          a determination, at the UE, that the retry trigger event occurred.

11. The UE of claim 10, wherein the one or more processors are configured to execute the computer-readable instructions such that the first packet service session management request message is at least one of a general packet radio service (GPRS) session management (SM) message or an evolved packet system (EPS) session management (ESM) message.

12. The UE of claim 11, wherein the one or more processors are configured to execute the computer-readable instructions such that first network element is at least one of a serving GPRS support node (SGSN) and a mobility management entity (MME).

13. The UE of claim 10 wherein the operations the one or more processors are configured to perform further include:
    setting an initial value of the retry timer of the UE based on a first timer value; and wherein the one or more processors are configured to execute the computer-readable instructions such that, when the UE receives a first message including a timer value, the first timer value is the timer value included in the first message.

14. The UE of claim 13 wherein the one or more processors are configured to execute the computer-readable instructions such that the first message is the rejection message.

15. The UE of claim 13 wherein the operations the one or more processors are configured to perform further include:
configuring a default timer value in the UE; and
wherein the one or more processors are configured to execute the computer-readable instructions such that, when the UE does not receive a timer value in the first message, the first timer value is the default timer value configured in the UE.

16. The UE of claim 10 wherein the one or more processors are configured to execute the computer-readable instructions such that the retry trigger event is at least one of the UE changing the public land mobile network (PLMN) the UE is connected to, the UE changing a type of radio access technology (RAT) the UE is connected to, the UE switching off, a subscriber identity module (SIM) of the UE changing, or a universal SIM (USIM) of the UE changing.

17. The UE of claim 16 wherein the one or more processors are configured to execute the computer-readable instructions such that, when the UE changes the type of RAT the UE is connected to,
the UE does not interpret the UE changing the type of RAT the UE is connected to as the retry triggering event, if the UE is operating in the RAT independent operation mode, and
the UE does interpret the UE changing the type of RAT the UE is connected to as the retry triggering event, if the UE is operating in the RAT dependent operation mode.

18. The UE of claim 10, wherein the one or more processors are configured to execute the computer-readable instructions such that the operation mode message is the rejection message received at the UE.

* * * * *